(12) United States Patent
Gallagher et al.

(10) Patent No.: US 12,502,792 B2
(45) Date of Patent: Dec. 23, 2025

(54) ROBOTIC GRIPPER APPARATUS

(71) Applicant: Divergent Technologies, Inc., Los Angeles, CA (US)

(72) Inventors: Jason Vincent Gallagher, Lomita, CA (US); Patrick Minwoo Jeon, Torrance, CA (US); Keith McKay, Los Angeles, CA (US); Richard Kingston, Los Angeles, CA (US); Vincent Arunas Burokas, Los Angeles, CA (US); Lukas Philip Czinger, Santa Monica, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 888 days.

(21) Appl. No.: 17/664,346

(22) Filed: May 20, 2022

(65) Prior Publication Data

US 2022/0371208 A1    Nov. 24, 2022

Related U.S. Application Data

(60) Provisional application No. 63/192,209, filed on May 24, 2021.

(51) Int. Cl.
*B25J 15/10* (2006.01)
*B25J 15/00* (2006.01)
*B25J 15/08* (2006.01)

(52) U.S. Cl.
CPC ........... *B25J 15/10* (2013.01); *B25J 15/0033* (2013.01); *B25J 15/083* (2013.01)

(58) Field of Classification Search
CPC ...... B25J 15/10; B25J 15/0033; B25J 15/083; B25J 15/0047; B25J 15/028; B25J 15/0475
See application file for complete search history.

(56) References Cited

U.S. PATENT DOCUMENTS

| 4,747,997 A * | 5/1988 | Boatwright .......... G21C 19/105 |
| | | 29/244 |
| 5,203,226 A | 4/1993 | Hongou et al. |

(Continued)

FOREIGN PATENT DOCUMENTS

| CN | 107433615 A | 12/2017 |
| JP | 2012-040658 A | 3/2012 |

(Continued)

OTHER PUBLICATIONS

US 9,202,136 B2, 12/2015, Schmidt et al. (withdrawn)

(Continued)

*Primary Examiner* — William A. Rivera
(74) *Attorney, Agent, or Firm* — ArentFox Schiff LLP

(57) ABSTRACT

Various aspects of robotic grippers are disclosed herein. In one aspect, a robotic gripper may include three gripper fingers arranged on a mechanical end effector, the three gripper fingers configured to translate radially when actuated to contact and align with a gripper interface located on a part to enable manipulation of the part. In various embodiments, each gripper finger may include an elongated portion configured to contact an outer surface of the gripper interface when the gripper fingers are actuated. Each gripper finger may further include a hook portion configured to contact an inner surface of the gripper interface opposing the outer surface. In various embodiments, the hook portion may include a receptacle positioned to align with a complementary protrusion on the gripper interface.

33 Claims, 35 Drawing Sheets

(56) References Cited

U.S. PATENT DOCUMENTS

| | | |
|---|---|---|
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |

(56) References Cited

U.S. PATENT DOCUMENTS

| | | |
|---|---|---|
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |

(56) References Cited

U.S. PATENT DOCUMENTS

| | | |
|---|---|---|
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,906,192 B1* | 2/2021 | Eom ............... B25J 15/0273 |
| 2006/0108783 A1 | 5/2006 | Ni et al. |
| 2010/0090419 A1 | 4/2010 | Monden et al. |
| 2012/0290133 A1 | 11/2012 | Goto et al. |
| 2013/0325181 A1 | 12/2013 | Moore |
| 2014/0277669 A1 | 9/2014 | Nardi et al. |
| 2015/0357062 A1* | 12/2015 | Allison ............... G21C 19/11 294/195 |
| 2016/0264365 A1 | 9/2016 | Maruyama et al. |
| 2017/0113344 A1 | 4/2017 | Schönberg |
| 2017/0341309 A1 | 11/2017 | Piepenbrock et al. |
| 2018/0290267 A1* | 10/2018 | Kirsten ............... B25B 5/101 |
| 2020/0023480 A1 | 1/2020 | Otsuka et al. |
| 2021/0008731 A1 | 1/2021 | Eom et al. |
| 2024/0308762 A1* | 9/2024 | Johannisson ........ B65G 1/0464 |
| 2024/0326367 A1* | 10/2024 | Van Werven ........ B60B 30/08 |
| 2025/0121510 A1* | 4/2025 | White ............... B25J 13/082 |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
European Search Report received for Patent Application No. 22811901.2, Mailed on Feb. 12, 2025, 9 Pages.
International Search Report and the Written Opinion issued in PCT/US2022/0303405, mailed Aug. 16, 2022, 6 pages.

* cited by examiner

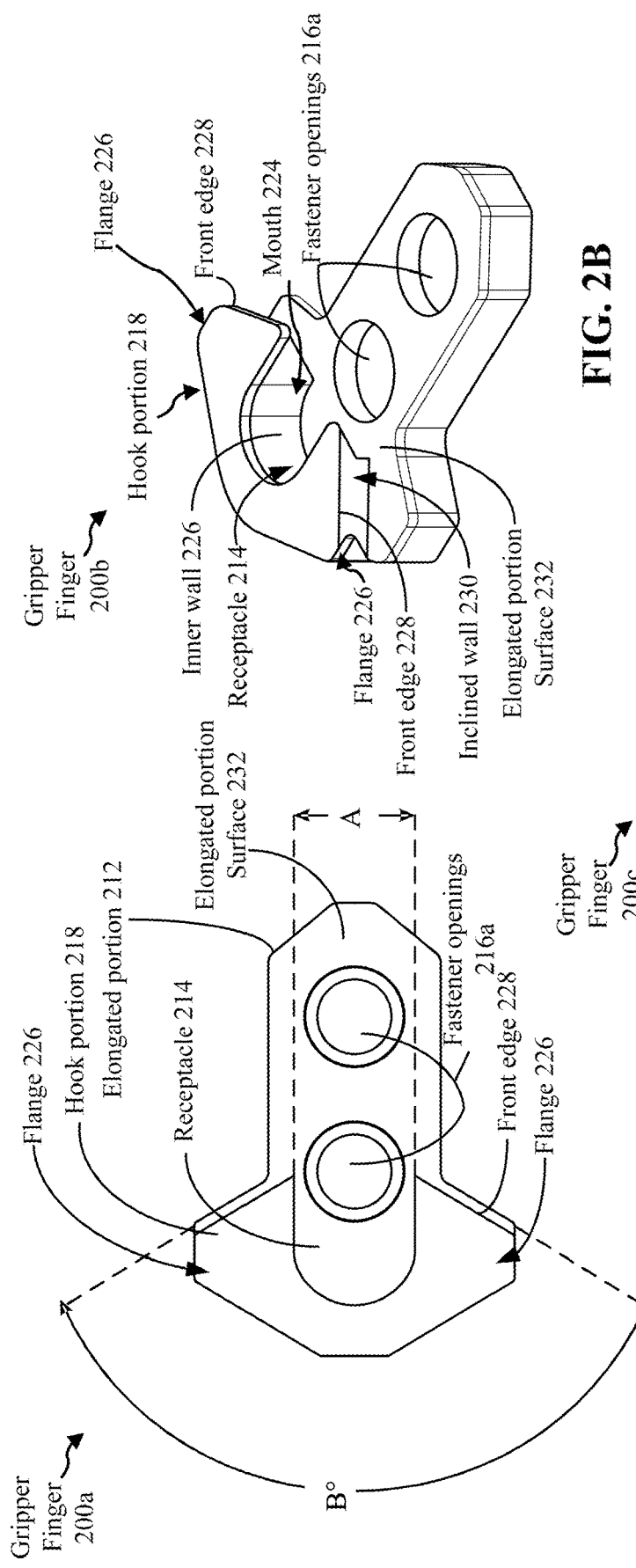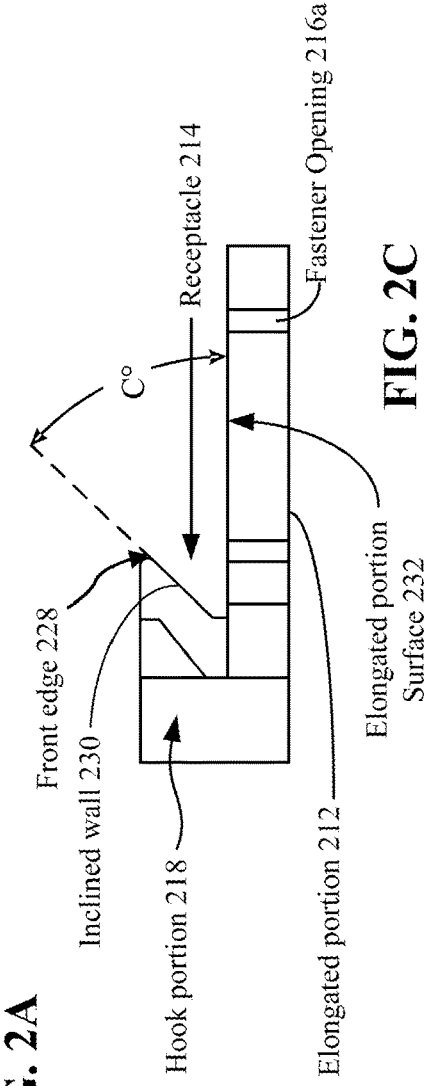

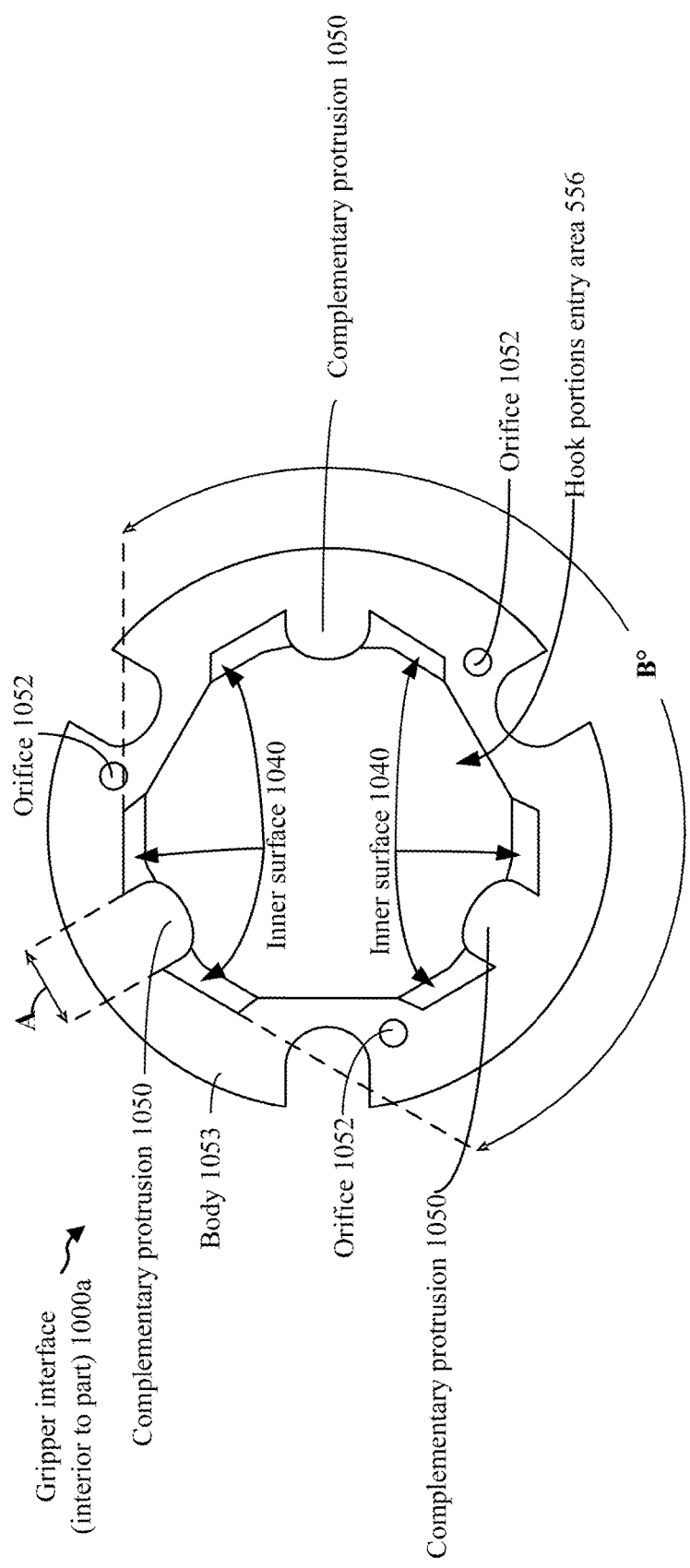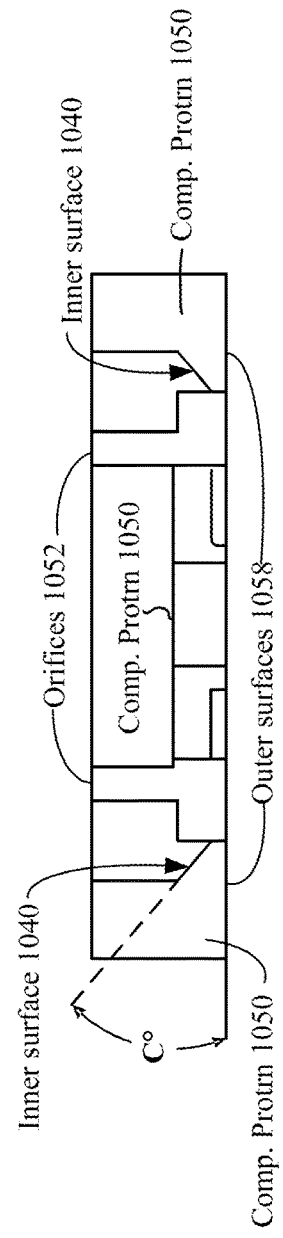
FIG. 10A
FIG. 10B

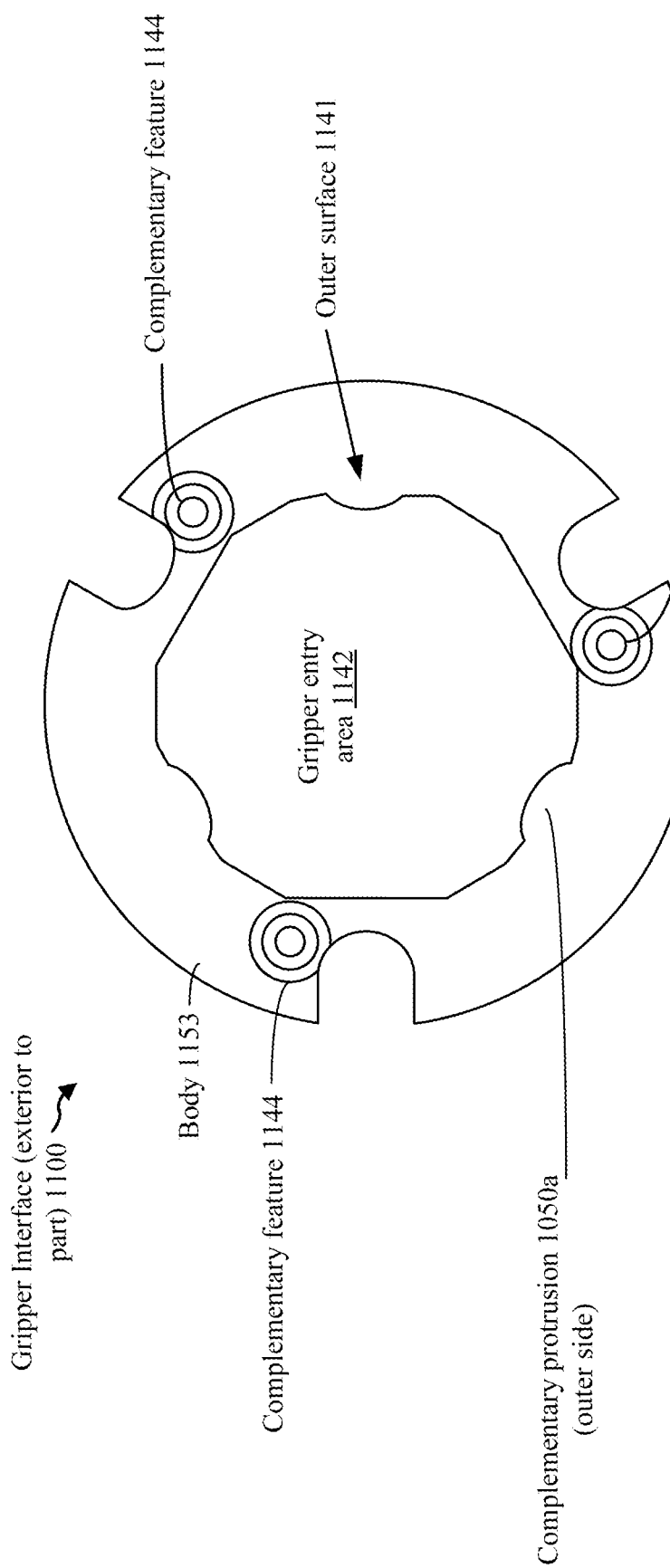
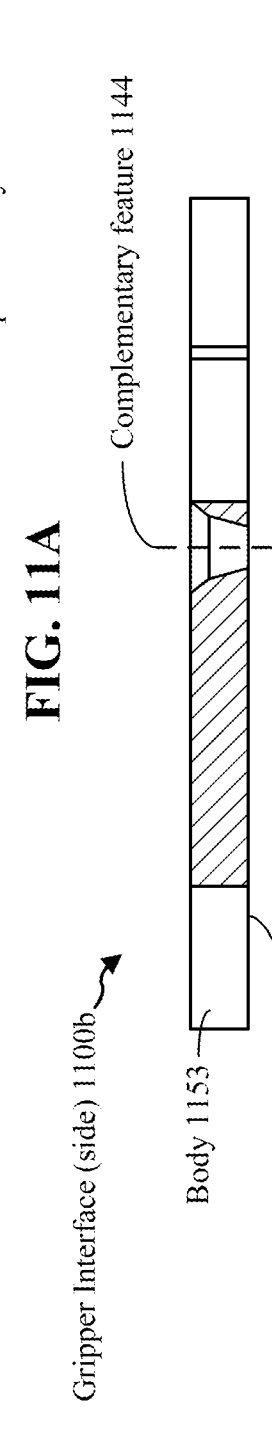
FIG. 11A
FIG. 11B

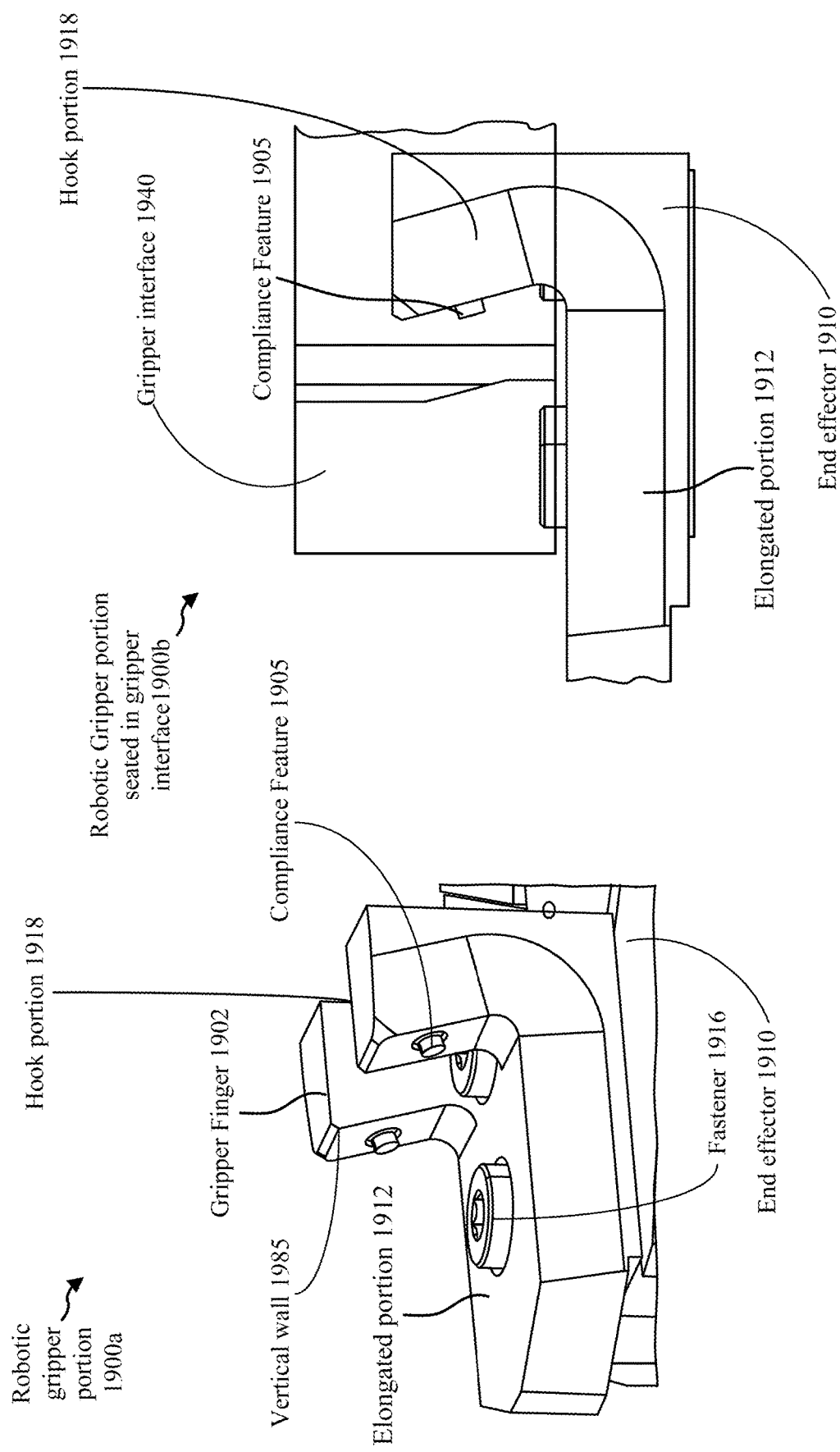

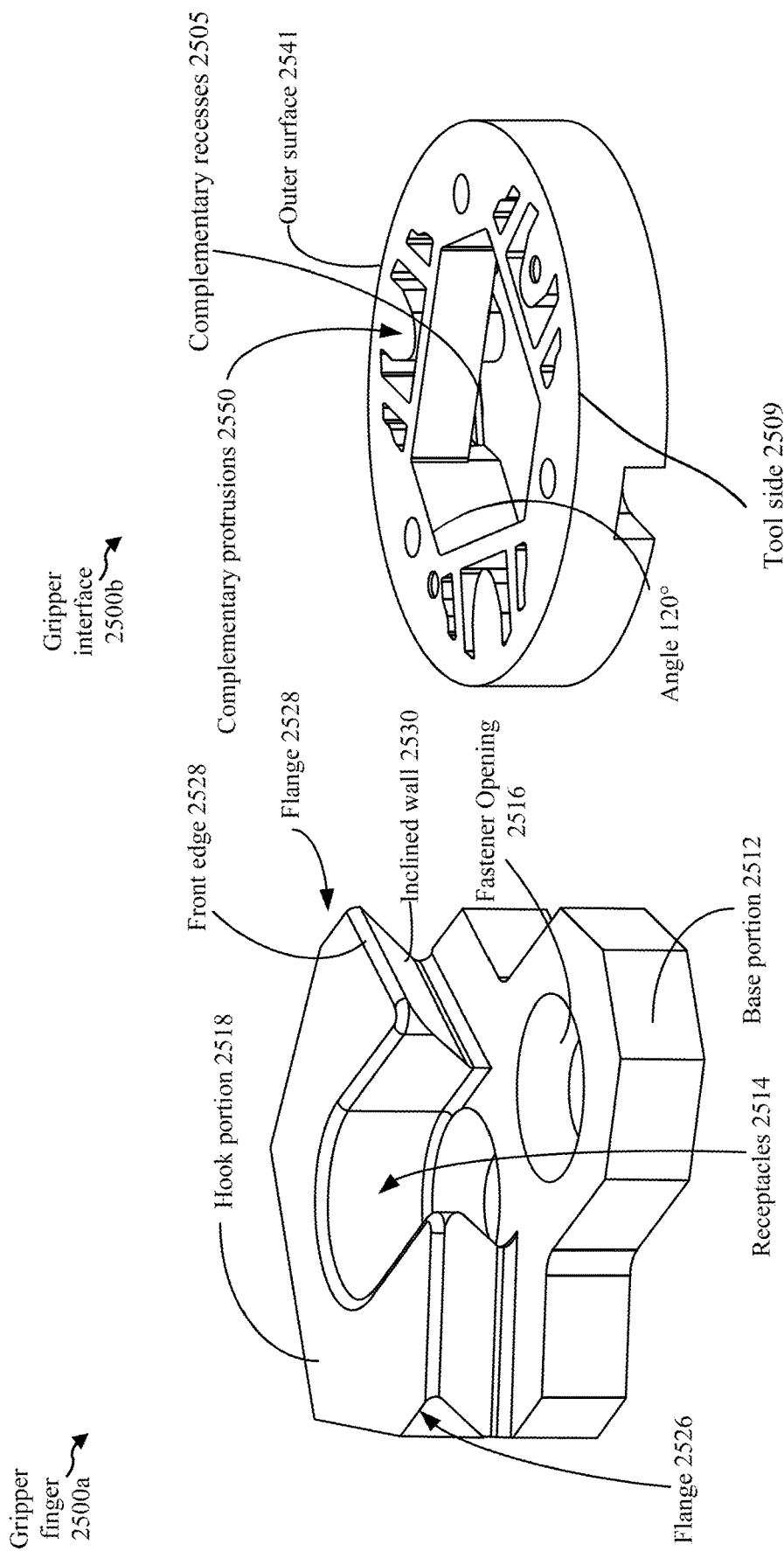

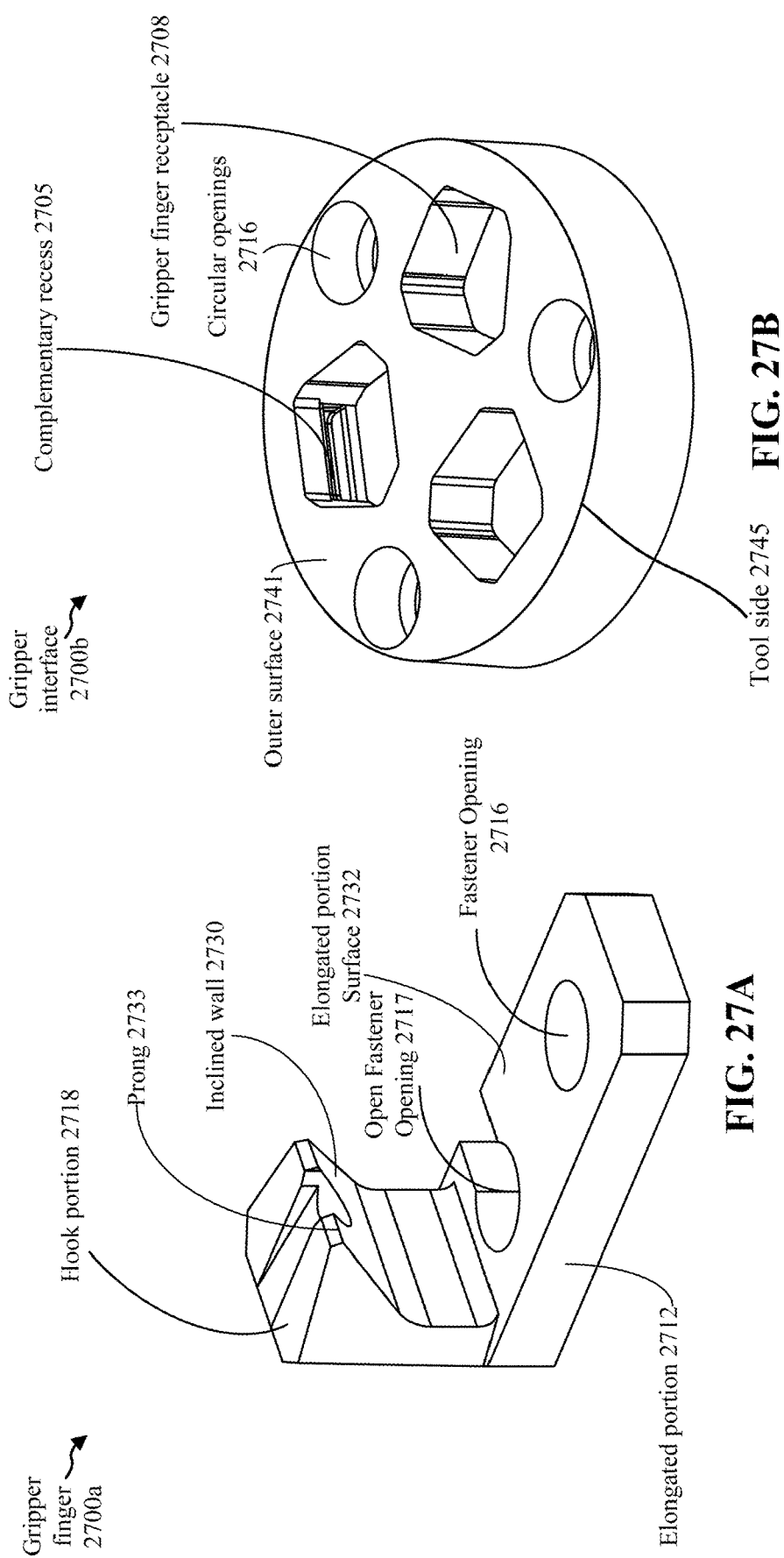

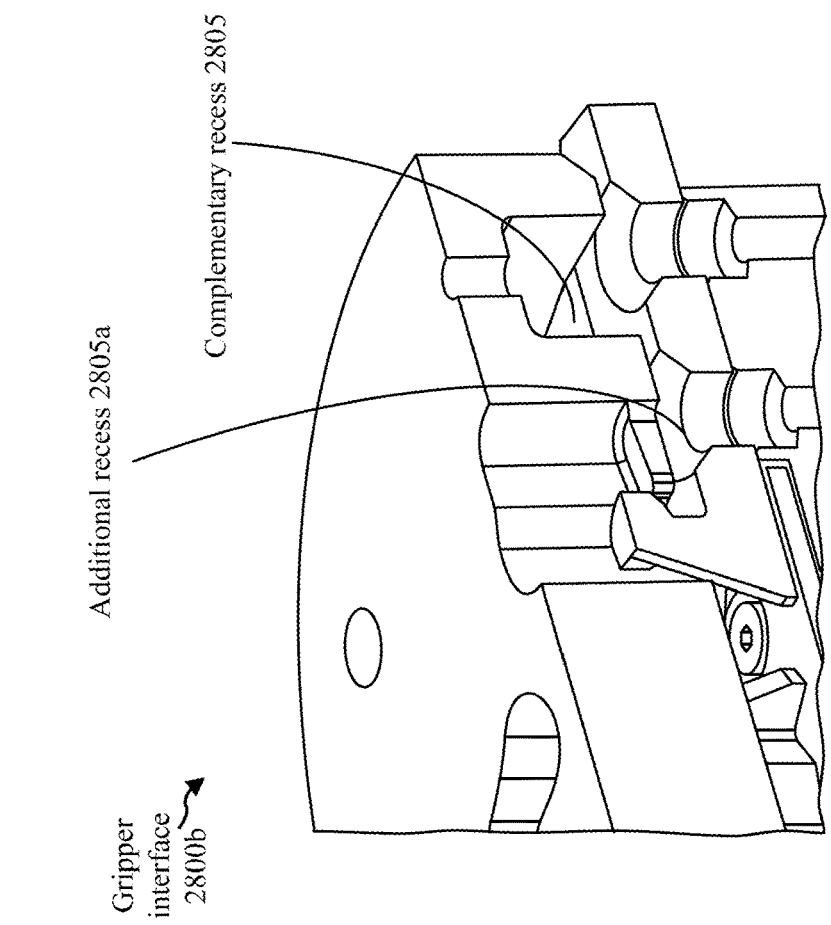
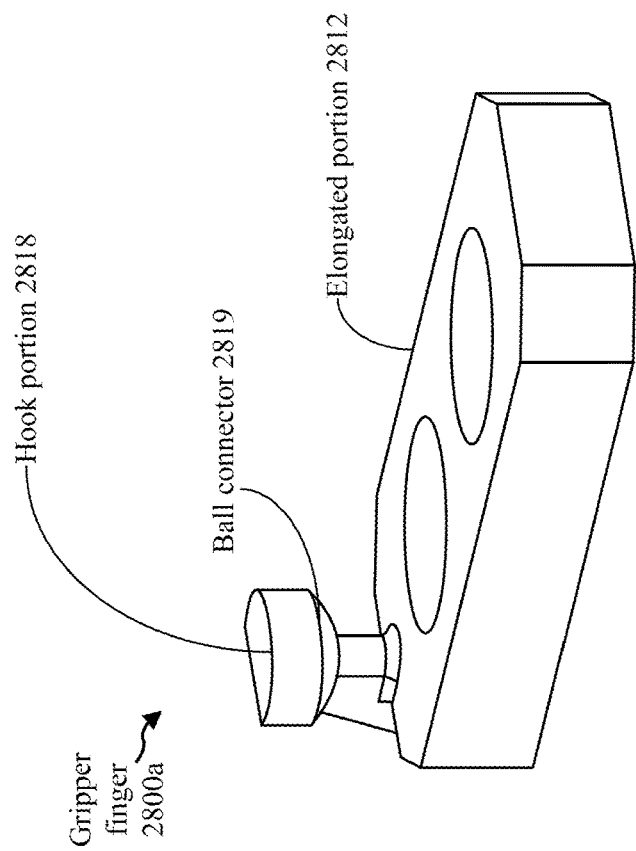
FIG. 28B
FIG. 28A

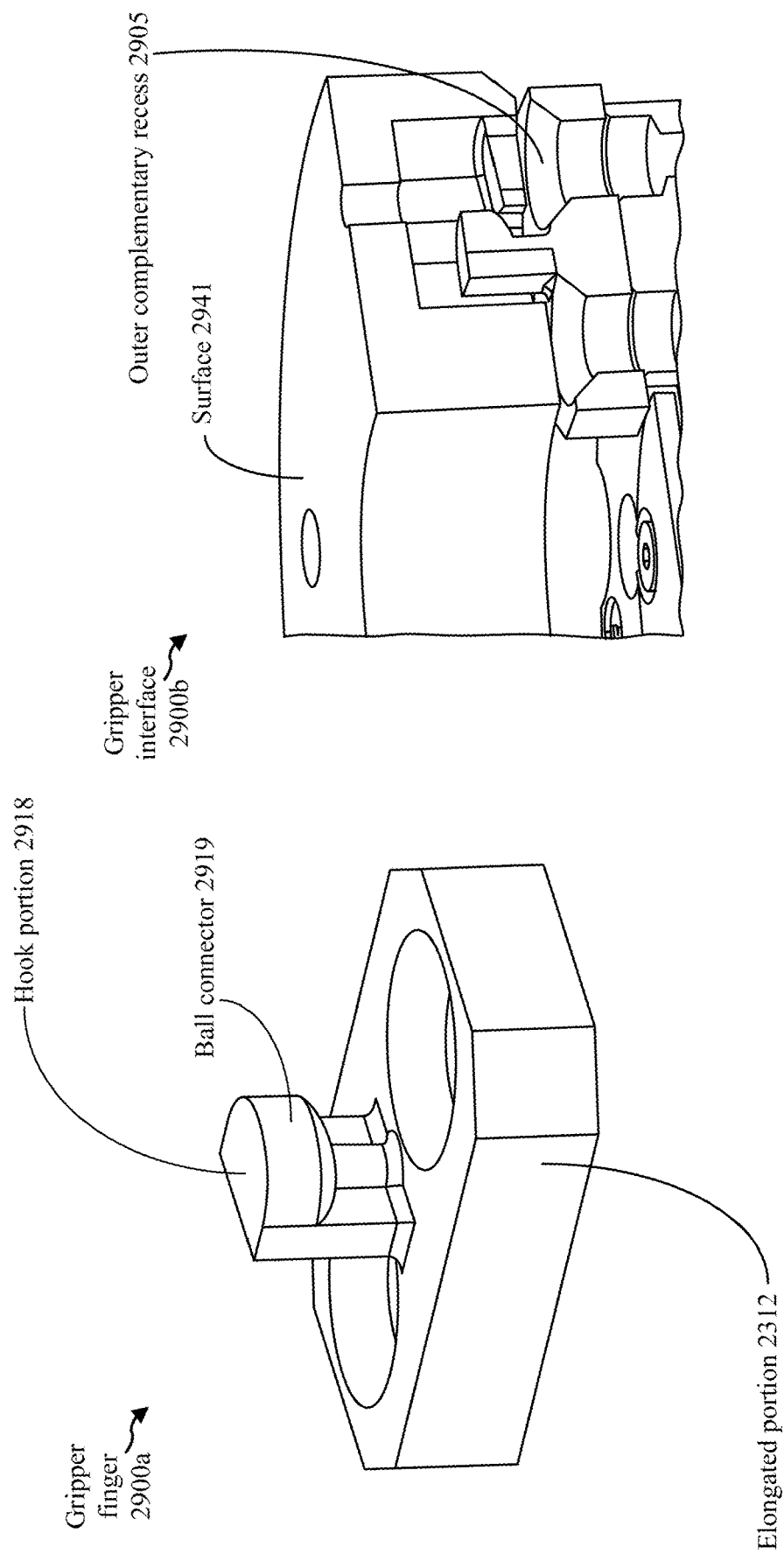

ROBOTIC GRIPPER APPARATUS

CROSS-REFERENCE TO RELATED APPLICATION(S)

This application claims the benefit of and right of priority to U.S. Provisional Patent Application No. 63/192,209, entitled "ROBOTIC GRIPPER SYSTEM" and filed on May 24, 2021, which is assigned to the assignee hereof, and incorporated herein by reference in its entirety.

BACKGROUND

Field

The present disclosure relates generally to automated movement of parts, and more particularly, to robotic grippers for fixtureless movement of parts.

Introduction

Conventional manufacturers of diverse or heavy equipment may employ hard automation techniques or robots for moving or manipulating different parts, such as in automotive, aircraft or spacecraft manufacturing facilities, and similar factories using heavy machinery or parts with multiple geometries. To lift or otherwise manipulate heavy equipment or bulky parts that may be unwieldy to handle, it is not uncommon for manufacturers to build tooling specific to the parts that allow the robots to handle the parts. These fixtures may enable the manufacturer to manipulate the product and perform processing operations on it. However, a major disadvantage of this approach is that the fixtures are limited to specific products or product lines. When the products change, it is typically an expensive capital investment to retool the fixtures to accommodate the new parts.

Furthermore, to move heavy parts or awkward parts with uneven weight distributions, manufacturers may in some cases have to use multiple points of contact, which in turn may require additional grip points on a single part, in addition to the increased inefficiency of dedicating multiple robots to a single task. Conventional automated robotic grip mechanisms may also inadvertently damage the part if the grip mechanism contacts the part surface, such as when a part unintentionally moves or slips relative to the robotic arm.

SUMMARY

Several aspects of robotic grippers are disclosed in various embodiments described herein.

In one aspect of the disclosure, a robotic gripper includes three gripper fingers arranged on a mechanical end effector. The three gripper fingers are configured to translate radially when actuated to contact and align with a gripper interface located on a part to enable manipulation of the part. Each gripper finger includes an elongated portion configured to contact an outer surface of the gripper interface when the gripper fingers are actuated, and a hook portion configured to contact an inner surface of the gripper interface opposing the outer surface. The hook portion includes a receptacle positioned to align with a complementary protrusion on the gripper interface.

In another aspect of the disclosure, a robotic gripper includes three gripper fingers arranged on a mechanical end effector and configured to translate radially outward when actuated to engage a gripper interface located on a part to enable manipulation of the part. Each gripper finger includes an elongated portion arranged on the end effector and configured to contact an outer surface of the gripper interface when the gripper fingers are actuated, and a hook portion configured to contact an inner surface of the gripper interface opposing the outer surface to securely engage the gripper interface.

In still another aspect of the disclosure, a robotic gripper includes three gripper fingers arranged on a mechanical end effector and configured when actuated to translate radially outward to contact and engage a gripper interface located on a part to enable manipulation of the part. Each gripper finger includes a base portion arranged along a surface of the end effector and configured to contact an outer surface of the gripper interface during the engagement, and a hook portion configured to contact an inner surface of the gripper interface opposing the outer surface, the hook portion further including a first feature positioned to align with a second feature on the gripper interface, the second feature being complementary to the first feature.

It will be understood that other aspects of robotic grippers will become readily apparent to those skilled in the art from the following detailed description, wherein it is shown and described only several embodiments by way of illustration. As will be realized by those skilled in the art, the disclosed grippers are capable of other and different embodiments and its several details are capable of modification in various other respects, all without departing from the spirit and scope of the current disclosure. Accordingly, the drawings and detailed description are to be regarded as illustrative in nature and not as restrictive.

BRIEF DESCRIPTION OF THE DRAWINGS

Various aspects will now be presented in the detailed description by way of example, and not by way of limitation, in the accompanying drawings, wherein:

FIGS. 2A, 2B and 2C are top, perspective, and side views of an exemplary gripper finger, respectively.

FIG. 10A is a top view of an inner surface of an exemplary gripper interface.

FIG. 10B is a side view of an exemplary gripper interface.

FIG. 11A is a top view of an outer surface of an exemplary gripper interface.

FIG. 11B is a side view of an exemplary gripper interface.

FIG. 19A is a side perspective view of an example robotic gripper portion.

FIG. 19B is a side transparent view of the example robotic gripper engaged with a gripper interface.

FIG. 25A is a perspective view of another example gripper finger.

FIG. 25B is a perspective view of a gripper interface for use with the example gripper finger.

FIG. 27A is a perspective view of another example gripper finger.

FIG. 27B is a perspective view of a gripper interface for use with the example gripper finger.

FIG. 28A is a perspective view of another example gripper finger.

FIG. 28B is a perspective view of a gripper interface for use with the example gripper finger.

FIG. 29A is a perspective view of another exemplary gripper finger.

FIG. 29B is a perspective view of a gripper interface for use with the example gripper finger.

DETAILED DESCRIPTION

Figure 1:
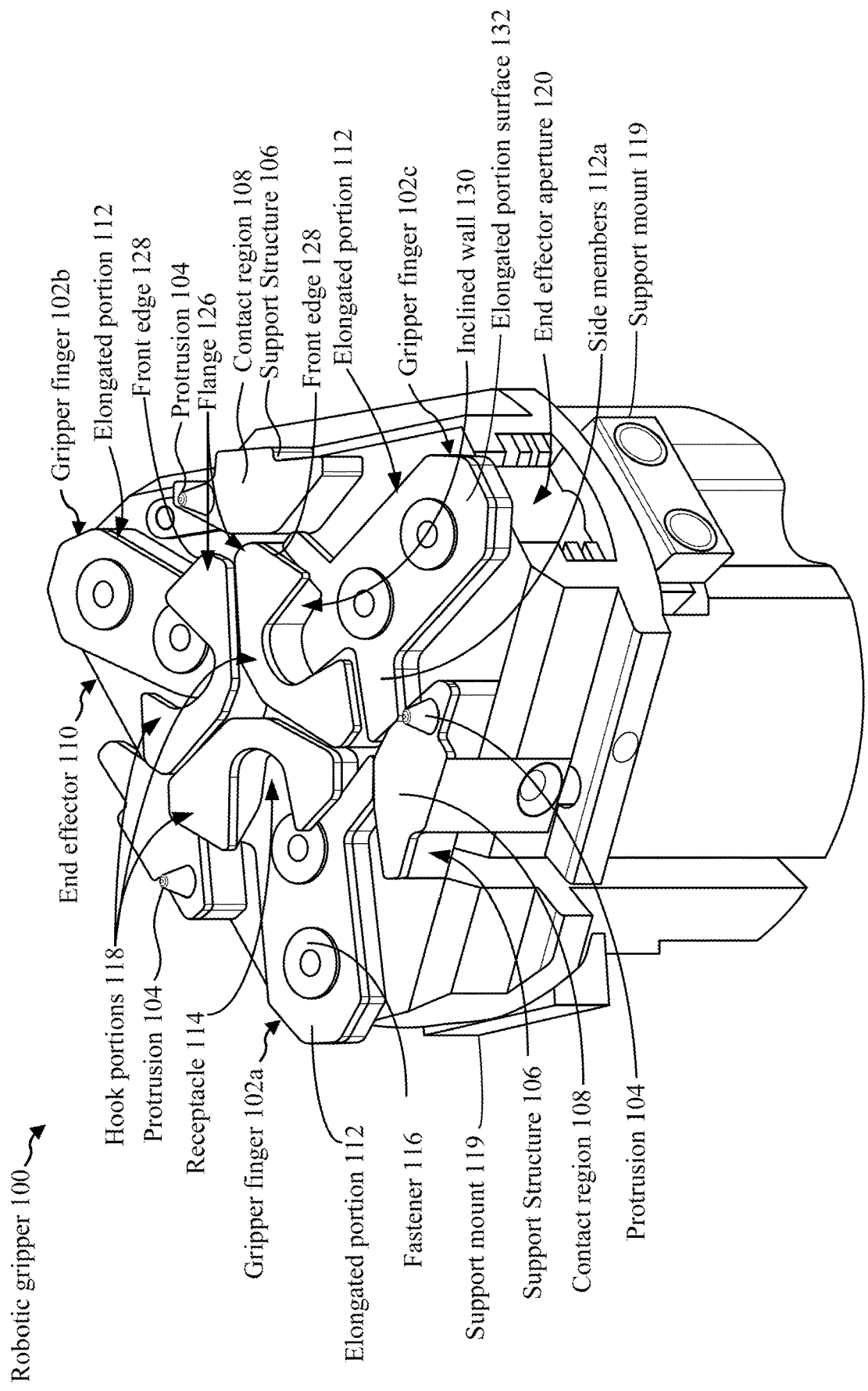
FIG. 1 is a perspective view of a robotic gripper.

The detailed description set forth below in connection with the appended drawings is intended to provide a description of various exemplary embodiments of the concepts disclosed herein and is not intended to represent the only embodiments in which the disclosure may be practiced. The terms "example" and "exemplary" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

The present disclosure is generally directed to various embodiments of a robotic gripper. The robotic gripper may generally be characterized by a master side. The master side may include the robot, the robotic arm, the end effector coupled to the arm, and the robotic gripper. Various aspects may further include a tool side. The tool side may include a gripper interface that can be machined or 3-D printed into the part that is to be manipulated. The parts to be moved, shifted, or otherwise manipulated can be any custom or standard part.

The robots used for the robotic grippers may be independent, movable robots, or they may be robotic arms secured to a fixed region, depending on the application. Also, as noted, requiring multiple tooling to accommodate different parts typically results in large capital expenditures. The grippers may be designed for use in fixtureless assemblies. Fixtureless assembly eliminates the need for different tools and fixtures to accommodate different part models or geometries. With fixtureless assembly, for example, a part may be in the process of being repositioned by one manipulator while being polished or welded by another manipulator. Here, the fixtures may be replaced by sensor-guided robots, which can result in substantially lower costs.

In various embodiments of the disclosure, the robotic gripper may use three generally concentric gripper fingers that expand outward to provide a "wedge shaped" geometry. The three gripper fingers may expand to an amount that is consistent with the interface. The robotic gripper, unlike conventional approaches, can be made capable of efficiently holding large parts, while concurrently resisting adhesive joining forces that otherwise may cause the robotic gripper to stick to the part.

In various embodiments of the disclosure, the part to be manipulated can be equipped with a gripper interface. The gripper interface may be 3-D printed on the part, or it may in some embodiments be machined onto the part. Unlike conventional interfaces, the gripper interface as disclosed herein is typically compact. As described in greater detail below, the gripper interface may be printed or formed on an appropriate surface of a part such as an aircraft or automobile component. Because only one gripper interface is typically integrated into a part, the gripper interface introduces a small footprint. Further, using a three-finger gripper, each of the fingers in some embodiments can be independently positioned at different ratios relative to the gripper interface to optimally couple to the gripper interface. Depending on factors like the size and geometry of the gripper interface formed on a part and the achievable angle between the interface and the robotic gripper, the three fingers can be independently positioned to extend by different amounts in order to grasp the interface strongly while optimizing the footprint of the gripper and the gripper interface. That is to say, each of the three grippers may be strategically positioned to couple to the interface using an optimal ratio given the relative dimensions of the members and other criteria, and the relative positioning of the part to the floor and the robotic gripper. This feature stands in contrast to conventional robotic grippers, in which each of the fingers may not be independent and are therefore required to move together uniformly with the same position ratio. These conventional grippers lack flexibility and often cannot form an optimal grip with the interface.

The gripper interface may also, in some embodiments, take advantage of certain hollow portions of a steel surface of a part to enable the robotic gripper to engage with the part by latching onto both an inner surface and an outer surface of the gripper interface. The result is a robotic gripper that can move or manipulate a part for any reason directly without requiring fixtures, including, for example, assembling vehicle structures for automobiles, transporting the part to another region of the facility, or stabilizing the part while it is being polished, mechanically modified, or otherwise processed, etc.

FIG. 1 is a perspective view of a robotic gripper according to an embodiment. The robotic gripper 100 may include a sensor (not shown in this embodiment) for identifying a coordinate-based position of a gripper interface. In general, the robotic gripper 100 disclosed in FIG. 1 may include three gripper fingers 102a-c arranged in a generally concentric configuration relative to one another on an end effector 110. The end effector 110 may be an end-portion of a robotic arm and its accompanying features. The end effector 110 may be coupled to an arm of a robot or a stationary automated system. Each of the gripper fingers 102a-c in the embodiment shown may include an elongated portion 112 and a hook portion 118.

In various embodiments, the configuration of the robotic gripper 100 is such that the end effector 110 may be coupled to a robotic arm of a robot. Using the sensor, the end effector 110—and hence the robotic gripper 100—may approach the gripper interface as described in figures to follow. The three hook portions 118 may be configured to enter an aperture made available for the hook portions 118, such as a gripper entry area 842 (FIG. 8), to enable the gripper to securely connect to inner and outer surfaces of the gripper interface 840 (FIG. 8) to guarantee a snug fit regardless of the radius of the gripper entry area 842.

Each gripper finger 102a-c may include an elongated portion 112 that may be arranged on a guide (FIG. 3) on the surface of the end effector 110. In various embodiments, the elongated portion 112 may be formed over an end effector aperture 120. In these embodiments, the end effector apertures (one for each elongated portion 112) may be configured to guide the elongated portion 112 as the gripper finger is translated radially outward from its open position.

In other embodiments described below, the gripper finger is arranged over another guide or structure that may fasten to each of the elongated portions 112 via fastener 116. Two fasteners 116 may be included on a single gripper finger 102a, b or c. In various embodiments, the fasteners 116 may be used by a servo motor or by a pneumatic actuation mechanism to radially translate the elongated portions 112 and hook portions 118 of each gripper finger 102a-c in an outward position to enable the hook portion 118 and its associated receptacle 114 to lock with a gripper interface (below). In some embodiments, the gripper fingers (see gripper finger 102c) may be guided by an end effector aperture 120, which may have edges (obscured from view) along which the gripper finger 102c can be guided as it moves during its outward translation. The other edges may be associated with similar end effector apertures 120. As noted above, in some aspects of the disclosure, each of gripper fingers 102a-c are designed to independently move, free from the movements of each other. This accords flexibility in enabling the gripper to handle a variety of different interfaces with different geometries. This also allows the gripper, if necessary, to handle a part differently depending on the geometry of the part, its weight, and its position relative to the factory floor, among other benefits.

In additional embodiments as will be seen, the end effector aperture 120 includes a guide mechanism that includes fasteners for the gripper fingers 102a-c (and specifically elongated portions 112) and that includes an interface with the internal pneumatic activation device that enables movement of the gripper fingers from the unlocked position shown in FIG. 1 to a locked position. Further, in various embodiments, each hook portion 118 includes a flange 126. The flange 126 may be an orthogonal outcropping on each side of the hook portion 118. Each of the flanges 126 on the different hook portions 118 (six flanges 126 here in total) may further include a front edge 128 at the top of each flange 126. The front edge 128, which is generally facing in a radial outward direction toward an edge of the end effector 110, may include an inclined wall 130 between the front edge 128 and the elongated portion surface 132. In various embodiments, the inclined wall 130 may be present to align with a complementary feature on a gripper interface of a part when the gripper pneumatically locks onto the part.

In sum, each gripper finger 102a-c in this embodiment includes a receptacle 114 facing radially outward (for subsequent alignment with a complementary member), an opposing pair of flanges 126 in a generally transverse direction to the elongated portion 112, for each flange 126 of the pair on the hook portion 118, a front edge 128 also facing outward and an inclined wall 130 between each flange 126 and a surface of the elongated portion 112. In various embodiments, each of the three elongated portions 112 may also include a pair of opposing side members 112a that are coupled to the respective hook portion 118 for the particular finger gripper 102a, 102b or 102c. The elongated portion surface 132 may extend to include these side members 112a, enabling the inclined wall 130 at the front edge 128 of each flange 126 to be coupled to the elongated portion surface 132 via this extension of the elongated portion 112 (i.e., the side members 112a included in this embodiment as part of the elongated portion 112).

In various embodiments, each hook portion 118 may include a flange 126 that includes a front edge 128 on each side of the receptacle 114. The receptacle 114 may be positioned, during outward translation, to align with a complementary protrusion on the gripper interface as described in subsequent embodiments. It should be noted that in FIG. 1, the gripper fingers 102a-c are effectively in the "unlocked" position as identified by the sensor in the sense that the fingers are not secured to another part, and therefore any outward radial movement of the type described has yet to occur. Rather, the geometry of the three hook portions 118 is contoured so that the portions 118 fit snugly in the middle region of the end effector 110, which conserves room and ensures that that gripper can fit within smaller spaces.

Referring still to FIG. 1, the end effector 110 may include another advantageous feature for eliminating or minimizing damage to the parts during the movement. As can be seen at the edges of the end effector 110 between different ones of the gripper fingers, 102a-c, three support structures 106 may be positioned. The geometry of the support structure 106 may vary based on different robotic grippers. Each support structure is selected so that it is sturdy enough to endure a force caused by a collision, whether or not intentional. Each support structure 106 includes a dedicated contact region 108. The first movement in the part gripping process, addressed in more detail below, is the approach of the part by the end effector of the robotic arm, and then contact. The portion of the end detector 110 that houses the equipment of FIG. 1 uses a sensor as noted to approach a gripper interface built into the part (described below). The result of this initial action is that some portion of the gripper interface comes into contact with the gripper interface. The three support structures 106, which may be concentrically arranged around the end effector 110 gripper surface, come into contact with the part primarily via the contact region 108 on the upper surface of each support structure. Two of three support mounts 119 can be seen in this embodiment, with the third obscured from view. In various embodiments, the support mounts 119 may be a block of rubber or another material that can be used to provide support for either the end effector 110 or the part in the event of an unintended collision. The support mount 119 may also be fastened securely to each side of the end effector and, in some cases depending on the material from which they are made, they may also provide a stabilizing effect to the robotic gripper.

Atop the contact region include dome-like protrusions 104. In the embodiment of FIG. 1, there is one such protrusion 104 for each contact region 108. In various embodiments, the function of each protrusion 104 is to prevent excessive motion of the part during assembly after the corresponding gripper 102a, b, or c is released and just prior to extraction of the robotic gripper 100 along the z-axis (perpendicular to the end effector surface in this example. The protrusions 104 work by providing a protruding male feature on the surface of the robotic gripper 100, such that, as shown below, a matching or complementary female feature may be built into the part on the gripper interface. Under normal operation, these respective protrusions 104 and female features have no contact. However, if deflections from ongoing assembly operations on the part in question after robotic gripper 100 release cause excessive deflection of the part that exceed a nominal amount, at least one of the protrusions 104 can enter a complementary feature constructed into the gripper interface. Thus protrusion 104 can inhibit excessive deflection and can allow the angled gripper fingers 102a-c to be extracted without snagging on the part or the gripper interface.

FIGS. 2A, 2B and 2C are top 200a, perspective 200b, and side 200c views of exemplary gripper fingers 200a-c, respectively, with a complementary portion of an effector interface as described below. Referring first to gripper finger 200a, the elongated portion 212 is easily visible, as is the elongated portion surface 232 and the receptacle 214 used to align with a complementary protrusion (not shown) on the gripper interface during locking. Hook portion 218 is illustrated as well with flanges 226 on each side, and front edges 228 extending at least partially along the flanges 226. Fastener openings 216a may allow an aligning set of fasteners, e.g., from the end effector aperture of another structure below the gripper finger 200a to lock into place and move the gripper finger 200a using the fastener openings 216a.

Various geometrical settings are displayed that may be pertinent to rotational stability, stiffness, and other requirements of the gripper fingers 200a-c. For example, the front edges 228 may form straight lines on either side of the receptacle 214 and, when measured around the rear of the hook portion 218 the lines may form an angle of B degrees, as shown in FIG. 2A. In like manner, referring to FIGS. 2A and 2B, the mouth 224 of the receptacle 214 forms either a width or an angle of A, depending on the shape of the receptacle 214, for example.

The perspective view of the gripper finger 200b of FIG. 2B also includes some additional views of the hook portion 218 not directly available from the top view. The inclined wall 230 at flange 226 meeting the front edge 228 and an elongated portion surface 232 shows that the inclined wall 230 may form an angle with the elongated portion surface 232 of less than 90°. In addition, an inner portion of the receptacle 214 including an inner wall 226 of the receptacle 214 is viewable in FIG. 2B as well.

An exemplary perspective view of gripper finger 200b in FIG. 2B shows many of the same features, including that the receptacle 214 may include a mouth 224, with the dimensional width A of the mouth shown in FIG. 2A and FIG. 2C. Similarly, the gripper finger 200c in FIG. 2C shows a side view of the gripper finger of FIGS. 2A and 2B. A noteworthy point that may be underscored in FIGS. 2B and 2C is that the hook portion 218 can either be a separate member that is adhered to the elongated portion 212 using some adhesive or fastening mechanism, or in some embodiments hook portion 218 can be integrally formed with, and in effect can be the same part as, the elongated portion 212. By way of example, if the gripper fingers 200a-c are additively manufactured, e.g., using a laser or electron beam powder-bed fusion process or some similar technique, it may be more sensible to form the elongated and hook portion as one geometrically integral member in order to maximize the forces that it could withstand, although this is not required.

The view of the gripper finger 200c in FIG. 2C also includes a side view of the inclined wall 230 and the front edge 228. As shown in FIG. 2C, the inclined wall 230 may form an angle C° with the elongated portion surface 232. The side view of gripper finger 200c also shows the side of the fastener openings 216a, albeit not necessarily to scale.

Figure 12:
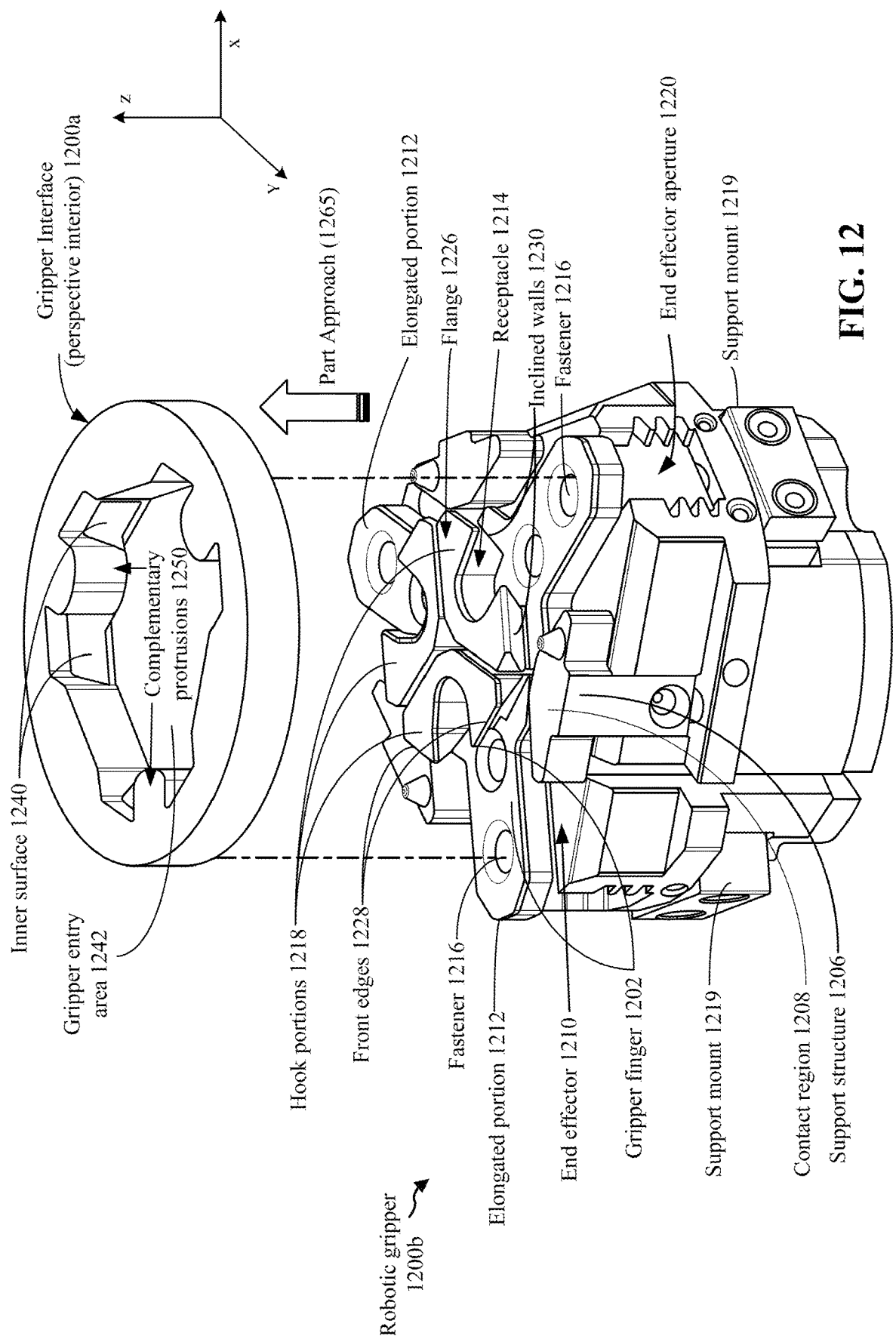
FIG. 12 is a perspective view of an example robotic gripper approaching a gripper interface for making contact.

As described below, the inclined wall 230 and its analogous portions on various parts of the different gripper fingers can be used to assist with the alignment of the gripper and also to provide an optimized set of properties using appropriately calculated dimension/angles A, B° and C°. By way of example, in the embodiments of FIGS. 1 and 2, rotational stiffness about a z axis orthogonal from the perspective of a part to an approaching gripper may be provided by varying the feature dimension A (width of the aperture) and angles B° and C° to provide the gripper fingers 200a-c with three exemplary resistive functions. As another example, the overturning stiffness about hypothetical x and y axes perpendicular to z and generally parallel to the face of the robotic gripper, generally refers to the resistance of the part held by the gripper to rotating about one of the x or y axes. As an example, the cartesian graph on the right of FIG. 12 shows x, y and z axes relative to the part approach 1265. This overturning stiffness can generally be optimized (that is, made as high as possible without reducing other critical parameters faced by the engineer) by adjusting feature angles B° and C°, or the angle around a posterior of the receptacle (FIG. 2B) as delimited by the front edges 228, and the angle between the inclined wall 230 and elongated portion surface 232 (FIG. 2C). In one embodiment, stiffness may ideally be limited to about 0.02° for optimal quality control. It should also be noted that tight tolerances of dimension A and angle B helps provide higher repeatability along with higher rotational stiffness. Tight tolerance of C also provides axial stiffness and overturning stiffness, as well as reliable contact of the support structures 106 and contact regions 108 (FIG. 1).

The above factors may be taken into account during the assembly of the CAD model in the case where the robotic gripper 100 is 3-D printed. The gripper fingers 200a-c also may be designed in some embodiments to provide repeatable positioning of the part being gripped. Repeatability and ability to position features on demand can, over the long haul, lengthen the life of the gripper. Repeatability also allows for a more accurate prediction of where the part will be located in space relative to coordinates. This knowledge may allow for smaller variation ranges, which allows the engineer to create a smaller scan patch size for measuring metrology features.

In addition to the above factors, one significant benefit of many of the embodiments herein is their ability to tolerate print (or other part) inaccuracies in embodiments including 3-D printed parts for assembly. With the use of the three concentric fingers that expand outward to form the generally-wedge shaped geometry, a "slop-free" engagement can be realized with a gripper interface, since the manufacturer in these cases need not rely on ultra-high precision fits, or perform conventional methods by contacting a wall using a pin/hole fit (neither of which are achievable options when the part is in the as-printed condition). Thus, the system herein is able to absorb print inaccuracies which may range on the order of several millimeters, for example. Another key benefit of the gripper herein over conventional grippers is strength. Given the mass of some of these parts, it is not surprising that strength (or lack thereof) may act as a key constraint to conventional grippers. For example, in contrast to many conventional gripper systems, the gripper systems herein rely on a single contact point to carry, lift, move and otherwise manipulate large assemblies.

The contact point may be otherwise vulnerable to deflection as a result of adhesive joining forces between the gripper and the interface. The three grippers 102a-c are formed from durable materials such as metal alloys for top performance. The three grippers complement each other to avoid stability problems, and can provide significant lift strengths so often needed for gripping heavy parts and the multiple applications of robotic grippers. In addition, in some embodiments, the gripper systems described herein have a "push back" mechanism on retraction, meaning that the large joining strengths can be resisted immediately upon retraction of the gripper. That is to say, when the lock is released, the end effector can be configured to push the gripper fingers away from the part to ensure that the part does not inadvertently adhere to the robotic gripper.

Other key benefits of the grippers described herein include vision friendly lead-ins, with several millimeters of clearance in some cases. Thus, using sensors and imagers in some embodiments, the gripper can be carefully and accurately maneuvered to reach its target.

Figure 3:
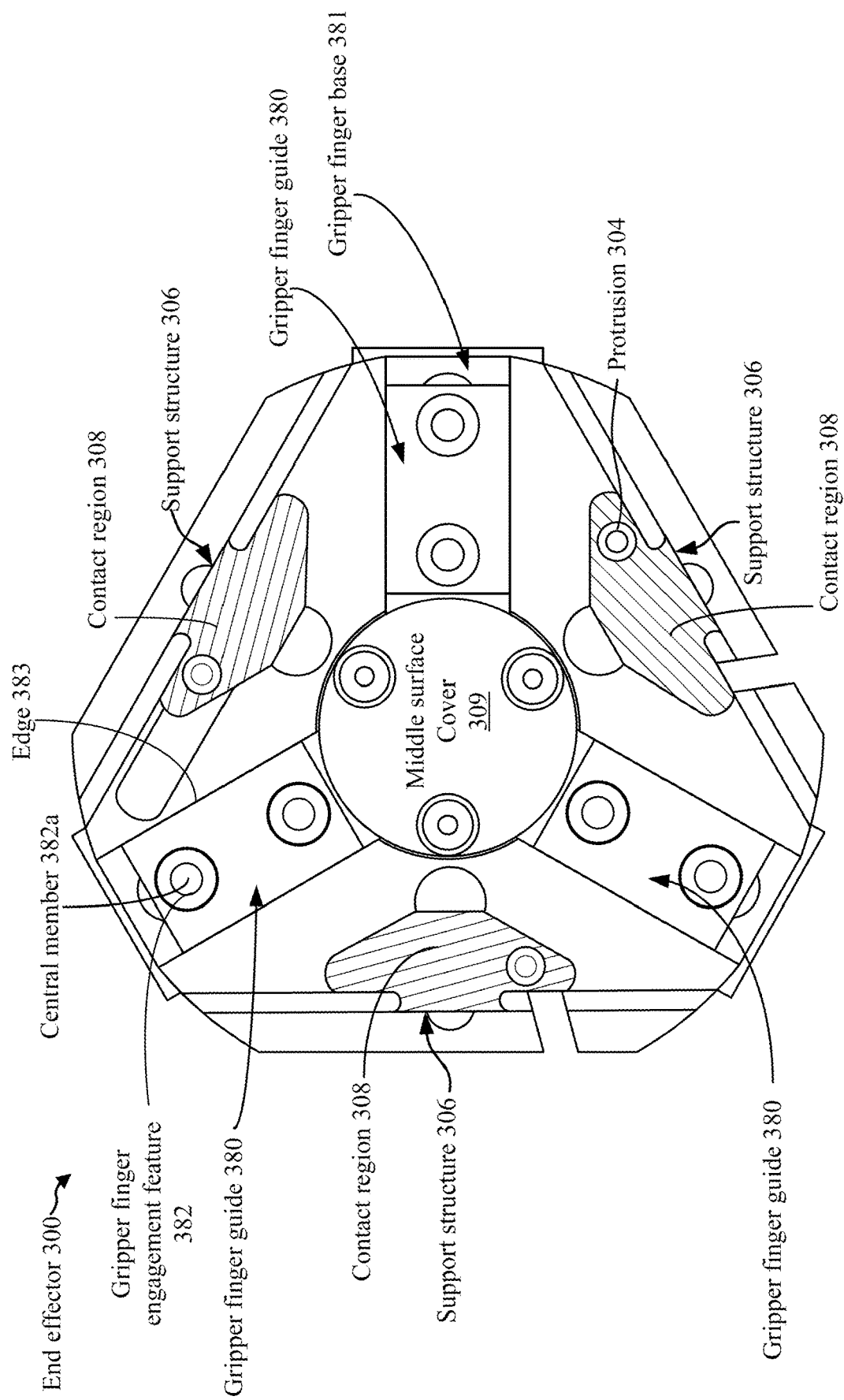
FIG. 3 is a view of a top surface of an exemplary end effector.

FIG. 3 is a view of a top surface of an exemplary end effector 300. For clarity in this embodiment, certain structures including the gripper fingers have been omitted from view. End effector 300 includes three gripper finger guides 380 strategically placed in radial regions starting from the center of the end effector 300 to a region close to the perimeter of the end effector 300. In various embodiments, the gripper finger guides 380 are sized to fit into the radial apertures underneath (see end effector aperture 120, FIG. 1). Each gripper finger guide 380 is designed to hold one gripper finger (not present in the figure) in place on top of it. In some embodiments, the gripper fingers are configured to receive pneumatic pressure to enable them to slide radially along a gripper finger base 381 when actuated by a controller. The gripper finger base 381 is securely positioned under the guide and is immobile. Each of the gripper finger guides 380 are configured to attach to one of the three elongated portions 112 (FIG. 1). Each gripper finger guide 380 includes two gripper finger engagement features 382. The gripper finger engagement features 382 can be fastened to each respective elongated portion 112 via fastener 116 (FIG. 1) so that, in these embodiments, the gripper fingers 102a-c (FIG. 1) are designed to translate radially outward with the gripper finger guides 380 when pneumatic actuation occurs.

In various embodiments, each gripper finger guide 380 may further include one or more rails or edges 383 on the sides of each gripper finger guide 380 to enable the gripper finger guide 380 to more easily maintain restricted motion along the axial direction during locking and unlocking. In various embodiments, the two gripper finger engagement features 382 on each gripper finger guide 380 may be aligned with the two fasteners 116 so that they may connect to the two fasteners on each of the gripper fingers 102a-c. In some embodiments, the two gripper finger engagement features 382 on each gripper finger guide 380 may also be coupled to motor or actuator circuits that may be present in the end effector aperture 120 regions (FIG. 1). With an appropriate servomotor or other actuator circuit present in the end effector aperture 120 regions to move the gripper finger engagement features 382, the actuators may easily move the respective gripper fingers 102a-c via the fasteners 116 to which the gripper finger engagement features 382 are coupled. This configuration may allow for controlled movement (e.g., outward radial translation) by using pneumatic pressure to translate the gripper fingers 102a-c outward to enter into the locked mode, and to retract the gripper fingers 102a-c when moving to the unlocked mode. Further, the gripper finger guides 380 may be used to keep the elongated portions 112 moving in the correct direction (via the fasteners 116) depending on whether locking or unlocking is desired. It will be appreciated that the pneumatic pressure mechanism may be replaced by another method of power in some embodiments. Further, the gripper finger guides 380 in some embodiments may themselves be part of the gripper fingers 102a-c. For example, in these embodiments, the gripper finger guides 380 may be built into the elongated portions 112 of the corresponding gripper fingers 102a-c. In some arrangements, the gripper finger bases 381 may be used to assist the pneumatic actuators in providing the correct amount of force for the gripper fingers 102a-c. In other cases, the gripper finger bases 381 may not be required, or they may be present but only for support purposes.

FIG. 3 also shows a middle surface cover 309 that may be used as a supporting surface to place the hook portions 118 of the respective gripper fingers 102*a-c*. Thus, for example, a hook portion 118 of a gripper finger 102*a* may extend from a region near a middle edge of the end effector 300 and up onto the middle surface cover 309, where it meets the other hook portions 118. When the device is unlocked, e.g., the hook portions 118 are seated partly or completely on the middle surface cover 309, the hook portions 118 may be contoured (see, e.g., FIG. 1) so that they take up very little room on the robotic gripper 100, thereby minimizing the size of the gripper. In various embodiments, the middle surface cover 309 may also be used to provide support for the actuators.

FIG. 3 also shows the respective support structures 306 and the cross-hatched contact regions. The contact regions can be used to make contact with the part during the initial approach by the part to the gripper interface located on the part. In various embodiments, the contact regions 308 can just be designed high enough relative to the other structures on the end effector that the contact regions 308 are likely to contact the part before other features. The contact regions 308 may be flat so as to minimize any sharp edges affecting the part or the gripper interface. As noted above, a principle surface of the crossed-hatch areas in accordance with this embodiment is to provide a predictable and repeatable surface upon which the relevant portions of the gripper interface or the part may rest when the robotic gripper approaches the gripper interface to effect the gripping function, as described below. These predictable regions also help ensure proper engagement of the gripper fingers 102*a-c*, in part because the flat repetitive contact regions 308 add stability to the end effector 300 as the gripper fingers 102*a-c* are actuated from their unlocked position.

Thus, in the exemplary embodiment of FIG. 3, the gripper finger guide 380 is placed in a secure region above the end effector aperture (such as, for example, atop the gripper finger base 381) and the gripper finger's elongated version 112, located in turn on each respective gripper finger guide 380, can be translated radially outward and returned using the power provided to the elongated portions 112 by the gripper finger engagement features 382, each of which may be further attached to the respective fastener 116 on one side and to the actuators/motors on the other side. For example, the elongated portion 212 in FIGS. 2A and 2B includes fastener openings 216*a* which serve as the basis for each fastener 116 (two on each gripper finger 102*a-c*). In various embodiments, the central member 382*a* of the gripper finger engagement feature 382 may act as the fastening element in the middle of fastener 116 (FIG. 2). That is, the central member 382*a* may protrude through the openings 216*a* (FIG. 2) and may be secured after passing therethrough (via adhesive, treads, or otherwise) to form each of fasteners 116 in FIG. 1. The gripper finger guide 380, the gripper finger engagement features 382, or either one of those, may be powered to provide pneumatic or other electrical power to the gripper fingers 102*a-c* to allow the gripper fingers to translate in either direction as necessary. Other embodiments are possible. FIG. 3 also shows the protrusion 304 atop the contact region 308 of the support structure, discussed further with reference to FIG. 4.

Figure 4:
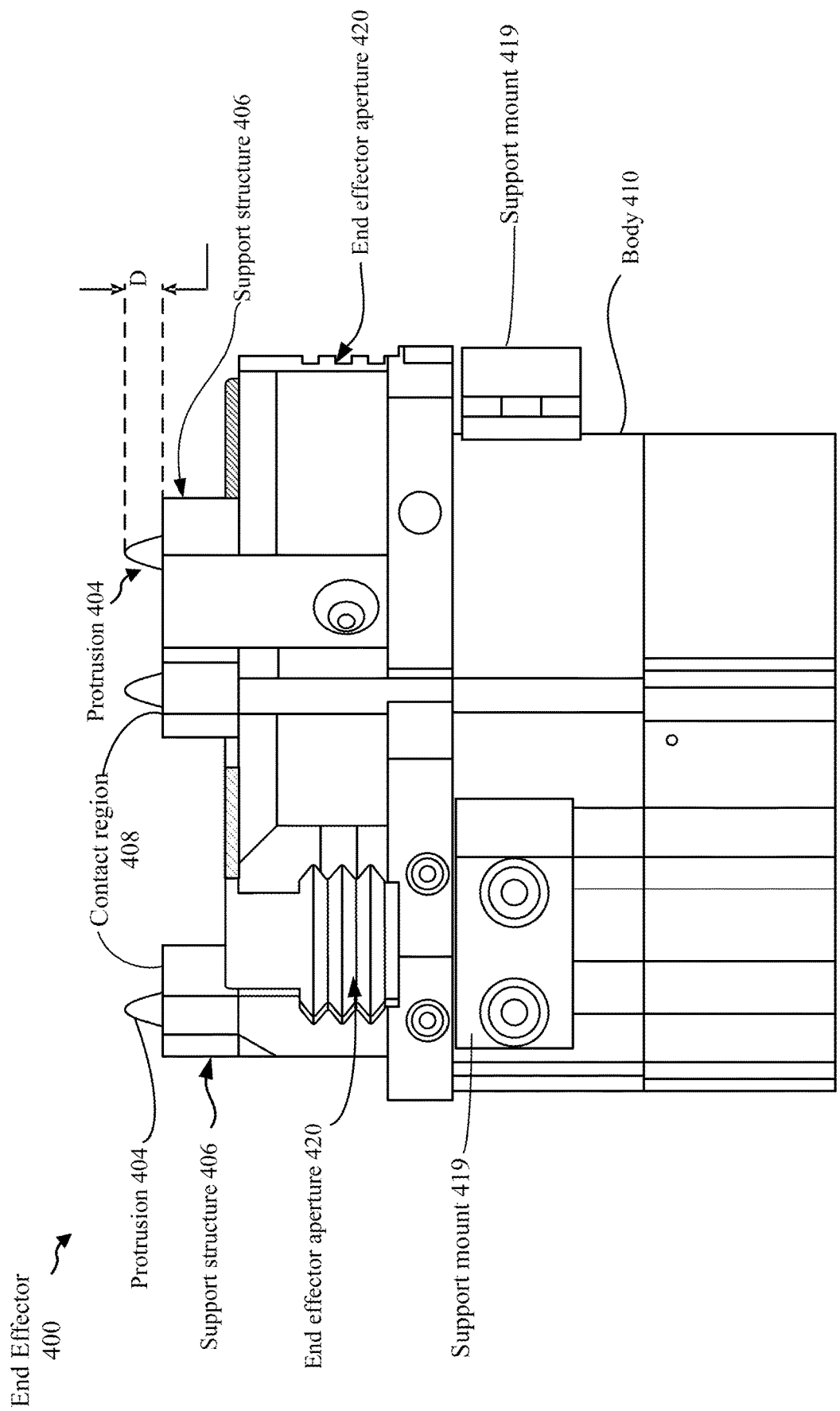
FIG. 4 is a side view of an exemplary end effector.

FIG. 4 is a side view of an exemplary end effector, such as the end effector 300 of FIG. 3. The end effector 400 includes a clearer view of end effector aperture 420, over which the gripper finger guide 380 is placed in the embodiment of FIG. 3. In some embodiments as noted, a base of the gripper fingers 102*a-c* may be placed directly in a slot within the end effector aperture 420 or in additional embodiments, the gripper finger base 381 (FIG. 3) may instead be secured over the end effector apertures 420 (3 such apertures in total). In some arrangements, the gripper finger guide 380 may be inserted at a top of the aperture (with or without the gripper finger base 381, and in some cases, using a rail or metallic edge 383 on each side of the guide as described in FIG. 3. As described, the gripper finger guides 380 may be used to contact the corresponding gripper fingers 102*a-c* (FIG. 1) to guide the gripper fingers 102*a-c* radially inward or outward during movement.

The end effector apertures may provide area for the mechanical structures and/or pipes or lines necessary to provide electrical, mechanical or pneumatic power to the gripper fingers 102*a-c* and the end effector 400. FIG. 4 also includes the support mounts 419, which may be made of rubber or a softer material to avoid scratching or damaging parts while the end effector 400 is moved. In other embodiments, the sides of the end effector may include one or more flexible hoses (not shown), tubes, or wires, near the perimeter of the end effector 400 to carry pneumatic fluids or electric power, for example, to the robotic gripper as needed.

As noted with reference to FIG. 1, each of the support structures 406 may include a protrusion 404 stemming from the contact region 408 of the support structure 406. The protrusion, also shown as protrusion 304 in FIG. 3, may be a dome-like protrusion that can be used to inhibit excess motion, for example, in the event that during the retraction process when the grippers 102*a-c* are returning inward to the middle region of the end effector 400 and the part suddenly moves excessively (e.g., beyond a threshold movement or rotation) relative to the robotic gripper 100, one of the protrusions 404 closest the part or gripper interface can act as an "anti-snag" feature. FIG. 4 shows a side view of this feature, while FIGS. 3 and 1 show a top view. As noted, the anti-snag feature of this protrusion 404 is designed to prevent motion of the part during assembly of the part and after the gripper is released but prior to the extraction of the gripper along the z axis (orthogonal to the plane of the end effector facing the gripper interface). The anti-snag feature functions by providing the male protrusion 404 in three different places, one on each of the contact regions 408 of the support structures 406, together with a matching female complementary feature 1144 (see, e.g., FIG. 11) on the gripper interface 1100. While during normal operation these complementary features do not ordinarily come into contact, in an assembly deflection exceeding a nominal amount following retraction of the gripper fingers 102*a-c* as described, the anti-snag feature (protrusion 404) brought inward closest to the part as a result of the movement may temporarily engage the complementary (female) feature on the gripper interface. Once the two are mated, further deflection is prevented, and the gripper fingers 102*a-c* can thereupon continue to be retracted with little or no chance of snagging on or causing damage to the gripper interface. In some embodiments discussed above, the gripper fingers can accelerate suddenly to move quickly away from the gripper interface to avoid adhering to the gripper interface. In other embodiments, this can also be done by forcefully causing the end effector to move away as a unit from the gripper interface.

In addition to showing the side view of the end effector, including the body 410, FIG. 4 also shows two of the support mounts 419. In addition to providing further structural integrity, the support mounts may also be used to buffer any inadvertent collisions between the end effector and the part or another object. Further, the height D of one of the protrusions 404 is shown. Typically, a tight tolerance of dimension D helps ensure that the anti-snag nature of the protrusion 404 will function consistently and predictably.

One advantage of using a pneumatically actuated, centric style, three gripper finger robotic gripper as described above is that these features may permit precise outer diameter and inner diameter gripping of work pieces. In various embodiments, the gripper may be combined with a sensor, which may also include a controller or may rely on a separate controller, to indicate when the gripper is locked and unlocked, along with other possible functions.

To meet a larger clearance requirement, a manufacturer may desire to increase the length of the overall travel of gripper fingers beyond what COTS elements can provide. Accordingly, in various embodiments, to increase overall gripper finger travel, washers may be placed between the coupler and the piston head of the gripper 100. These washers can effectively increase the distance the piston can travel.

Figure 5:
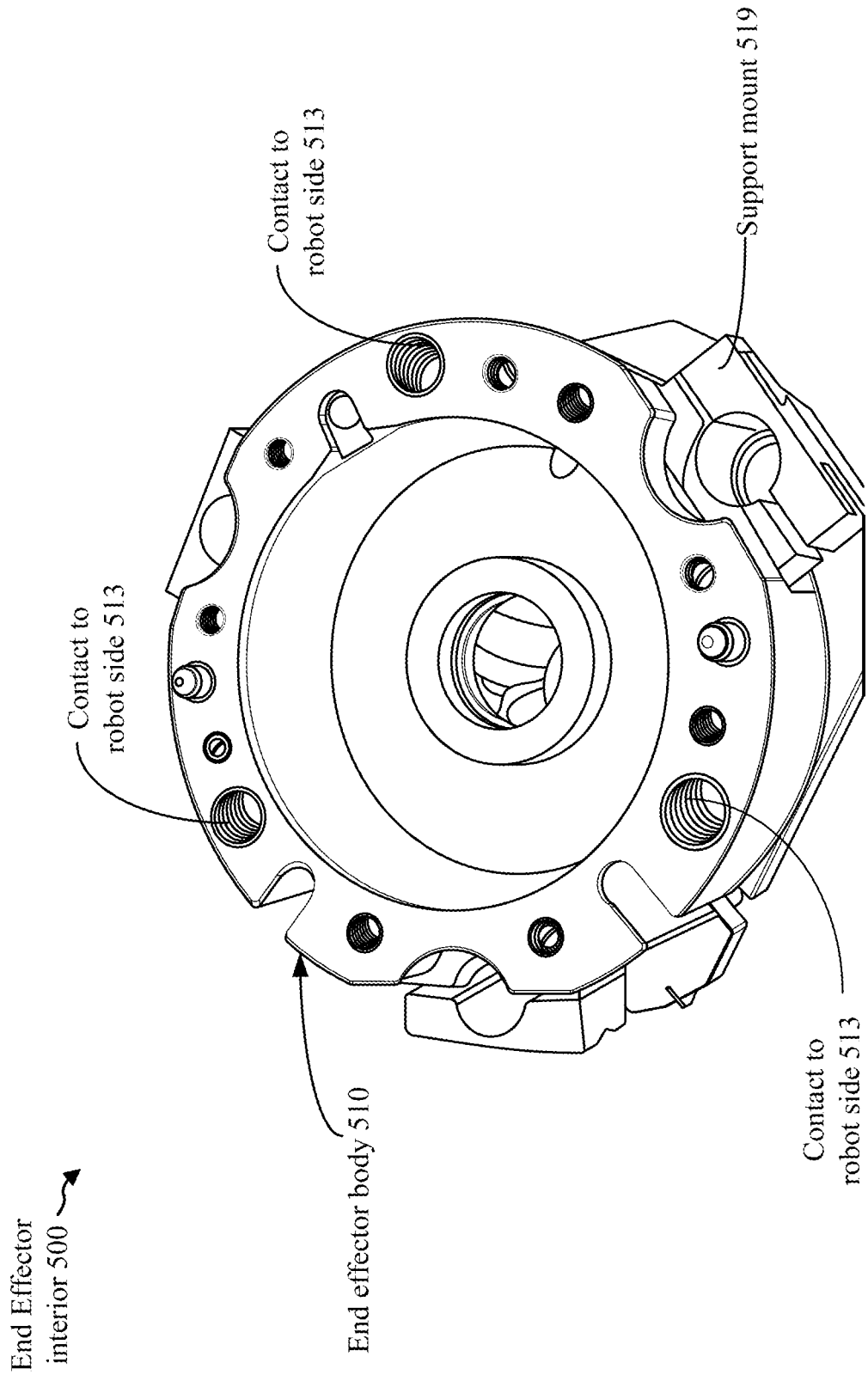
FIG. 5 is an interior perspective view of an exemplary end effector with gripper mechanism facing down.

FIG. 5 is an interior perspective view of an exemplary end effector 500 with gripper mechanism facing down, i.e., into the page. The interior area of the end effector body 510 can be used to provide sufficient room to house the various mechanical elements that may be needed to assist in the pneumatic activation of the gripper fingers or the presence of any electronics, tubes, etc. In some embodiments, heavy duty threads may be included to facilitate attachment to the robot side, e.g., in features to contact to robot side 513. In other embodiments, the interior may remain hollow to minimize mass.

Figure 6:
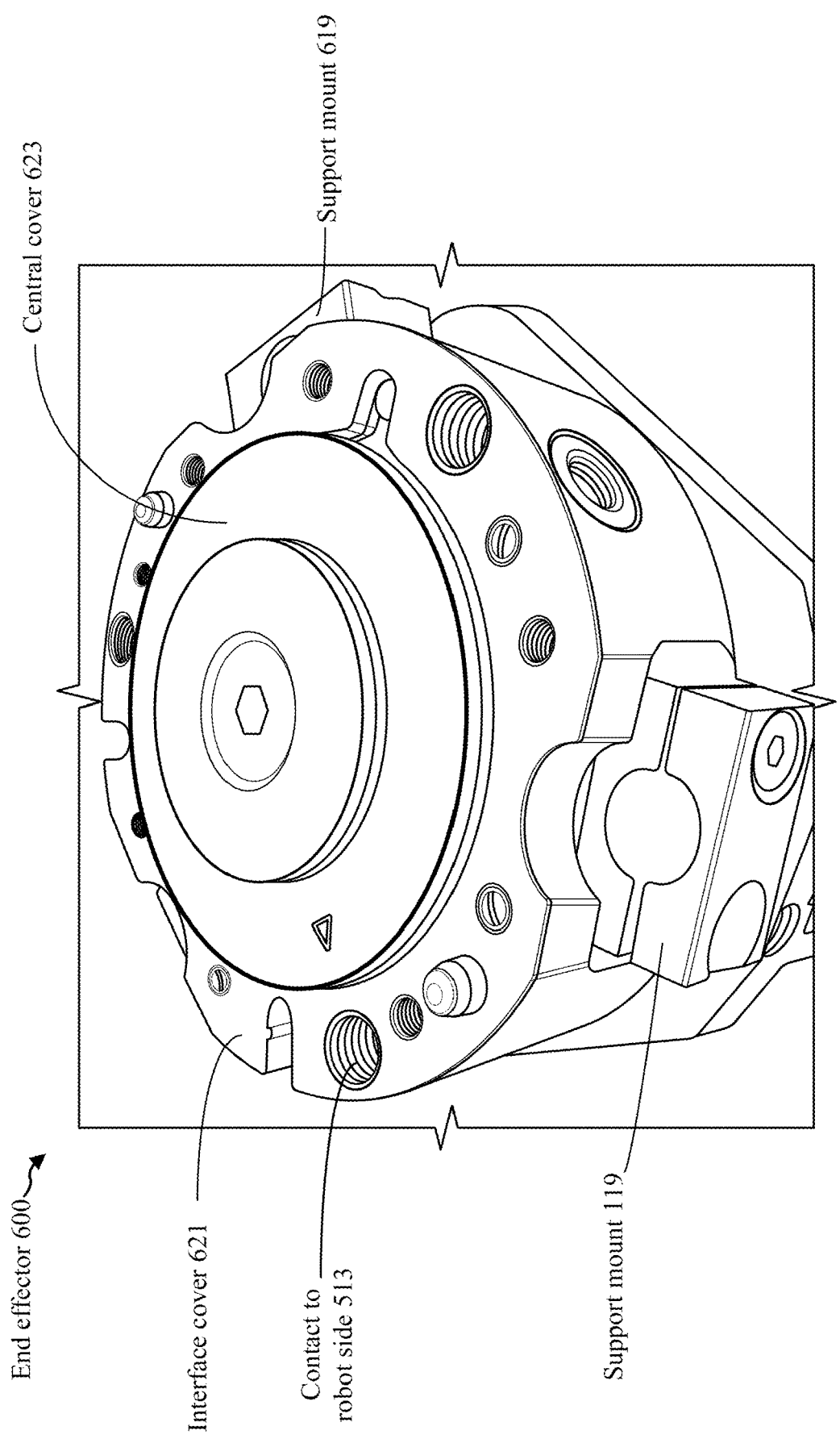
FIG. 6 is a perspective view of the exemplary end effector with the top side facing the robot.

FIG. 6 is a perspective view of the exemplary end effector 600 with the top side facing the robot. This portion of the end effector, with the upper region toward the robotic arm, appears to be similar to the end effector representation 500 in FIG. 5. Here, however, a heavy duty central cover 623 is mounted, via threads or otherwise, in the central region. The heavy duty contact threads 513 remain on the outer perimeter, as do various apertures that may be used for a combination of connection purposes and for routing one or more wires or fluids originating from the robotic arm. The support mounts 119, this time in an inverted position, are also in view.

Figure 7:
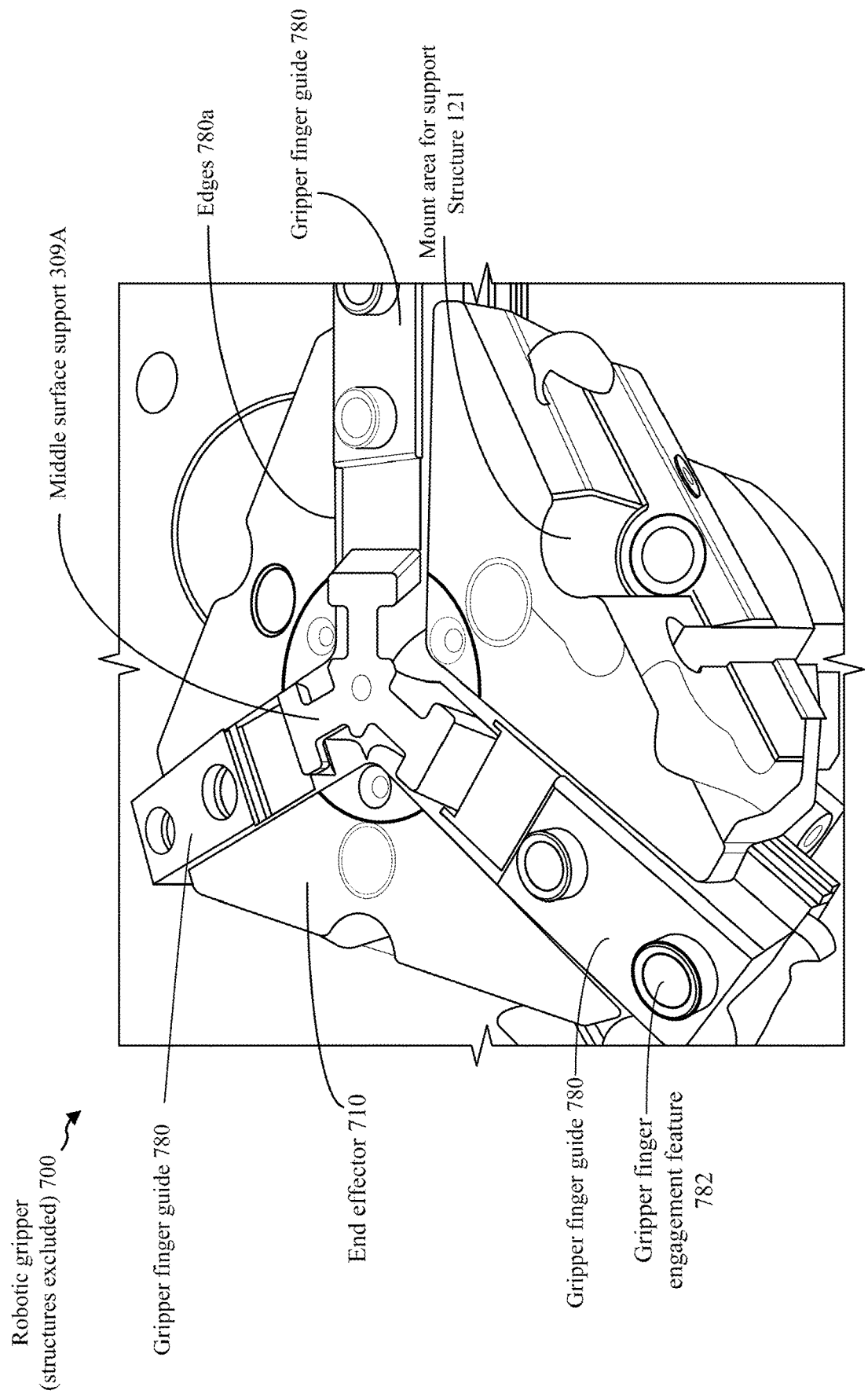
FIG. 7 is a perspective view of an exemplary robotic gripper shown without the gripper fingers and certain structures.

FIG. 7 is a perspective view of an exemplary robotic gripper shown without the gripper fingers and certain structures associated with the same. The embodiment of FIG. 7, for example, shows middle surface support 309A, which may be the structural foundation that resides under the middle surface cover 309 in FIG. 3. Further shown are three gripper finger guides 780, which may be used to house the gripper fingers 102*a-c* in a manner discussed earlier with reference to FIG. 3. In the embodiment shown, two of the three gripper finger guides 780 include a pair of gripper finger engagement features 782. The third gripper finger guide 780 just shows the openings where the gripper finger engagement features 782 would reside. The gripper finger engagement features 782 may protrude up through the opening in the gripper finger openings 216*a* shown in FIGS. 2A and 2B. As noted, a third gripper finger guide 780 toward the perspective rear of FIG. 7 is shown without the protrusions. Each of the gripper finger guides 780 may be mounted along the edges 780*a* of the metal apertures and may be translated inward and outward in various ways, including via the embodiments discussed above. The gripper fingers 102*a-c* may be mounted on the gripper finger guide 780, with the gripper finger engagement features used for attaching to the fasteners on the gripper fingers. In addition, a mount area for the support structure 121 appears on each side of the triangular-shaped gripper. The mount area for the support structure 121 further includes an internal aperture, which may in various embodiments be used for routing wires or fluid into or out of the end effector, e.g., to provide force for the actuation or electrical power for a controller, sensor or similar device.

Figure 8:
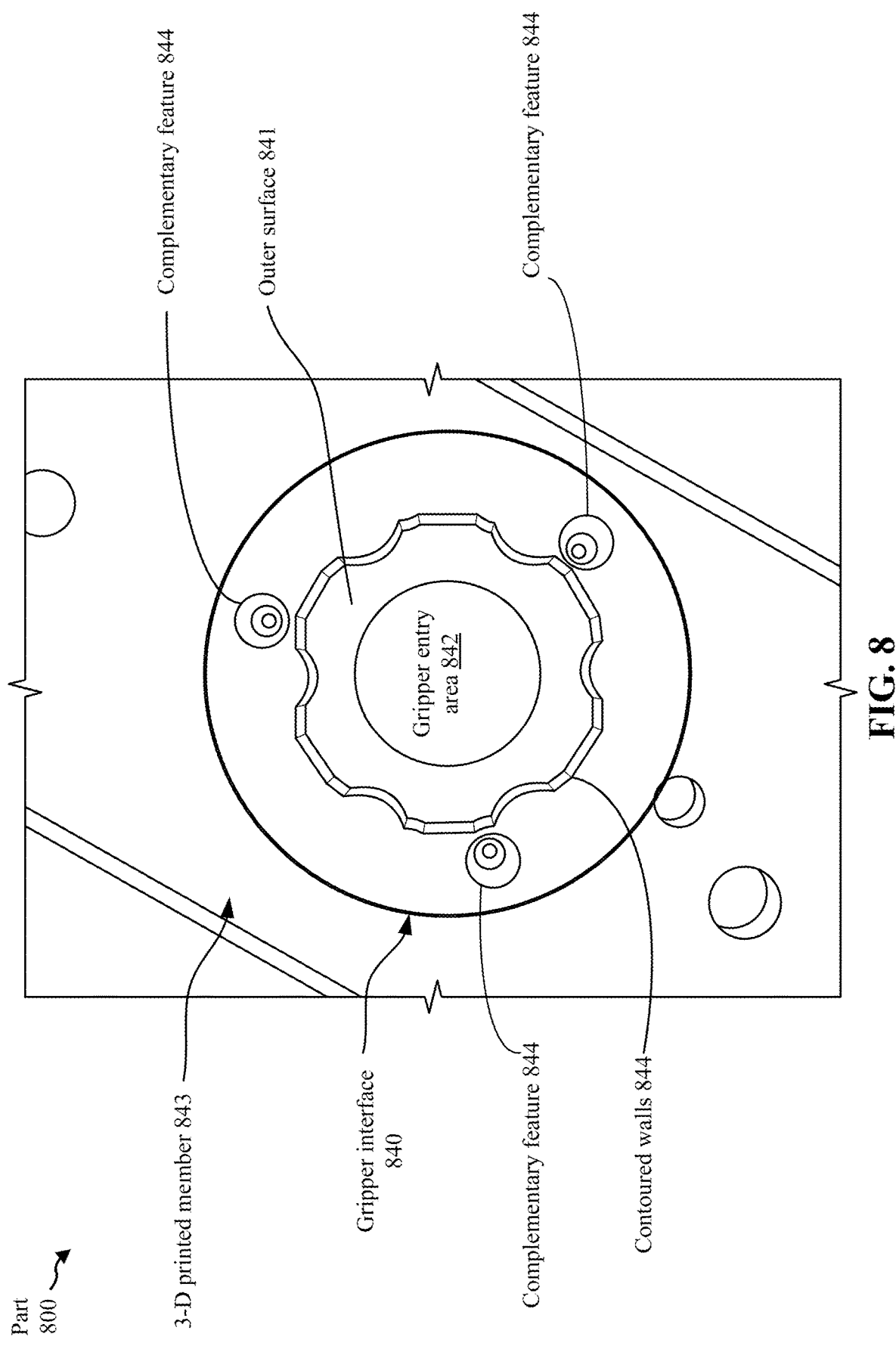
FIG. 8 is a perspective view of an exemplary part within which a gripper interface is embedded.

FIG. 8 is a perspective view of an exemplary part 800 within which a gripper interface 840 is embedded. The part 800 may be any portion of the structure that can practically be accessed, taking into account the mass distribution and relative size of the part 800, for example. The representation of FIG. 8 shows the outer surface 841 of the gripper interface 840. The "outer surface" means that the gripper interface 840 is seen from the perspective of an individual looking at the outside of the part 840. The gripper interface 840 may include three complementary features 844 that respectively correspond to the three protrusions 404 (FIG. 4) on the robotic gripper and that were discussed earlier with respect to inadvertent movement of the robotic gripper 100. As described, the complementary features 844 can advantageously inhibit the part from excess motion if it moves in an amount that exceeds a threshold just after the gripper fingers 102*a-c* are retracted. The part 800 may also include contoured walls. The contoured walls 844 and the gripper interface 840 in general are designed to match the features of the gripper finger geometry described above.

In various embodiments, the gripper interface 840 may be a 3-D printed member 843. In some cases, the part has been built using machining, additive manufacturing (AM), or some combination thereof. The gripper interface 840 may also be constructed into the part 800 using machining, casting, tooling, extruding, incorporation of COTS parts, or any available manufacturing technique. Building the gripper interface 840 using 3-D printing (additive manufacturing) has a number of advantages. First, being geometry agnostic, a 3-D printer can render just about any necessary custom design to match the characteristics of the robotic gripper. Second, given that strength of the interface is important, a manufacturer can use the strongest possible materials conducive to use in 3-D printing, such as various alloys or compounds that exhibit great strength. While material selection is possible using machining or COTS parts, the selection of possibilities is likely not as diverse. A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Atomic Diffusion Additive Manufacturing (ADAM) is still another recently developed technology in which components are printed, layer-by-layer, using a metal powder in a plastic binder. After printing, plastic binders are removed and the entire part is sintered at once. Another of several such AM techniques, as noted, is DMD or direct material deposition. More common types of AM may include powder bed surface or PBF-based printing in which layers of powder are deposited on substrate in a powder bed. Between each deposition cycle, a laser or energy beam source may scan the desired cross-section of the build piece to melt, and then solidify, the appropriate area. The 3-D printing can result in a versatile build of a gripper interface 840 that falls well within the required tolerances of a gripper. Still other printing types, such as fused deposition modeling (FDM), may also be used to manufacture the print interface.

One advantage of the robotic gripper disclosed herein is that, unlike many conventional systems which need to access the part at multiple points (potentially due to a relative weakness in the gripper or the interfaces when compared with the part), the gripper/interface system described herein may be manufactured in a manner such that only one gripper is necessary to move, carry or manipulate the part. Among efficiency benefits and lower power costs, this also means that more robots can simultaneously work on the part as necessary. Thus, as the part is held and slowly rotated by the robotic gripper, processes like polishing, drilling, sanding and/or other tasks can be performed in parallel since the single-point contact provides room for these multiple assembly operations. In cases where extremely strong, dedicated or precise gripper interfaces are necessary, the gripper interface can be tooled as noted above, although most forms of PBF printing can rival the strengths of existing tooling techniques simply by using the correct alloys.

Figure 9:
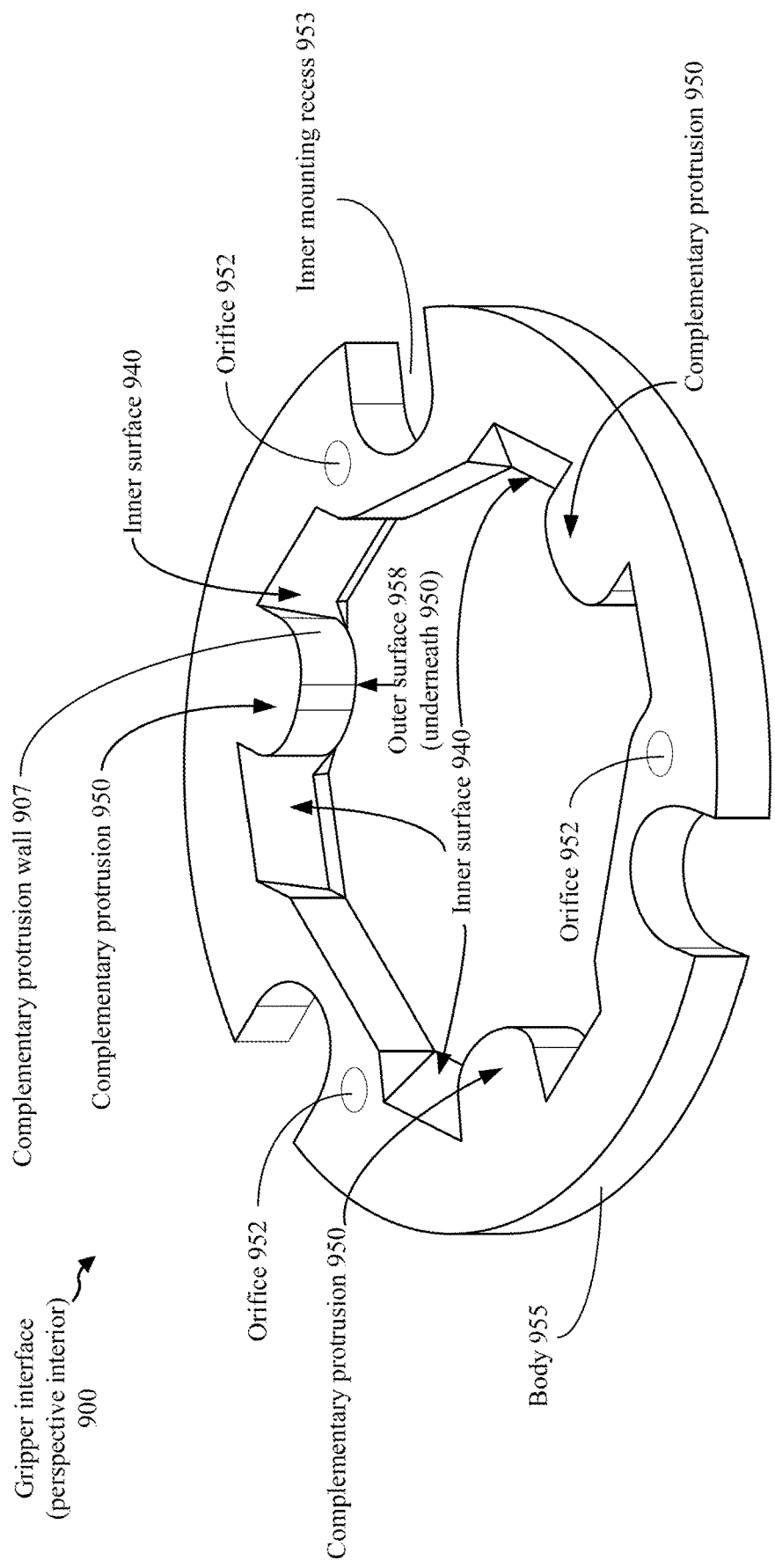
FIG. 9 is a perspective view of an exemplary gripper interface showing an inner surface thereof.

FIG. 9 is a perspective view of an exemplary gripper interface 900 showing an inner surface thereof. For simplicity, the part that would ordinarily be surrounding the 3-D printed device is omitted. Unlike the gripper interface 840 in FIG. 8, the inner surface 940 of the gripper interface 900 in FIG. 9 is shown. Inner surface 940 is the region of the internal surface that is interior to the part. The gripper interface 900 in FIG. 9 may initially be a CAD model representation of the interface, until the CAD model is printed using a suitable 3-D printer. The body 955 of the gripper interface 900 is generally circular in nature, and includes three inner mounting recesses 953 that can be mounted or adhered to the part (not shown) to provide a strong grip. The interior portion of the gripper interface 900 includes three complementary protrusions 950, meaning that they are complementary relative to the receptacles 114 within which the protrusions 950 are positioned to adhere upon being locked. Thus, as shown below, when the gripper fingers 102a-c are being translated outward to be actuated, the receptacles 114 in the hook portions 118 can come into alignment with the corresponding complementary protrusions 950 on the gripper interface 900.

FIG. 9 further shows a number of inner surfaces. The inclined walls of that are part of the hook portions 118 may be configured to align with these inner surfaces to ensure that a snug fit is obtained when the gripper fingers are locked. Thus, in addition to the alignment of the complementary protrusions 950 into the respective receptacles 114 of the hook portions 118, the inclined walls (130 and 230 of FIGS. 1 and 2) associated with the robotic gripper (e.g., FIGS. 1 and 2) are made flush against the inner surface portions 940 to enhance the overall strength of the grip and to reduce the chances of the grip slipping.

The gripper interface 900 of FIG. 9 also includes outer surface 958 directly under each of the complementary protrusions 950, but the outer surface 958 is more or less obscured from view by the complementary protrusions 950. In these embodiments, however, the three receptacles 114 (one associated with each of the hook portions 118 of gripper fingers 102a-c) include the part of the elongated portion 112 surface directly within the receptacles 114 that can be designed to firmly grip and support each corresponding outer surface 958 when the receptacle 114 is locked in place. Locking includes when the gripper fingers 102a-c align with the complementary protrusions 950. That is to say, the outer surface 958 may contact the outer surface of each of the gripper fingers (i.e., that part of the elongated portion surface 132 within the receptacles 114) once the sensor determines that gripper fingers 102a-c are aligned.

FIG. 10A is a top view of an inner surface 1040 of an exemplary gripper interface 1000a. FIG. 10A is another view of the body 1053 of the gripper interface, and may be 3-D printed to fit with the corresponding gripper apparatus. Like that of FIG. 9, FIG. 10A shows a view of the gripper interface 1000a that is interior to the part. The hook portions 118 may be configured to first enter the "hook portions entry area" 556 (e.g., a large aperture in the gripper interface 1000a) before the gripper fingers 102a-c are actuated, to ensure that the gripper fingers 102a-c fit. The gripper fingers 102a-c may then be translated outward once they are actuated, e.g., using the robotic controller or the instructions from the controller(s) that is programmed to manipulate the effector end, often using input from one or more sensors.

Once the hook portions are inside the gripper interface 1000a, the elongated portions 112 of the robotic gripper 100 may be configured to translate radially outward until they securely contact an outer surface of the gripper interface (e.g., FIG. 9, 958). Meanwhile, when the grippers 102a-c approach the complementary protrusions 1050 using the radially-actuated gripper fingers 102a-c, the receptacles 114 between the respective flanges 126 of the corresponding hook portions 118 may then be configured to contact an inner surface 1040 of the gripper interface 1000a, such that the elongated portion surface 132 of the elongated portion 112 within the respective hook portions 118 may be positioned to align flush with a complementary protrusion 1050 on the gripper interface 1000a. Once the inner walls 226 (FIG. 2) of the receptacles 114 have become flush (e.g., as flush as possible, without needing a completely flush fit for all parts of the receptacles 114 and inner wall) with the complementary protrusion walls 907 in the select places and the receptacles 214 are evenly aligned with the complementary protrusions, the gripper fingers 102a-c may be locked and the connected part is ready for manipulation. This procedure is shown in more details in FIGS. 12-14.

FIG. 10B is a side view of an exemplary gripper interface 1000b. Each of the complementary protrusions 1050 can be seen. The angle C that forms the angle between the inclined wall 230 and the elongated portion surface 232 is also visible is also shown, with two other similar angles in other parts of the gripper interface 1000b. Orifices 1052, which are also shown from another perspective in FIG. 10A, are visible in the cross-section. In some embodiments, the orifices can be used for passageways for electrical wiring. FIG. 10A also shows a portion of inner surface 1040, in which the inclined wall 230 (FIG. 2) may be aligned against when in the locked position, as described above.

FIG. 11A is a top view of an outer surface of an exemplary gripper interface 1100 of FIG. 10A, with the outer surface 1141 now visible. Three slight protrusions represent complementary protrusions 1050a of FIG. 1A—that is, the complementary protrusions on the opposite side from FIG. 9. During actuation, the elongated portion 112 of the gripper contacts the outer surface, while the hook portion 118 is in contact with the inner surface (not shown). The body 1153 of griper interface 1100 also includes three female complementary features 1144, each of which may be complementary to one of the dome-like protrusions discussed, for example, with respect to FIG. 4. In other words, the complementary features 1144 highlight the anti-snag features located on the gripper interface 1100. FIG. 11B is a side view 1100B of the same gripper interface, and shows the body 1153 along with the inner surface 1141 (this time below the representation of the gripper interface 1100 of FIG. 11A and therefore not visible in FIG. 11A, a cross-hatched area which represents the gripper entry area 1142 shown in FIG. 11A and which allows the hook portions to move inside the gripper interface 1100 prior to actuation, and a side view of the complementary feature 1144. In some embodiments like in FIG. 11B, the top portion of the complementary feature 1144 is wider in nature and is therefore has a greater cross-sectional area, making it more likely that the corresponding protrusion 404 (e.g., FIG. 4) will successfully latch onto the complementary feature 1144 when an abrupt shift in the part occurs upon retraction of the gripper fingers.

FIG. 12 is a perspective view of an example robotic gripper approaching a gripper interface for making contact. The two parts shown in the embodiment of FIG. 12 are the perspective view of the gripper interface 1200a, and the robotic gripper 1200b itself. The figure provides an illustration of an initial approach to, and contact with, the gripper interface 1200a. For simplicity and ease of explanation, the part itself (which would be an extension of the gripper interface 1220a) is omitted from the figure.

Addressing the gripper interface 1220a first, it can be seen that the inner surface 1240 is coincident with the side opposite the part, and as such the relevant surfaces therein are called inner surfaces 1240. As can be conspicuously seen, the main portions of the inner surface reside each of two sides of a complementary protrusion 1250. As in previous embodiments, the complementary protrusion 1250 is an outcropping structure that enables the hook portion 1218, after being inserted into the recess in the middle of the gripper, to expand radially along its guides and align its corresponding receptacle 1214 with the complementary protrusion. It will be appreciated in these embodiments that the complementary protrusion need not necessarily be the same size as the receptacle, as long as there is an ability for the two structures to properly align and have at least part of their respective vertical walls become flush. This feature is described in greater detail below.

FIG. 12 also shows the robotic gripper 1200b, which is similar to the embodiment shown in FIG. 1. For example, FIG. 12 includes three support mounts 1219 for protecting other obstacles in the way of the gripper, for example. In addition, FIG. 12 shows two of the three end effector apertures 1220. As noted with respect to previous embodiments, the apertures may include guides near the elongated portions 1212 to allow the elongated portions to translate in a straight fashion radially outward. In some embodiments, the guide that performs that task may be the edges of the end effector aperture 1220 itself wherein the edges meet the base of the elongated portions. In still other embodiments, the end effector apertures 1220 include a guide (obscured from view in this embodiment). As shown in FIG. 7, for example, the guide may cover the top area of the end effector aperture 1220, and it may be used as a seating mechanism for the elongated portion, which resides over a guide. The guide may further include gripper finger engagement features (FIG. 7) which allow the gripper fingers 1202 to fasten to the engagement feature via fasteners 1216. It should be understood that a variety of additional and different embodiments may be possible for the construction of the gripper fingers, with each embodiment accomplishing the same goal of allowing the gripper finger 1202 at issue to be actuated in a radially outward direction when the need arises. What is shown have been just a few of the relevant embodiments that are capable of accomplishing this task.

FIG. 12 includes three gripper fingers 1202, just like in FIG. 1, with each gripper finger 1202 including an elongated portion 1212 and a hook portion 1218 securely coupled or integrally formed together. The gripper fingers 1202 in this embodiment are in a closed position, meaning that the robotic gripper 1200b is locked. As shown in part in FIGS. 5 and 6, the end effector 1210 on which the robotic gripper 1200b is mounted is coupled to further members, which are ultimately coupled to a robotic arm or other maneuvering device. A controller may be included within the robotic arm, the gripper, externally, or in more than one such location to control movement of the gripper 1200b, approach to a specified gripper interface 1200a, actuation, retraction, etc. Because the gripper fingers 1202b are closed in this case, the gripper 1200b is in the ideal condition to pass the hook portions 1218 through the gripper entry area 1242 in the center of the gripper interface 1200a. Right now, the arrow identified as 1265 is identified as "part approach" meaning that the robotic arm and end effector 1210 at this point are approaching the gripper interface 1200a designated by the control in order to grip the part (not shown) associated with that gripper interface 1200a. It is also noted that the hook portions 1218 of FIG. 12 are likewise similar to the embodiment of FIG. 1. That is, the hook portion includes the receptacle 1214 at its center with a pair of flanges 1226 on each side, and inclined walls 1216 along with front edges 1228 on each of the flanges in order to securely align with the appropriate inner surfaces 1240 and complementary protrusions 1250 in the gripper interface 1200a. FIG. 12 also shows each of the three contact regions 1208 at the top of support structure 1206, structures that will be used in the upcoming figure.

After the robotic gripper has initiated its approach to the gripper interface, it can move on to the next sequence in the part gripping process, which is the actual contact. After the approach of the robotic gripper as described above with reference to FIG. 12, the first part in the sequence concludes with the robotic gripper coming into contact using the contact region 1208 of the support structures 1206.

Figure 13:
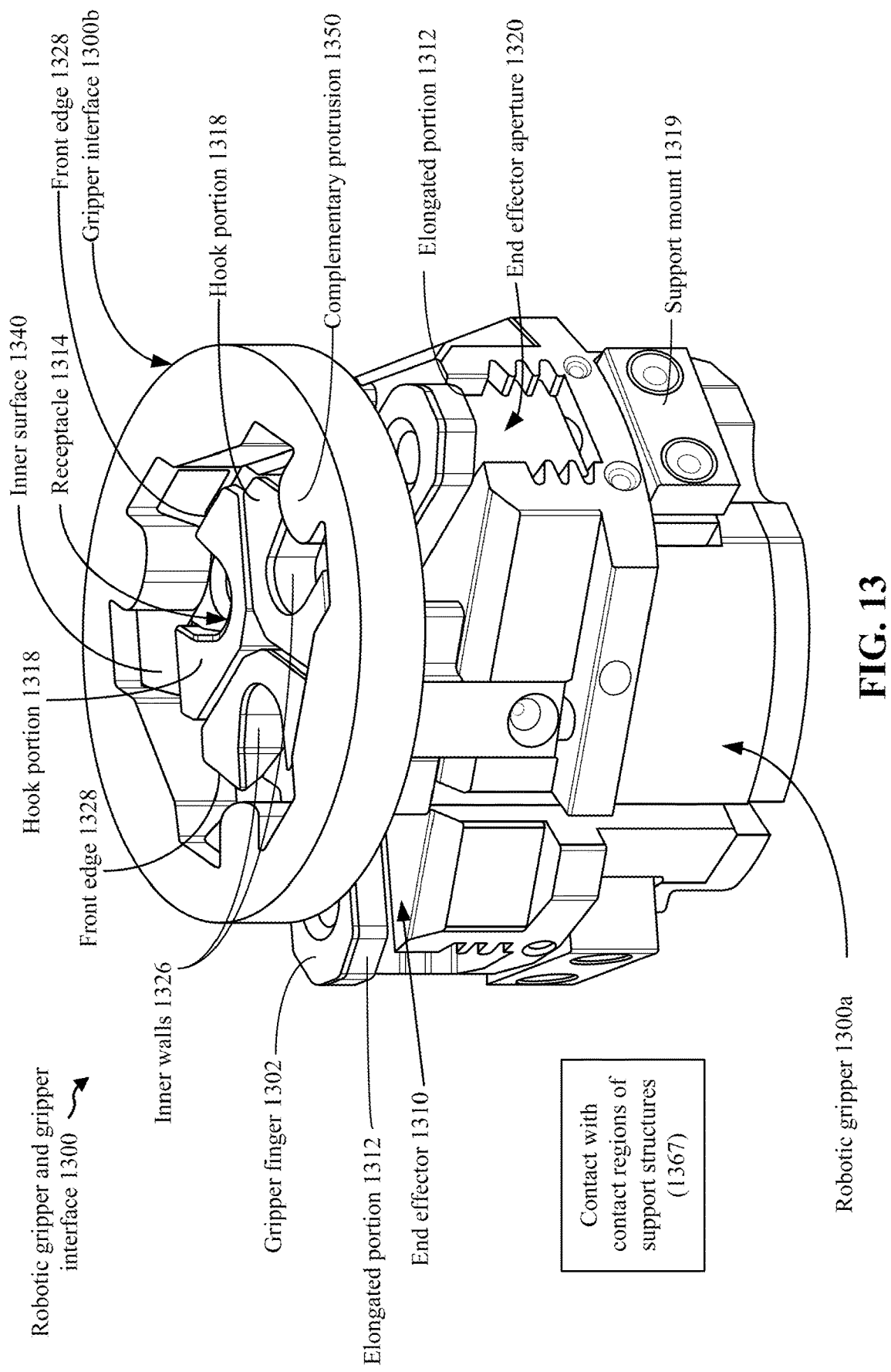
FIG. 13 is a perspective view of an example robotic gripper contacting the gripper interface via contact regions of support structures.

FIG. 13 is a perspective view of an example robotic gripper contacting the gripper interface (collectively 1300) via contact regions 1208 of support structures 1206, both obscured from view by the presence of the perspective gripper interface 1300a. Thus FIG. 13 shows gripper interface 1300b along with robotic gripper 1300a, similar to the configuration of FIG. 12 but in this event the approach described in FIG. 12 has ended in mild contact between the contact regions 1208 of support structures 1206 of the robotic gripper 1300a (again obscured from view in FIG. 13 by the gripper interface 1300b). The generally even, level nature of contact regions 1208 enables the gripper 1300a to rest firmly and comfortably while the controller reorients itself as necessary and prepares to execute the next steps in the sequence with minimal chance of the gripper slipping or causing damage to the gripper interface 1300a or the part (not shown). For this process to be successful, the master side should approach the part with some minimal accuracy. The numerical dimensions can vary in nature and may depend on the implementation, the mass of the devices involved, their speed ranges, and other factors.

Thus, as described in the box labeled 1367, the robotic gripper 1300*a* has positioned itself, while locked, via a correct orientation through the gripper interface 1300*b*. As can be seen in FIG. 13, the hook portions 1318 including their flanges and front ends may be adjusted to align optimally with the gripper interface. For example, the sensor embedded in the robotic gripper 1300*a* may determine that the robotic gripper 1300*a* needs to reorient itself in order to line up the receptacle and complementary protrusion, as well as the inclined and inner walls. In various embodiments, the robotic gripper 1300*a* can use the contact regions 1308 as a resting place to engage in small rotational movements, if the sensor of the robotic gripper 1300 determines that such reorientation is necessary to help align the complementary parts in the final steps. In FIG. 13, it is assumed that the robotic gripper 1300*a* has used its sensor (not shown) to align the locked hook portion 1318, including the receptacles 1314, front edges 1328 and flanges associated with each hook portion 1318, with the complementary structures that reside on the gripper interface 1300*b*, including for example the complementary protrusions 1350 and the inner surfaces 1340 adjacent the complementary protrusions 1350. It is noteworthy that, having aligned itself appropriately during the contact stage (which may optionally be performed after the initial contact has been made, or on the initial approach to contact), the unlocked nature of the gripper fingers 1302 (such that the hook portions 1318 are bunched together in the middle region at their closest distance, e.g., as adjudged by the sensor) means that when necessary, the hook portions 1318 may be able to seamlessly pass through the entry area of the robotic gripper 1300*b* without obstacles in the way.

Figure 14:
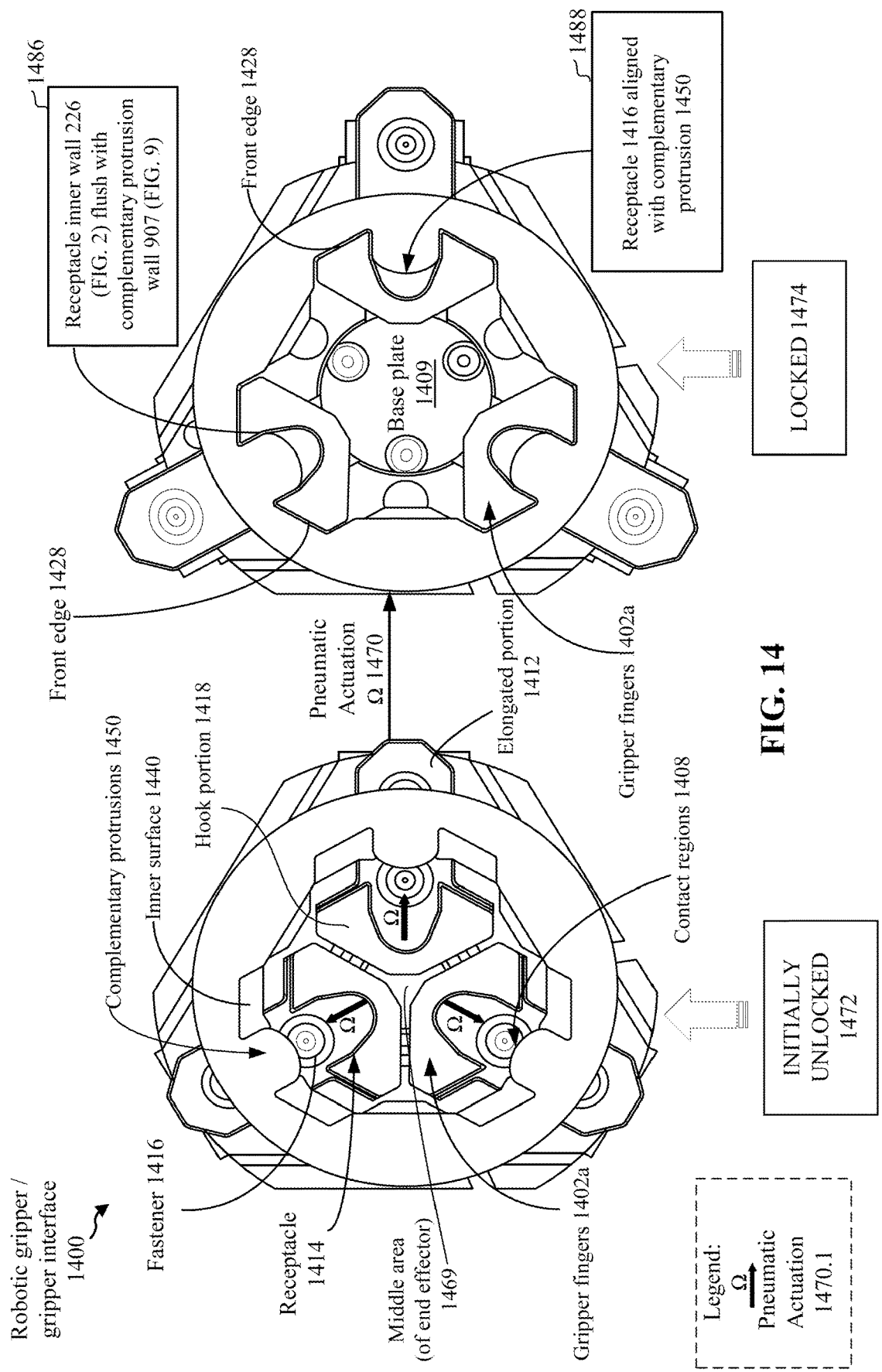
FIG. 14 is a perspective view of an example robotic gripper engaging from an unlocked position to a locked position on the gripper interface.

FIG. 14 is a perspective, top down view of an example robotic gripper/gripper interface 1400 engaging from an unlocked position to a locked position on the gripper interface. For example, with reference to the gripper/gripper interface 1400 on the left side of the drawing, a top view is shown where the complementary protrusions 1450 are disengaged from the respective gripper fingers 1402*a* in FIG. 13. As shown in the box below the robotic gripper/interface 1400, the system on the left remains for the moment in the unlocked stated 1472. Thus, as noted above, the sensor may determine that the hook portions are resting in their respective default positions in the middle area 1469 of the end effector, as far as possible away from the edge of the end effector. Also, as discussed with reference to FIG. 13, the robotic gripper in FIG. 14 has aligned itself, its receptacles, inclined walls, etc., with the corresponding complementary protrusions 1450 and inner surfaces 1440 of the gripper interface. Again, while it is assumed in most cases that the gripper interface is located in the middle of the part at some suitable point that is strong enough to be manipulated by the robotic gripper at that single point as in embodiments described herein, the remaining portions of the part have been omitted for simplicity.

While the box 1472 indicates that the configuration of the robotic gripper and gripper interface 1400 is initially unlocked and contact is made between the contact regions 1408 and the gripper interface, the gripper fingers 1402*a* can be actuated. Reference is now made to the three arrows pointing radially outward from the middle area 1469 of the end effector, labeled with the corresponding 1 symbol. In these embodiments, the controller has activated the pneumatic pressure system (or other form of power used by the gripper) to actuate the gripper fingers 1402*a*. When so actuated, the gripper fingers begin to translate outward, optionally in unison, in a radial direction $\Omega$. Thus the elongated portions move along the guides (obscured from view) and concurrently, the hook portion 1418 attached to each elongated portion 1412 of a corresponding gripper finger 1418 moves along with it, as the pneumatic actuation (1470) moves the three gripper fingers outward from their unlocked position (1470.1).

Referring now to the right side of the drawing, the outward translation of the gripper fingers continues until, as noted in 1486, the receptacle inner wall (e.g., FIG. 2) 226 is flush with the complementary protrusion wall 907 (e.g., FIG. 9). In some embodiments, only opposing portions of the walls need be flush for alignment; that is, the walls of the inner wall need not be in contact with all points of the receptacle inner walls of the gripper fingers 1402*a*, as is the case in FIG. 14. In addition, the respective front edges 1428 of the flanges on each side of the hook portion become flush with the upper edge of the inner surface 1440, and the inclined walls of the flanges/hook portions (obscured from view) become aligned with the inner surfaces 1440 of the grip interface. Once alignment is achieved as confirmed by the sensor, the sensor determines that the robotic gripper is locked in 1474 to the gripper interface. If, for example, an error occurs such that the robotic gripper for some reason did not achieve precise alignment, the sensor can sensor can inform the controller of the error, and the gripper fingers can unlock until they are appropriately aligned and readjusted.

Thus, stating the above set of events in another way, the first primary movement of the robotic gripper involves the movement of the robotic gripper such that the contact regions (obscured) on the side of the robotic gripper come into actual contact with the gripper interface. The second primary movement involves the application of pneumatic pressure to actuate the robotic gripper, which in turn moves the three gripper fingers 1402*a*-*c* from a retracted (unlocked) to an extended (locked) state. As the gripper fingers 1402*a*-*c* translate radially outward from the retracted to the extended position, the planes with angles B and C come into alignment with the complementary features on the gripper interface. Once the gripper fingers 1402*a*-*c* come into contact with the gripper interface at their appropriate points of alignment as described above, the inner surfaces of the gripper interface and the inclined wall and front edge of the robotic gripper can nest together.

Figures 15A, 15B:
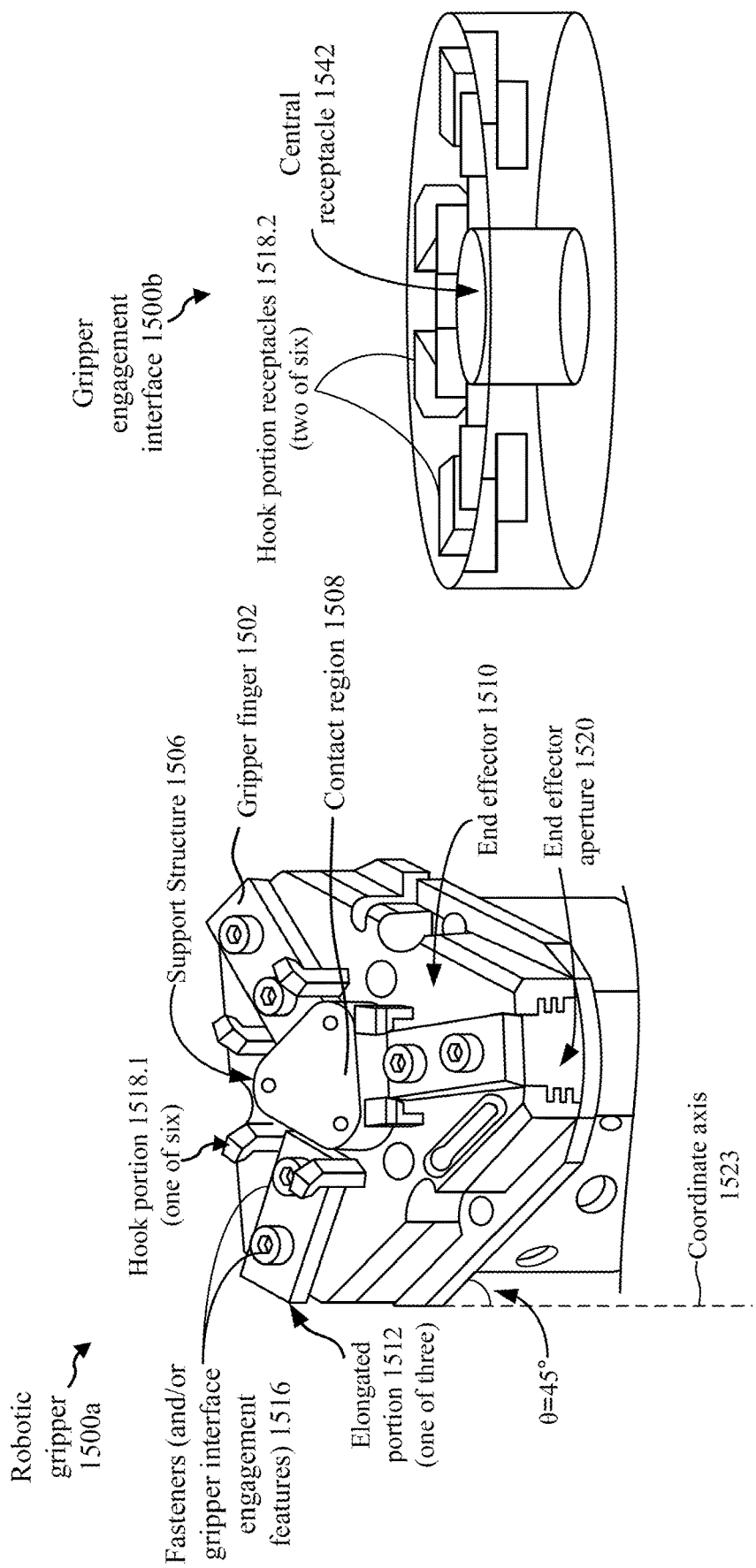
FIG. 15A is a perspective view of an exemplary robotic gripper.
FIG. 15B is a side perspective view of an example gripper interface for the robotic gripper of FIG. 15A.

FIG. 15A is a perspective view of an exemplary robotic gripper 1500*a*, including six hook portions 1518.1. In some embodiments, the end effector 1510 may include a central contact region 1508 for use when the robotic gripper closes in on the gripper engagement interface 1500*b* (see FIG. 15B). In the embodiment shown, three elongated portions 1512 are used and positioned similarly to those of earlier embodiments. The elongated portions 1512 likewise include fasteners, or optionally gripper engagement fingers 1516, to enable the pneumatic pressure system to apply a force to the fingers to translate them radially outward. In the embodiments shown, the hook portion includes six much smaller prong-like portions 1518 that initially extend vertically, but that curve at its upper part as if to include a miniature receptacle. As shown by the coordinate axis 1523, in some embodiments such as in this example, the end effector surface is angled 45° from the horizontal (where the horizontal is shown in perspective in the figure).

The embodiments of FIG. 15A may include a six prong, 45° ramp with a center boss that includes the split finger design to facilitate bolt clearance, as well as to provide six points of contact to sustain heavy loads. One benefit of these multiple points of contact is that they can reduce the force at each contact point, resulting in smaller deformations when the gripper is used, particularly on a heavier part.

FIG. 15B is a side perspective view of an example gripper engagement interface 1500b for the robotic gripper of FIG. 15A. In lieu of previous embodiments, the side cross-sectional view of the gripper engagement interface 1500b of FIG. 15B includes a central receptacle 1542, which may be of a size sufficient to both allow the contact region 1508 on the robotic gripper 1500a (FIG. 15A) to insert itself in the central receptacle 1542 but may also be small enough to enable the gripper to align itself with the hook portion receptacles 1518.2 in which the hooks are seated. In some embodiments, the alignment is performed near the surface, and the contact region 1508 need not protrude into the central receptacle 1542. When the hook portions 1518.1 are ready for insertion into one or all of the hook portion receptacles 1518.2, the gripper fingers 1502 may be actuated as much as necessary to enable the hook portions to slide down to the bottom of the receptacles 1518.2, as physically permitted by the volume and geometry of the receptacles 1518.2. Thereupon, in these embodiments, the sensor can detect that the hooks are at the bottom and can then cause the gripper fingers 1502 to extend outward such that the receptacles are either seated into similarly shaped geometrical voids, or until they are securely gripping the side of the receptacles 1518.2 in a manner sufficient to provide an adequate locking force. Other embodiments can be contemplated using the principles of these smaller prongs. For example, in some embodiments, four prongs may be more appropriate per gripper finger to increase lock strength.

Figure 16:
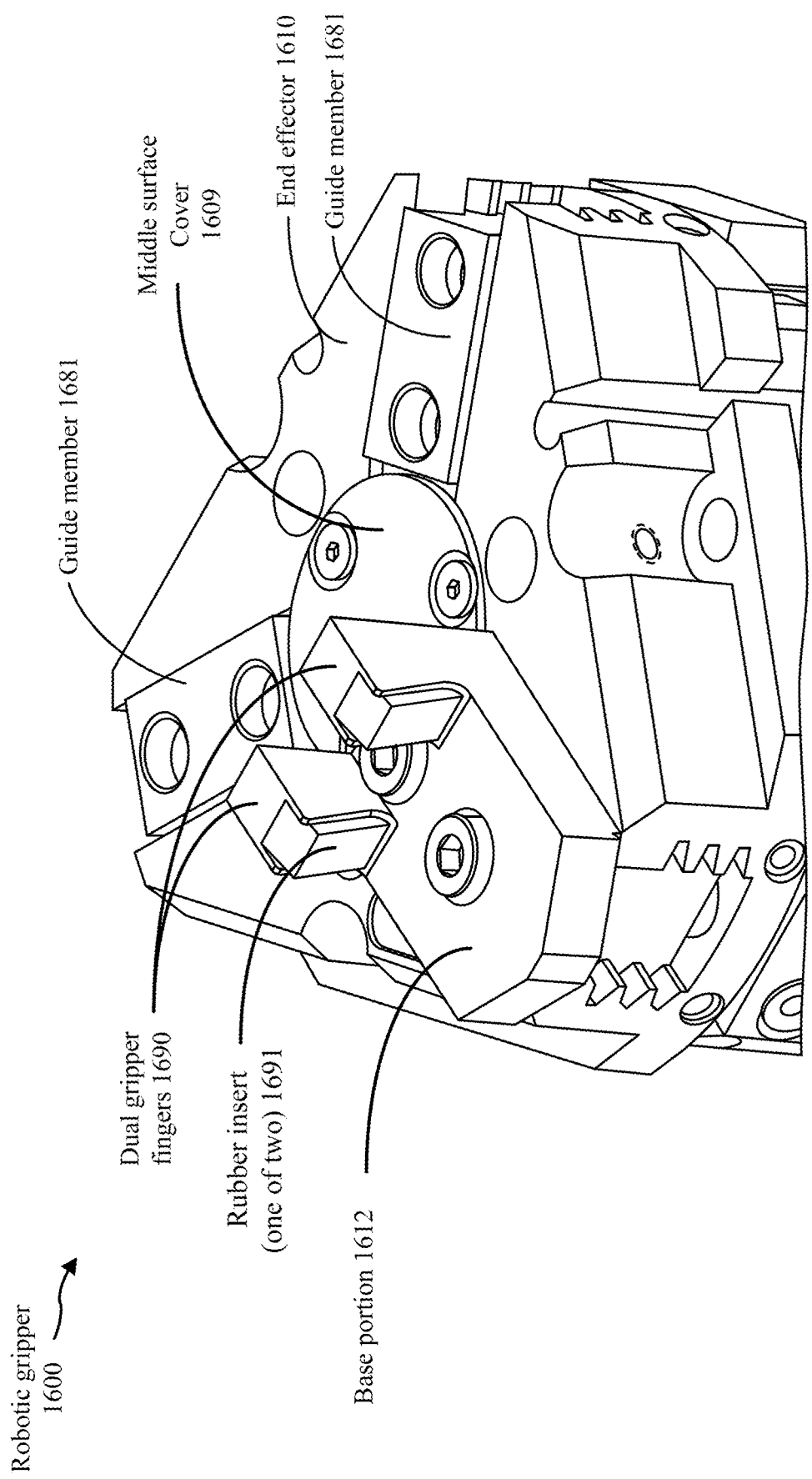
FIG. 16 is a perspective view of another exemplary robotic gripper.

FIG. 16 is a perspective view of another exemplary robotic gripper 1600. Gripper 1600 includes two regions that include a guide member 1681. One purpose of the guide member 1681 may be to enable a user to quickly switch the configuration of the end effector 1610, especially when using multiple configurations. In addition to the guide members, the main member in this embodiment includes a base portion 1612 and two dual gripper fingers 1690 formed with the base portion 1612. Within a recess of each of the gripper fingers 1690 facing radially outward is a rubber insert 1691, one corresponding to each gripper finger 1690. Thus the gripper fingers in this embodiment include shallow ramp rubber pads. Dual gripper fingers 1690 may be used for bold clearance, with a shallow ramp tuned for an increased radial force, and a minimal required z (vertical) locking force. As noted above, the recesses of the gripper fingers may include adhesive backed rubber inserts for increased z rotation resistance and grip.

Figures 17A, 17B:
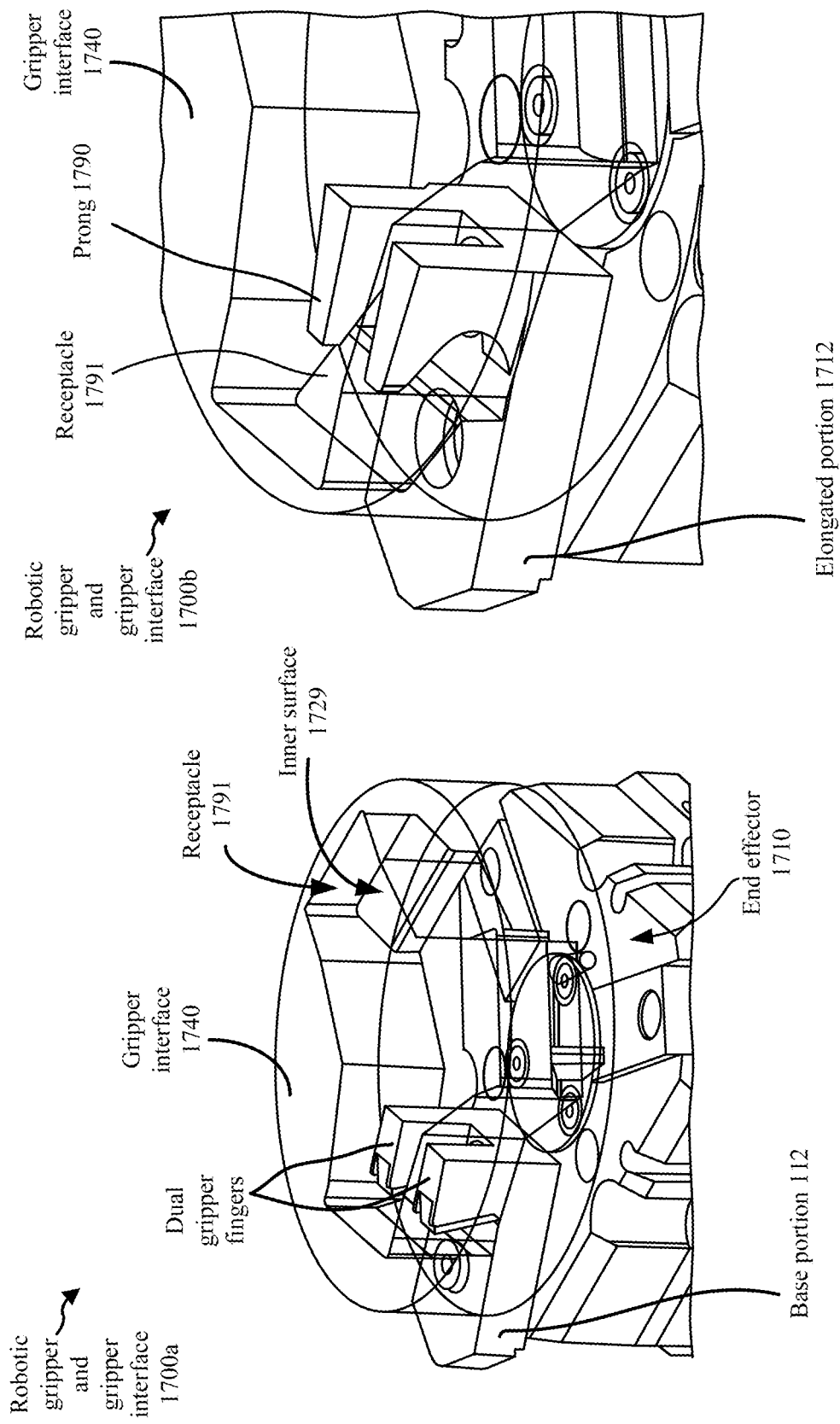
FIG. 17A is a perspective view of an exemplary robotic gripper secured to a gripper interface.
FIG. 17B is a transparent, perspective view of a portion of the engagement of the example robotic gripper with the gripper interface.

FIG. 17A is a perspective view of an exemplary robotic gripper secured to a gripper interface 1700a. The gripper interface 1740 includes three receptacles 1791, with one of the receptacles 1791 being used in this embodiment. The base portion may be guided using the dual gripper fingers onto the gripper interface 1740. The rubber fingers may provide a secure grip to reduce the instance of the radial force while maintaining a gentle grip. In some embodiments, the robotic gripper can use two or three sets of dual gripper fingers along with the gripper interface 1740. FIG. 17A also shows the inner surface 1729 of the receptacle 1791 within which one of the gripper fingers can be seated.

FIG. 17B is a transparent, perspective view of a portion of the engagement of the example robotic gripper with the gripper interface 1700b. The robotic gripper in various embodiments can include a longer finger or prong, such as the prong 1790 displayed on the robotic gripper of this embodiment. A similar or identical gripper interface is used in FIG. 17B as the gripper interface 1740 in FIG. 17A. The elongated portion 1712 of the finger gripper in this embodiment includes an opening through which the prongs 1790 and part of the elongated portion 1712 can pass. This opening can act as a fastener to stabilize or move the elongated portion 1712 and its prongs when the latter two elements are seated properly in the receptacle 1791. The robotic gripper includes a 45° ramp-angled entry, with up to six points or possible prongs to fill the three recesses of the gripper interface 1740. The gripper interface 1740 also provides an angled entry for misalignment or print tolerances.

Figures 18A, 18B:
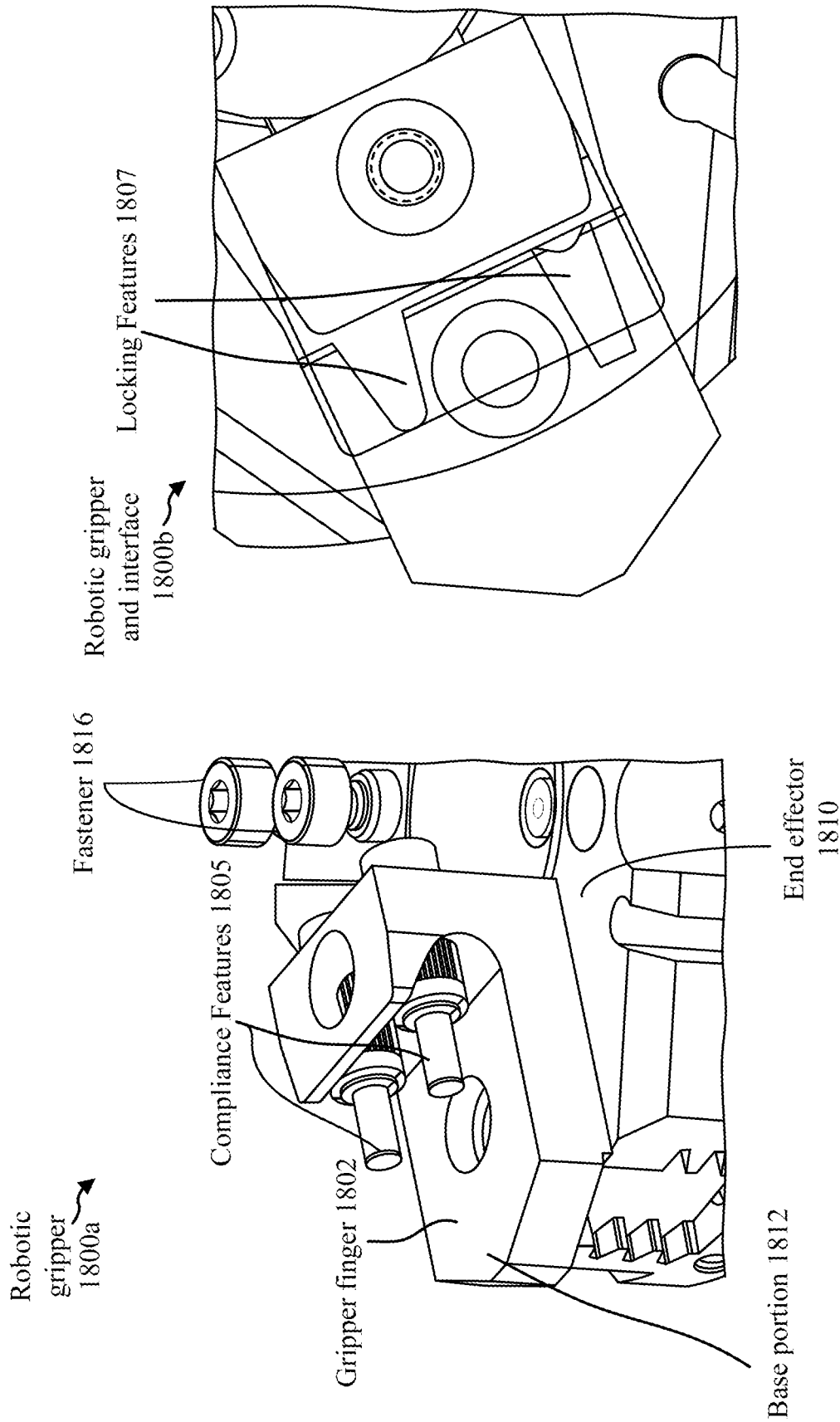
FIG. 18A is a perspective view of a portion of another example robotic gripper.
FIG. 18B is a top transparent view of the example robotic gripper engaged with a gripper interface.

FIG. 18A is a perspective view of a portion of another example robotic gripper 1800a. The gripper 1800a of this embodiment may include a radial pin lock, such as realized by fasteners 1816, and a gripper finger 1802 that includes a base portion 1812 and two compliance features 1805 in a horizontal direction relative to the base portion. Key features in this embodiment include a press fit long nose spring plumbers installed on the gripper fingers 1802 (only one of which is shown). Further, in this embodiment, the spring plungers may get compressed as the gripper finger 1802 moves out until bottoming out occurs. FIG. 18B is a top transparent view of the example robotic gripper engaged with a gripper interface. In the case of FIG. 18B, the robotic gripper includes a gripper interface 1800b and the dual pronged portion seated within the interface are represented by locking features 1807.

FIG. 19A is a side perspective view of an example robotic gripper portion 1900a. In the robotic gripper portion 1900a shown, one gripper finger 1902 is attached to an elongated portion 1912 having a fastener 1916, and two hook portions 1918 (one of which is referenced). Each of the hook portions 1918 further includes a compliance feature 1905, which protrudes from the vertical wall 1985. End effector 1910 is also shown at the rear of the component in FIG. 19A. In the exemplary view of FIG. 19B, a side transparent view of the example robotic gripper portion 1900a engaged with a gripper interface 1940 is shown. In this case, the elongated portion 1912 is seated generally evenly with the end effector, and the hook portion 1918 with the compliance features 1905 are in the upward position in a separate compartment of the gripper interface 1940. In various embodiments, a shallow ramp set screw is provided along with an angled entry based on the gripper interface 1940. Key features in these embodiments include the shallow ramp, and the angled entry as described. Further, in this embodiment, the compliance feature 1905 includes a set screw which can be moved in and out to change the locking configuration as needed.

Figures 20A, 20B:
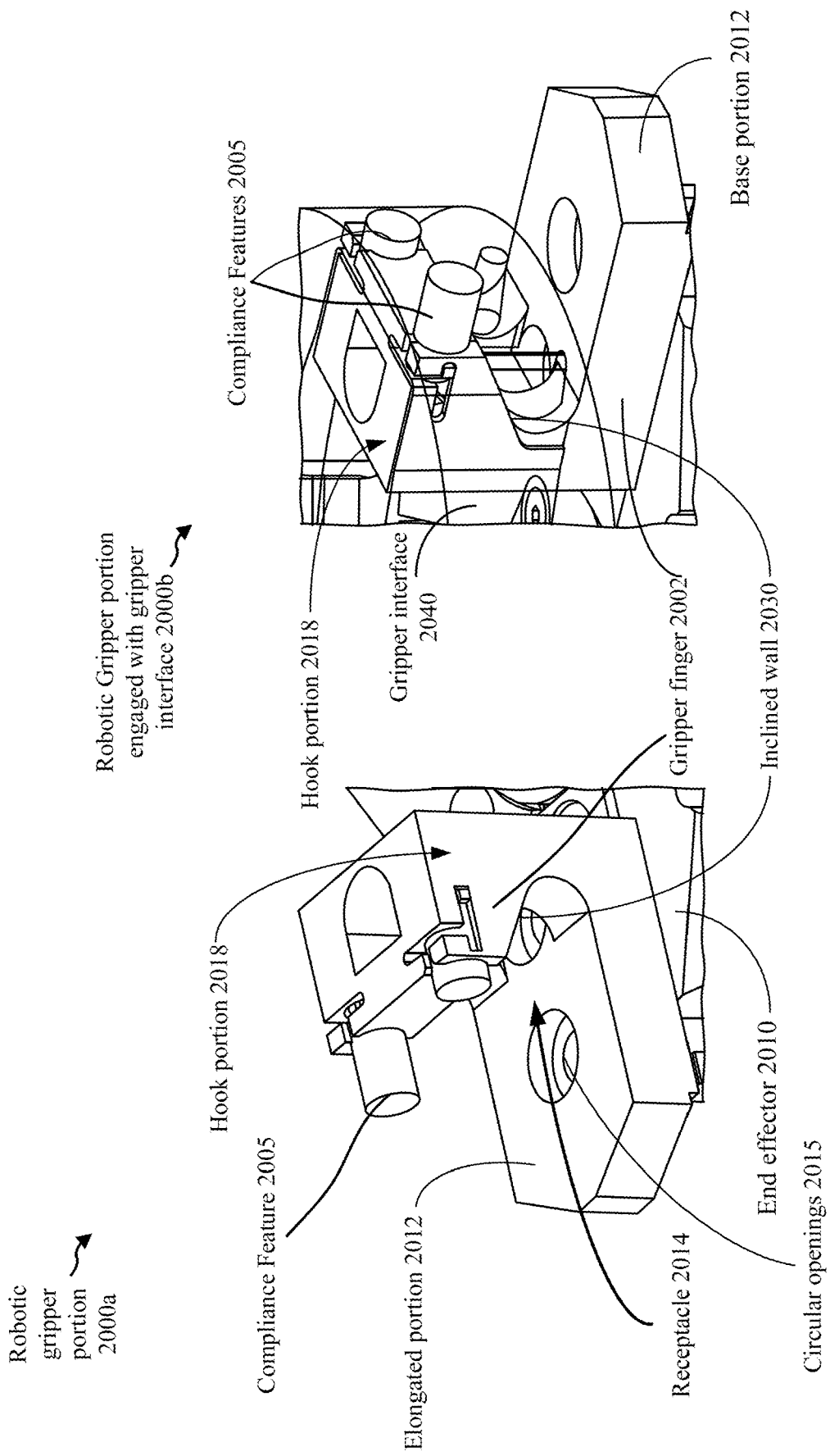
FIG. 20A is a perspective view of another example robotic gripper portion.
FIG. 20B is a transparent perspective view of the example robotic gripper engaged with a gripper interface.

FIG. 20A is a perspective view of another example robotic gripper portion 2000a, including a gripper finger with a similar elongated portion 2012, a pair of circular openings 2015 which may be used with standard fasteners as described in other embodiments herein, a receptacle 2014 and a hook portion 2018. Unlike the immediately preceding embodiment, the hook portion 2018 as shown is part of a single body for apparent added support. The gripper finger 2002 also includes a 45° ramp, a bayonet mount pin and compression spring. The gripper finger is also mounted close to the end effector 2010. The embodiment in FIG. 20B includes a transparent illustration of the gripper interface 2000b. The figure also shows a pair of cylindrical-like compliance features 2005, with one such feature protruding outward further than the other.

FIG. 20B is a transparent perspective view of the example robotic gripper finger 2002 engaged with a gripper interface 2000b. The gripper interface is also designated by reference numeral 2040. The gripper finger 2002 of FIG. 20B includes a base portion 2012 as well as a hook portion 2018 that is almost as long as the base portion 2012. The hook portion 2018 includes an inclined or curved wall 2030 at its lower part, and compliance features 2005 on its upper part. The compliance feature 2005 with the longer outward protrusion is seen closer to the viewer's perspective in this view. In some embodiments, two or three gripper fingers 1940 can be used with an end effector where necessary.

Figures 21A, 21B:
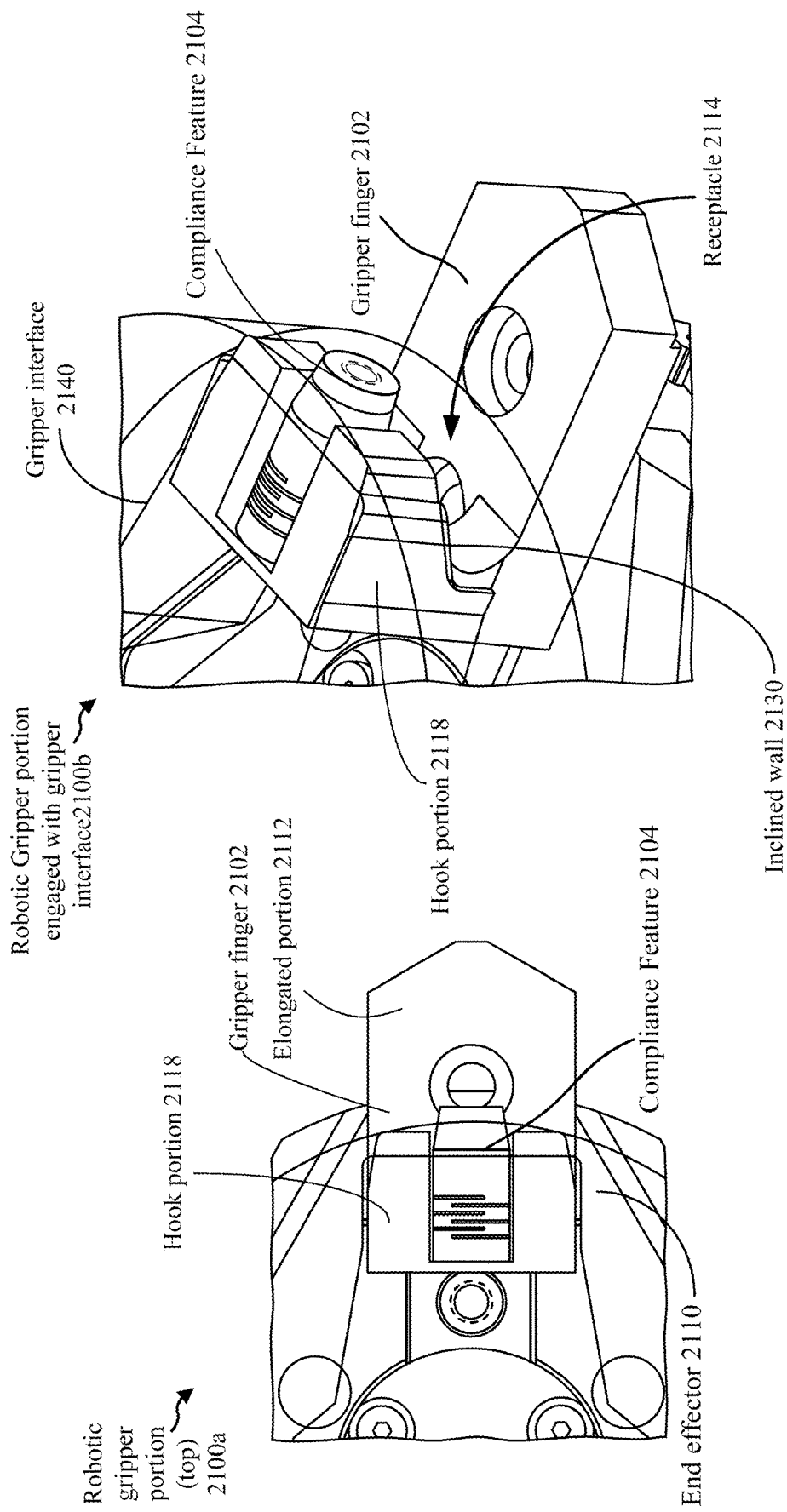
FIG. 21A is a top view of another example robotic gripper portion.
FIG. 21B is a side perspective view of the example robotic gripper portion engaged with a gripper interface.

FIG. 21A is a top view of another example robotic gripper portion 2100a. The gripper finger 2102 in this embodiment includes elongated portion 2112 and compliance feature 2104 embedded within the hook portion 2118. FIG. 21B is a side perspective view of the example robotic gripper portion 2100b engaged with a gripper interface 2140. The gripper finger 2102 in the embodiment of FIG. 21B can be seen at a slight angle relative to that of FIG. 21A. Otherwise the gripper finger 2102 of FIG. 21B includes a receptacle 2114 defined in part by the inclined wall 2130, and the generally vertical hook portion 2118. The gripper finger 2102 can be inserted into the gripper interface 2140 from directly underneath, with the elongated portion 2112 protruding out of the interface as in FIG. 21A. The compliance feature 2104 of the embodiments in FIGS. 21A and 21B include a single point engineered spring. As shown more clearly in FIG. 21B, the compliance feature 2104 has a generally cylindrical-type shape with a reduced cylinder radius closer to the outer end.

Figures 22A, 22B:
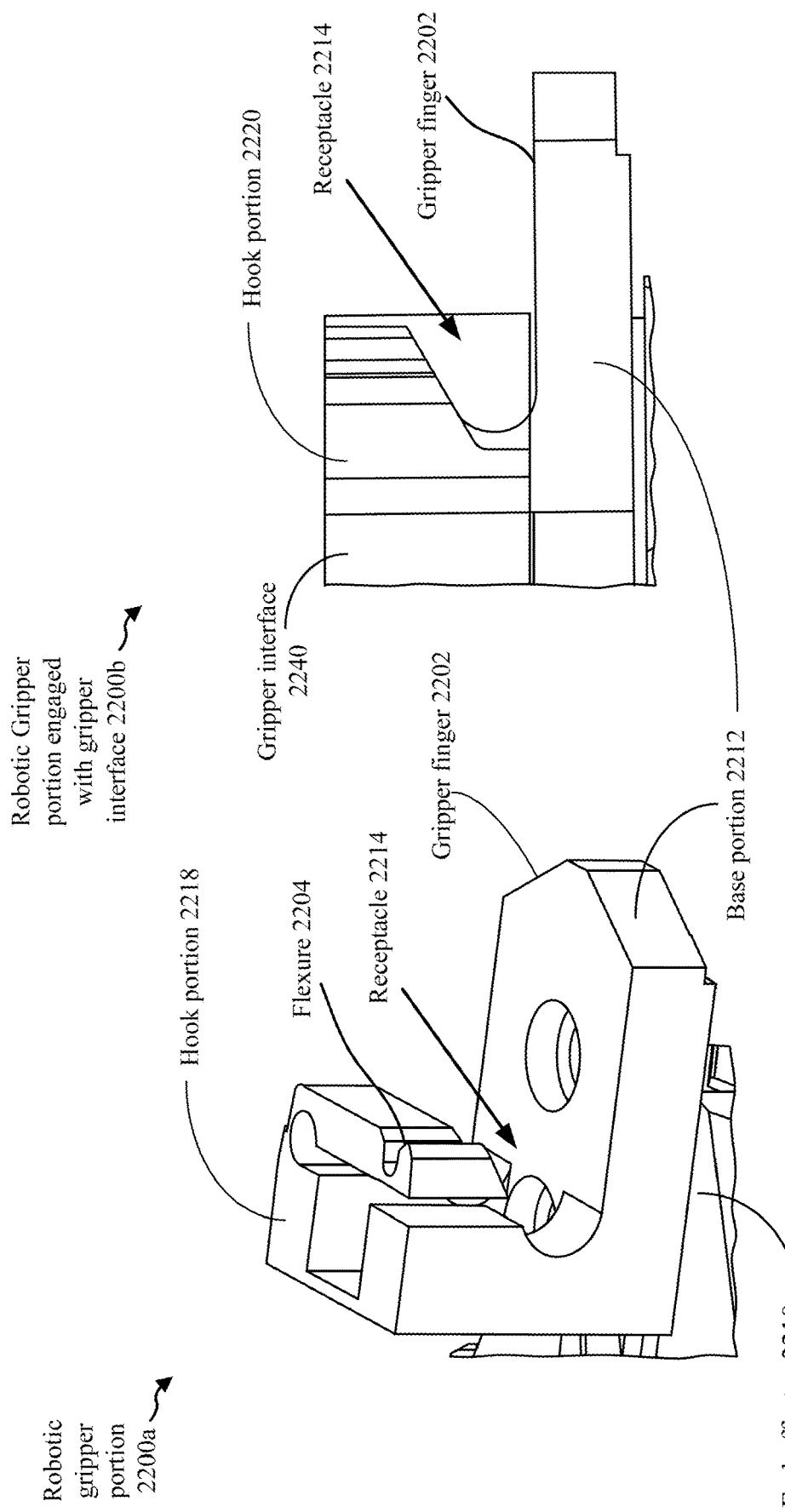
FIG. 22A is a side perspective view of another example robotic gripper portion.
FIG. 22B is a side transparent view of the example robotic gripper portion engaged with a gripper interface.

FIGS. 22A and 22B include a side perspective view of another example robotic gripper portion 2200a, which includes gripper finger 2202 coupled to an end effector 2210. Each of the gripper fingers 2202 in FIGS. 22A and 22B includes a base portion 2212 and a hook portion 2218 (2220 in FIG. 22B), which together define receptacle 2214. The hook portion 2218 is largely rectangular but with a flexure 2204 at one of its ends. A small portion of a gripper interface 2040 is shown in FIG. 22B. One advantage of this embodiment is the ease with which the hook portion 2218 can be inserted into the relatively thick gripper interface 2240, as shown in FIG. 22B. The gripper finger 2202 of this embodiment includes a 45° ramp, a compression tab, and a cutout for a locking nub.

Figure 23B:
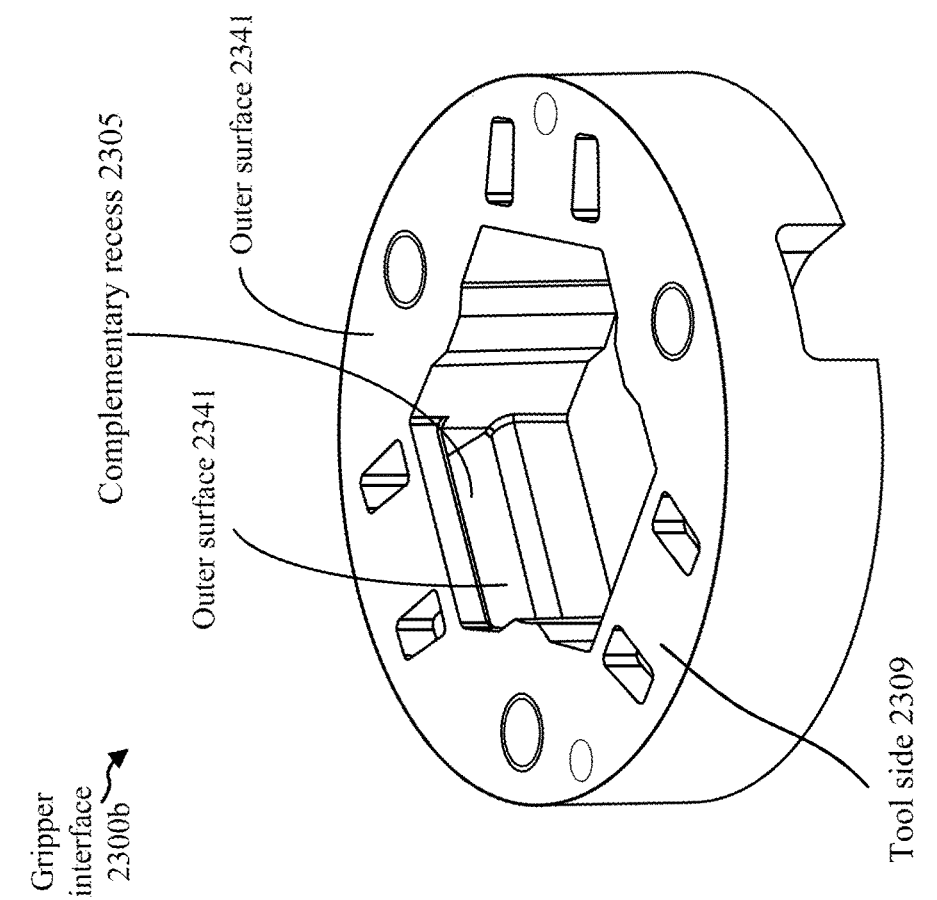
FIG. 23B is a perspective view of a gripper interface for use with the example gripper finger.
Figure 23A:
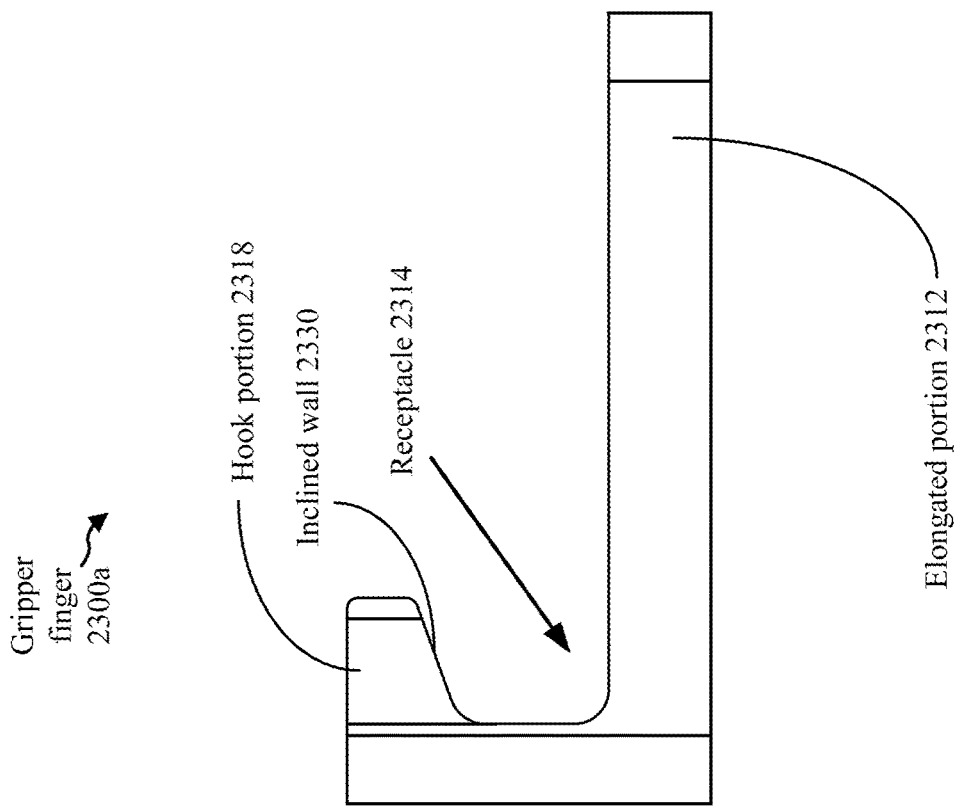
FIG. 23A is a side view of another example gripper finger.

FIG. 23A is a side view of another example gripper finger 2300a. The gripper finger 2300a includes elongated portion 2312, hook portion 2318, and an inclined wall 2330 that converts into a vertical wall as the hook portion 2318 extends down to the elongated portion 2312, thereby forming a receptacle 2314. FIG. 23B is a perspective view of a gripper interface 2300b for use with the example gripper finger. Included in an exemplary space for the gripper finger 2300a is a complementary recess 2305. In this figure, the gripper interface 2300b is also pointing downward such that outer surfaces 2341 correspond to the external side of the part (not shown). The tool side is also identified as 2305. This embodiment includes a straight 45° ramp with a taper (e.g., the inclined wall 2330). The gripper interface 2300b includes three angled planes at 120 degree increments, which advantageously can provide both axial and rotational constraints. Thus, locking security is provided in both of these directional components.

Figures 24A, 24B:
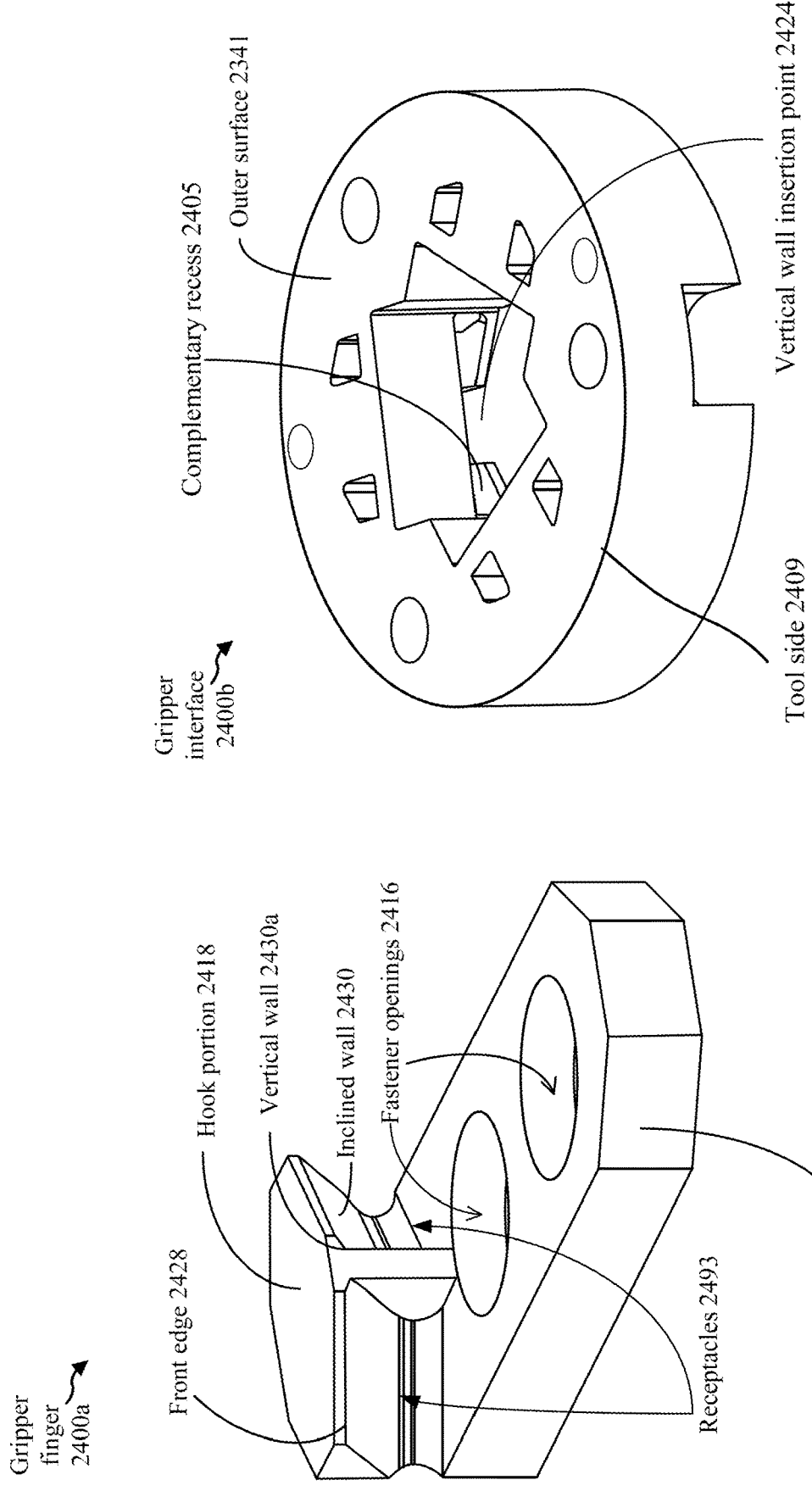
FIG. 24A is a perspective view of another example gripper finger.
FIG. 24B is a perspective view of a gripper interface for use with the example gripper finger.

FIG. 24A is a perspective view of another example gripper finger 2400a. The gripper finger 2400a includes elongated portion 2412, two receptacles 2493 and two fastener openings 2416 which may accept fasteners, and hook portion 2418. The hook portion includes a front edge 2428 with inclined walls 2430. This embodiment differs substantially from earlier embodiments in that it includes a thin vertical wall 2430a which partitions the two receptacles 2494 and which can act to fit into the vertical wall insertion point of FIG. 24B. The vertical wall 2430a segments the hook portion 2418 into two symmetrical portions. The embodiment may include a vee 45° ramp with a taper.

FIG. 24B is a perspective view of a gripper interface for use with the example gripper finger. Like in the previous embodiments, the outer surface 2341 and tool side 2405 are on the top in the figure. It is easy to see how the gripper finger 2400a is inserted into the complementary recess 2405 and the vertical wall insertion point 2424 (where the protrusion with the vertical wall 2431 is inserted). The gripper interface provides six angled planes with three recesses 2405 at 120 degree increments. As such, these embodiments provide both axial and rotational constraints. Another advantage of these embodiments is that the relatively small diameter of the gripper interface 2400b reduces the footprint on the part in which it is used.

FIG. 25A is a perspective view of another example gripper finger. The gripper finger 2500a is similar to the one shown in FIG. 1 with some key exceptions. A base portion 2512 is provided, and in these embodiments the base portion 2512 is significantly shorter. Two fastener openings 2516 are present, through which fasteners can be positioned. The hook portion 2518 is similar to the embodiments from FIG. 1 and earlier figures, with the hook portion slightly wider. A pair of flanges 2526 and 2528 extend out in opposite directions, which produce inclined walls 2530 that are angled relative to the base portion 2512. A receptacle 2514 is also included. Referring now to FIG. 25B, which is a perspective view of a gripper interface 2500b for use with the example gripper finger 2500a, various advantages of the design as viewed from tool side 2509 (outer surface 2541) are apparent. The six corners in the interior, as shown include six angled planes of three complementary recesses 2505 at 120° increments, which as in the above embodiments, provide both axial and rotational locking constraints. Further, the larger gripping diameter of the gripper finger 2500a may advantageously reduce the loads into both the gripper finger and the gripper interface 2500b. It should be borne in mind, however, that the larger gripping diameter may increase the part footprint. The gripper interface 2500b further includes three complementary protrusions 2550 for engaging with the gripper fingers 2500a. Complementary recesses 2505 are also shown for engaging with front edge 2528 of the gripper finger 2500a.

Figures 26A, 26B:
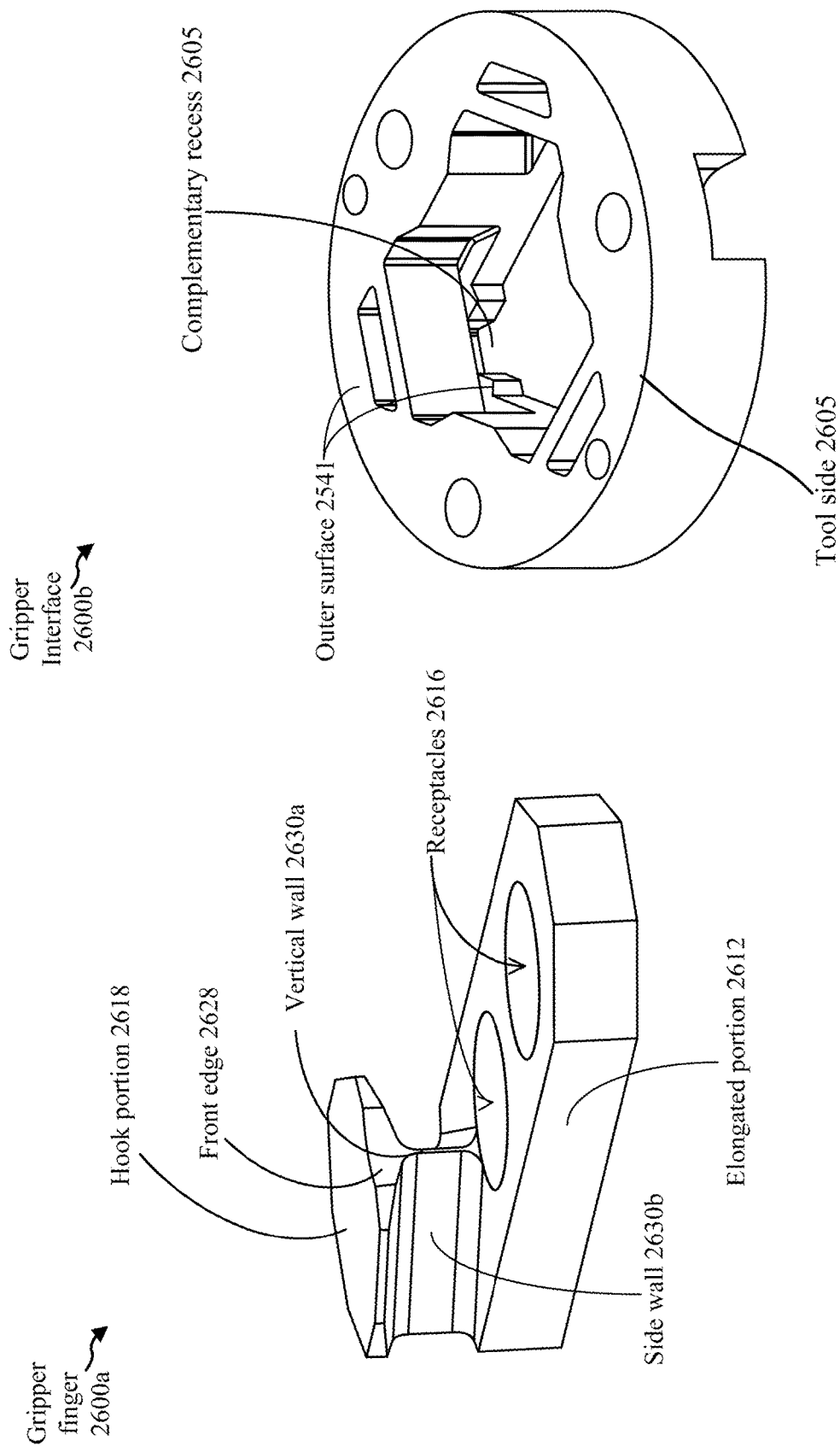
FIG. 26A is a perspective view of another example gripper finger.
FIG. 26B is a perspective view of a gripper interface for use with the example gripper finger.

FIG. 26A is a perspective view of another example gripper finger 2600a. The gripper finger 2600a includes, in addition to the elongated portion 2612, two receptacles 2616 which may accept fasteners, a hook portion 2618, and a vertical wall 2630a that in turn creates two side walls 2630b, one of which is visible. The gripper fingers 2600a may fit into a gripper interface similar to FIG. 26B, which shows a perspective view of a gripper interface 2600b for use with the example gripper finger 2600a. As before, three gripper fingers 2600b can be fit, with each area including a complementary recess 2605. The outer surface 2541 (and the tool side 2605) are shown on the upper part of the gripper interface 2600b. As in prior embodiments, the gripper interface includes six angled planes at 120° increments for providing both axial and rotation locking. As another benefit of these embodiments, the sharper plane angle may create an increased clamping force. In addition, the small diameter of the gripper interface 2600b can reduce the part footprint.

FIG. 27A is a perspective view of another example gripper finger 2700a. The elongated portion 2712 includes a fastener opening 2716 and an open fastener opening 2717 for facilitating different connection options. The longer hook portion 2718 includes a slightly curved vertical wall with an additional angled inclined wall 2730 closer to the two prongs 2733. The elongated portion is otherwise flat and includes elongated portion surface 2732.

FIG. 27B is a perspective view of a gripper interface 2700b for use with the example gripper finger. Viewing the component from the tool side 2745 of the outer surface 2741, the three gripper finger receptacles 2708 include a complementary recess 2705 to fit the pronged portion 2733 of the hook portion. Three circular openings 2716 are included for additional engagement with complementary parts. This embodiment includes three angled planes at 120° increments for providing axial and rotational constraints, and a small diameter of the gripper interface. Another benefit of this embodiment is that the top slot can provide rotation resistance because of the snug fit of the prongs 2733 into the complementary recess 2705.

FIG. 28A is a perspective view of another example gripper finger. The gripper finger 2800a provides an elongated portion 2812 with two fastener openings, as well as a hook portion 2818. Uniquely, the gripper finger 2800a includes a ball connector 2819. FIG. 28B is a perspective view of a gripper interface 2800b cross-section for use with the example gripper finger. At least one ball-connector based gripper finger 2800a can be inserted into the right complementary recess 2805. The gripper interface 2800b also shows an additional recess 2805a for potential use by another gripper finger or ball connector element similar to element 2819. The ball will beneficially contact an incline plane, in turn providing a locking force in added directions simultaneously.

FIG. 29A is a perspective view of another exemplary gripper finger 2900a. The gripper finger 2900a also includes a ball connector, but which is located in the center between the fastener openings. FIG. 29B is a perspective view of a gripper interface cross section 2900b for use with the example gripper finger 2900a. A portion of surface 2941 is visible. The complementary recess 2905 can be used to secure the ball connector 2919 of the hook portion 2919 in a similar manner as FIG. 28B.

Figure 30B:
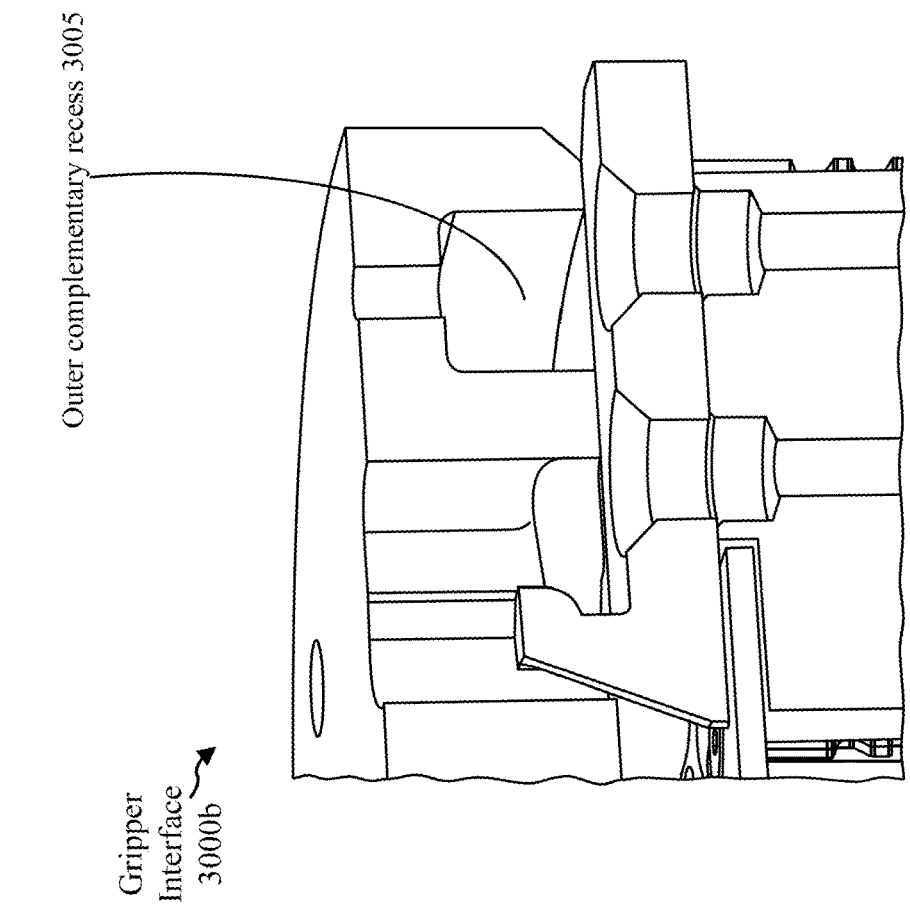
FIG. 30B is a perspective view of a gripper interface for use with the example gripper finger.
Figure 30A:
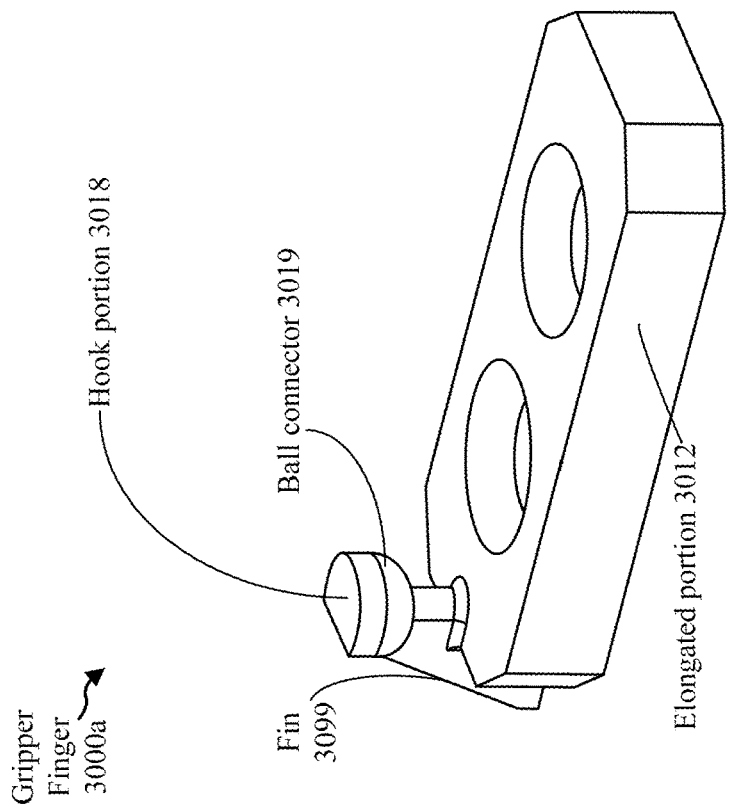
FIG. 30A is a perspective view of another exemplary gripper finger.

FIG. 30A is a perspective view of another exemplary gripper finger 3000a. The gripper finger 3000a includes, in addition to the elongated portion 3012 a hook portion 3018 in the form of a ball connector 3019. In the embodiment of FIG. 30A, however, at the posterior of the ball connector 3019 is a fin 3099. FIG. 30B is a perspective view of a gripper interface for use with the example gripper finger 3000a and similar in most respects to the gripper interface of FIG. 29B. The fin 3099 can beneficially be used to add additional resistance to unwanted rotation. A complementary recess 3005 can stabilize the ball connector 3018 and fin, except that the fin may enable a smaller footprint for the locking mechanism and thus a smaller gripper interface 3000b for the part.

Figures 31A, 31B:
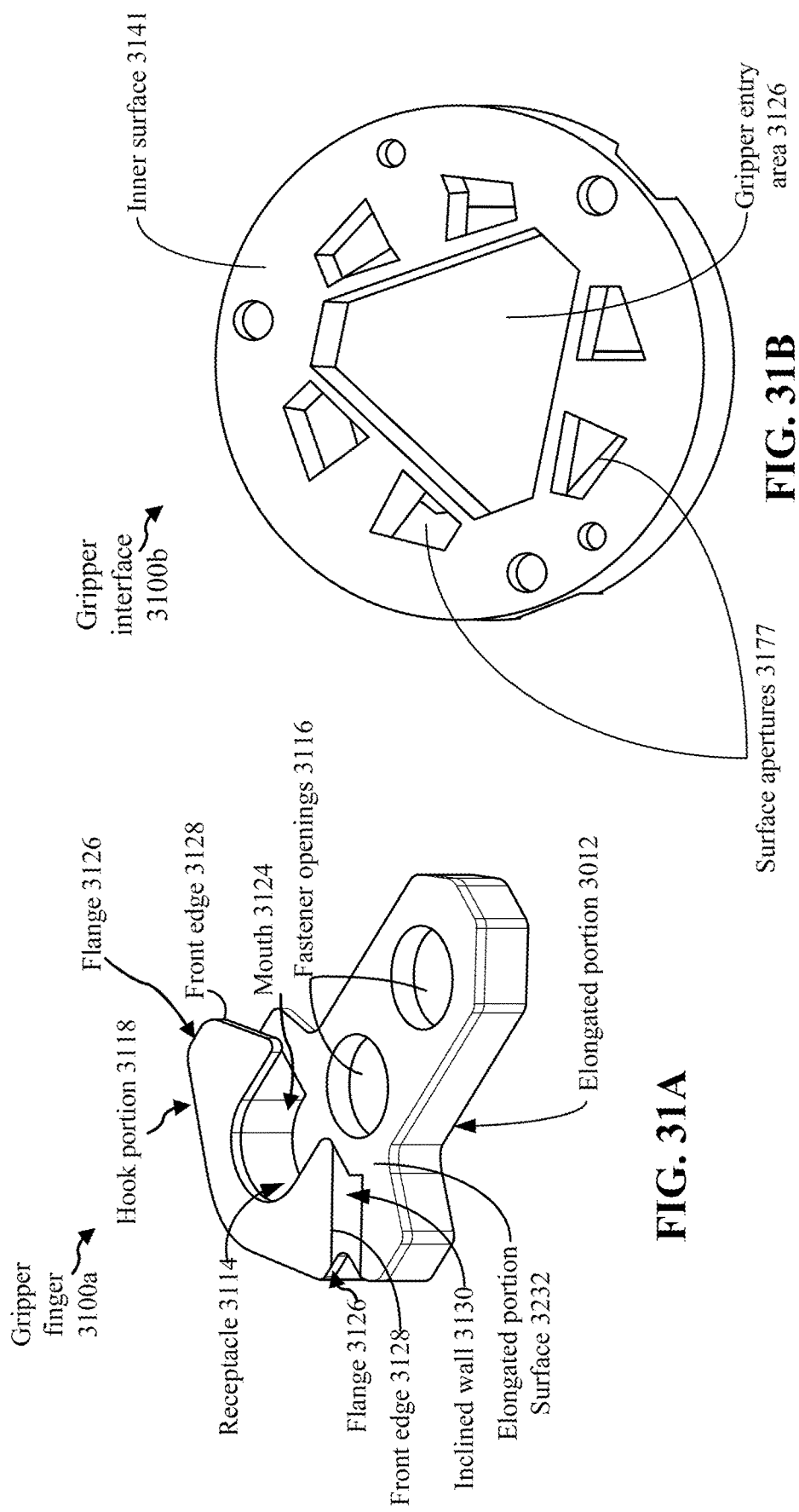
FIG. 31A is a perspective view of another exemplary gripper finger.
FIG. 31B is a perspective view of a gripper interface for use with the example gripper finger.

FIG. 31A is a perspective view of another exemplary gripper finger 3100a, which is similar in most respects to the gripper finger shown in FIG. 2. The gripper finger 3100a includes a hook portion 3118 having flanges 3126 and a receptacle 3114. The flange 3126 on each side includes a front edge 3128. The receptacle includes mouth 3124. An elongated portion 3012 is coupled to the hook portion 3118. On the elongated portion surface 3232, two fastener openings 3116 are positioned to receive fasteners for securing the gripper finger 3100a to the remaining equipment. A major difference from the gripper in FIG. 2 lies in the gripper interface 3100b used to house the gripper fingers. FIG. 31B is a perspective view of a gripper interface looking towards the outside from inside the part including the gripper interface for use with the example gripper finger 3100a (FIG. 31A). Gripper interface 3100b includes inner surface 3141 and gripper entry area 3126 to enable the gripper 100 (FIG. 1) to engage the gripper interface 3100b. Also, six surface apertures 3177 are distributed on the inner surface 3141. This embodiment includes six angled planes at 120° increments to provide both axial and rotational constraints. Further, while this embodiment maintains a smaller radial gripping diameter, it compensates for this smaller diameter by increasing the polar separation between the ramps. In addition, the smaller diameter minimizes the part footprint.

Figure 32:
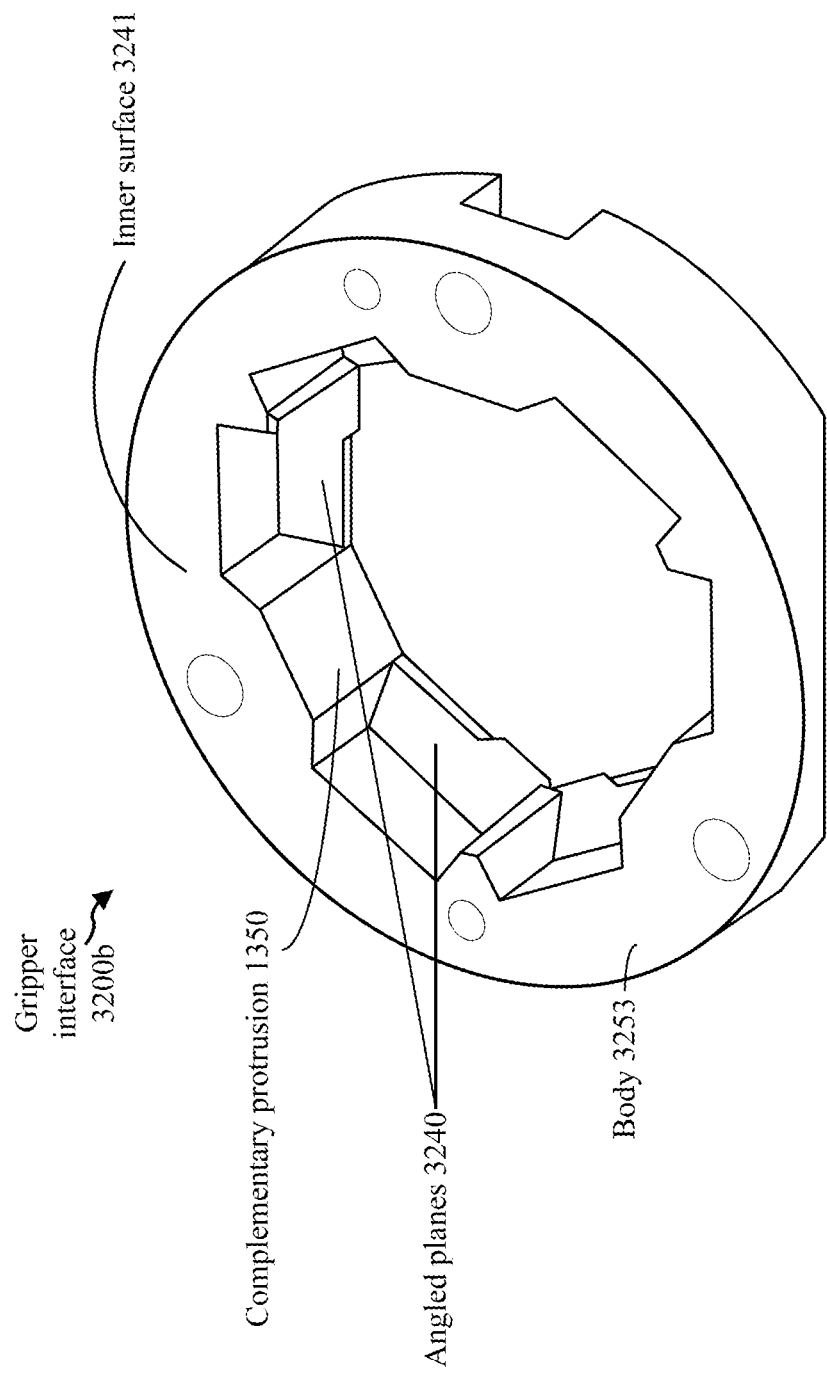
FIG. 32 is a perspective view of an inner surface of the gripper interface of FIG. 31B.

FIG. 32 is another perspective view of an inner surface of the gripper interface 3200b looking towards the outside from inside the part including the gripper interface for securing a gripper finger configuration of FIG. 31A. Six angled planes 3240 at 120° increments can provide both axial and rotational constraints. While this gripper interface 3200b maintains a small radial gripping diameter, as in the previous embodiment, it increases the polar separation between the ramps. In addition, like the above embodiment, the smaller diameter minimizes the part footprint. The center nub and upper cross member have been removed from the illustration to enable the user to appreciate the impact of the current design on deflection resistance. A flat inner surface 3241 runs around a circumference of the gripper interface 3200b on the inner side of the body 3253.

Figure 33:
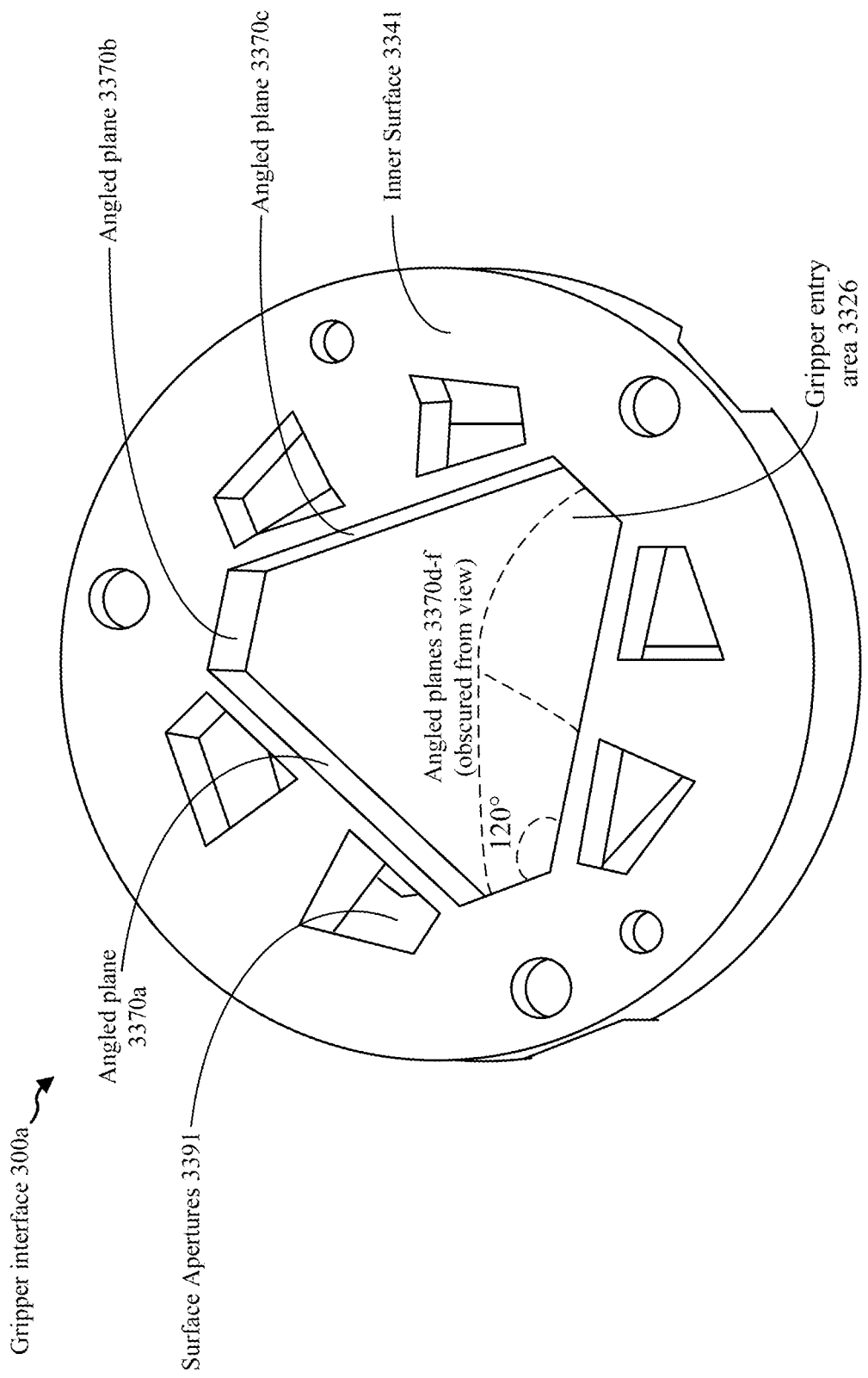
FIG. 33 is a perspective view of a gripper interface with angled planes.

FIG. 33 is a perspective view of a gripper interface 3300a looking towards the outside from inside the part including the gripper interface with angled planes 3370a-f. FIG. 33 uses the same gripper fingers as that of FIG. 31A. The gripper interface 3100a includes surface apertures 3391, a gripper entry area 3326, and a generally flat inner surface 3341. Key benefits of this embodiment include six angled planes at 120° increments that, as usual, provide both axial and rotation constraints. Also, similar to the embodiments in FIG. 32, the design maintains a small radial gripping diameter but increases the polar separation between the ramps. The small diameter also minimizes the part footprint. A small clearance, on the order of a few millimeters in this example, further provides for a more robust locking engagement.

Figure 34:
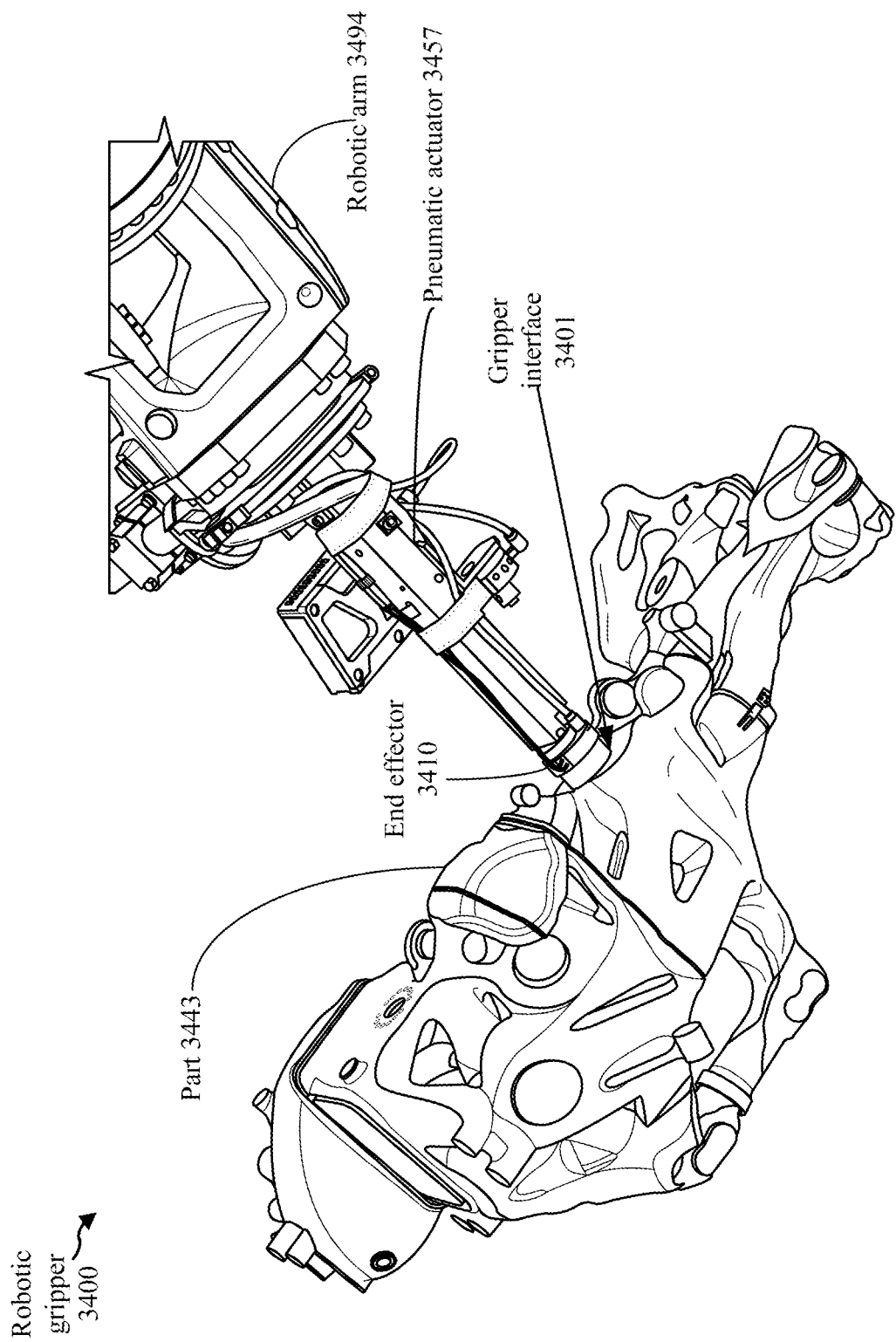
FIG. 34 is a perspective view of a robotic gripper system manipulating a part using a robotic arm.

FIG. 34 is a perspective view of a robotic gripper system manipulating a part using a robotic arm. In various embodiments including in the robotic gripper 3400 shown, the part 3443 can be lifted, carried or otherwise manipulated whether or not other robots are performing tasks on that part. Part 3443 includes a single gripper interface 3401 that advantageously minimizes the overall area that the part 3443 must devote to such an interface. Also, using composite material along with different features as described above, both the gripper interface 3401 and the robotic gripper itself can be made to withstand objects of essentially arbitrary complexity and weight using that single gripper interface 3401 with one end effector 3410. Power can be provided to the locking mechanism from a pneumatic actuator 3457. The robotic arm 3494, depending on the application, can either be a mobile automated constructor as is often the case, or it can have its own base, for example, where it is at a station for other robots to perform contemporaneous processing activities with the part 3443.

Figure 35:
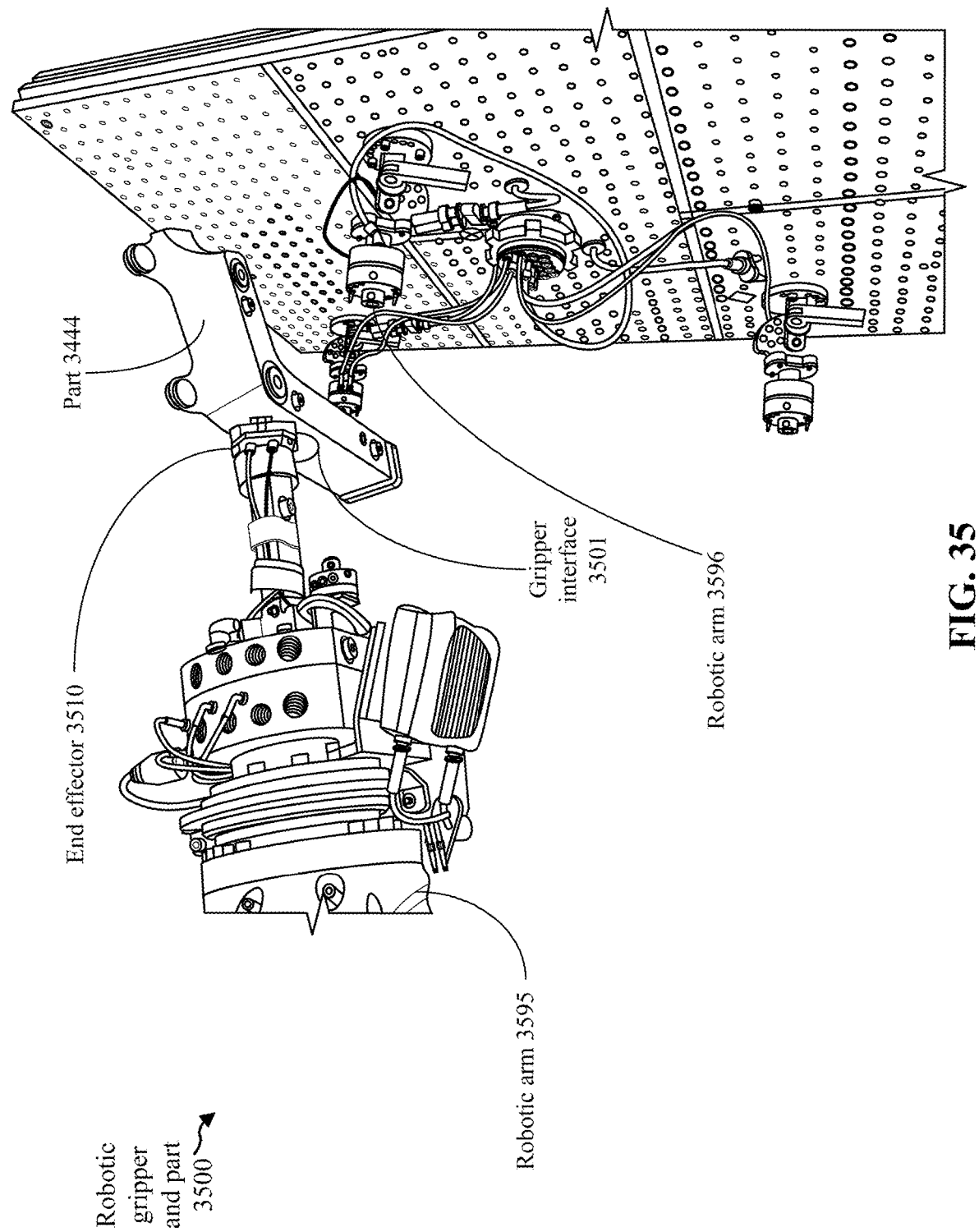
FIG. 35 is a perspective view of a robotic gripper system manipulating a part using a robotic arm.

FIG. 35 is a perspective view of a robotic gripper system 3500 manipulating a part 3444 using a robotic arm 3595. Like previous embodiments, the part 3444 has a single gripper interface 3501. In this case, certain additional robotic arms are performing additional processing tasks on the same part 3444. Thus, in some embodiments, the robotic arm 3595 and associated end effector 3510 may be used to stabilize the weight of the part or otherwise hold the part, while other robots perform different tasks on the part such as polishing, sanding, printing, milling, etc. The part 3444 only needs to include the single gripper interface 3501.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A robotic gripper comprising:
   three gripper fingers arranged on a mechanical end effector, the three gripper fingers configured to translate radially when actuated to contact and align with a gripper interface located on a part to enable manipulation of the part, each gripper finger including:
   an elongated portion configured to contact an outer surface of the gripper interface when the gripper fingers are actuated; and
   a hook portion configured to contact an inner surface of the gripper interface opposing the outer surface, the hook portion including a receptacle positioned to align with a complementary protrusion on the gripper interface.

2. The gripper of claim 1, wherein the hook portion is positioned at or near an end of the elongated portion on a middle surface of the end effector when the gripper finger is fully retracted.

3. The gripper of claim 1, wherein the gripper fingers are configured to move outward by an amount sufficient for the hook portion to securely engage the gripper interface.

4. The gripper of claim 1, further comprising support structures disposed on the end effector adjacent the gripper fingers to provide contact regions for the part during the alignment.

5. The gripper of claim 4, wherein the support structures are distributed across a border region of the end effector between the gripper fingers.

6. The gripper of claim 4, further comprising a protrusion arranged on one or more of the support structures and configured to engage a complementary feature on the part to stabilize the part when the gripper fingers are retracted after use.

7. The gripper of claim 6, wherein the protrusion is included on each of the support structures.

8. The gripper of claim 1, wherein an inner wall of the receptacle includes a mouth, the mouth having a width selected to maximize rotational stiffness of the part or repeatability of engagements with the part.

9. The gripper of claim 1, wherein the hook portion includes a flange on each side of the receptacle extending orthogonal to the elongated portion.

10. The gripper of claim 9, wherein each flange includes a front edge facing radially outward on each side of the receptacle.

11. The gripper of claim 10, wherein the front edge of each flange includes an inclined wall connected to a surface of the elongated portion to form a wedge configured to hook with the gripper interface.

12. The gripper of claim 11, wherein the inclined wall forms an angle of less than ninety (90) degrees with the surface of the elongated portion, the angle being selected to optimize rotational, overturning, or axial stiffness of the part or repeatability of engagements with the part.

13. The gripper of claim 11, wherein the inclined wall is made at least partly flush with the inner surface of the gripper interface when the gripper fingers are aligned with the gripper interface.

14. The gripper of claim 1, wherein a surface of the end effector includes an aperture configured to guide the elongated portion during an outward translation of the respective gripper finger using a fastener that extends through the aperture.

15. The gripper of claim 1, wherein the end effector is configured to push off the gripper interface upon release of the part to prevent adhesive binding of the gripper interface and one or more of the gripper fingers.

16. The gripper of claim 1, further comprising a sensor configured to determine whether or not the gripper fingers are secured to the gripper interface.

17. The gripper of claim 1, further comprising a washer arranged between a coupler and a piston head of the gripper and configured to extend an effective length of the gripper finger.

18. A robotic gripper, comprising:
    three gripper fingers arranged on a mechanical end effector and configured to translate radially outward when actuated to engage a gripper interface located on a part to enable manipulation of the part, each gripper finger including:
    an elongated portion arranged on the end effector and configured to contact an outer surface of the gripper interface when the gripper fingers are actuated, and
    a hook portion configured to contact an inner surface of the gripper interface opposing the outer surface to securely engage the gripper interface; and
    a sensor configured to determine whether the gripper fingers are locked with the gripper interface.

19. The gripper of claim 18, wherein the hook portion includes a receptacle positioned to align with a complementary protrusion on the gripper interface.

20. The gripper of claim 18, wherein the gripper fingers are configured to move from a fully retracted position to engage the gripper interface to enter a locked position.

21. The gripper of claim 18, wherein a base of the elongated portion is seated at least in part within an aperture formed in the end effector, the aperture being configured to guide the gripper finger during the translation.

22. The gripper of claim 18, further comprising support structures disposed on the end effector adjacent the gripper fingers to provide contact regions for the part during the engagement with the gripper interface.

23. The gripper of claim 22, further comprising a dome-like protrusion arranged on one or more of the support structures and configured to engage a complementary feature on the part to stabilize the part when the gripper fingers are retracted after use.

24. The gripper of claim 18, wherein the hook portion includes a flange on each side of a receptacle extending orthogonal to the elongated portion, the flanges on each side including a front edge facing radially outward.

25. The gripper of claim 24, wherein the front edge of each of the flanges includes an inclined wall connected to a surface of the elongated portion to form a wedge configured to hook with the gripper interface.

26. The gripper of claim 25, wherein the inclined wall is made flush with the inner surface of the gripper interface upon alignment of the gripper fingers with the gripper interface.

27. A robotic gripper, comprising:
three gripper fingers arranged on a mechanical end effector and configured when actuated to translate radially outward to contact and engage a gripper interface located on a part to enable manipulation of the part, each gripper finger including:
a base portion arranged along a surface of the end effector and configured to contact an outer surface of the gripper interface during the engagement; and
a hook portion configured to contact an inner surface of the gripper interface opposing the outer surface, the hook portion further including a first feature positioned to align with a second feature on the gripper interface, the second feature being complementary to the first feature, and wherein the first feature comprises a protrusion or a recess.

28. The gripper of claim 27, further comprising support structures disposed on the end effector adjacent the gripper fingers to provide contact regions for the part during the alignment.

29. The gripper of claim 28, wherein the support structures are distributed across a border region of the end effector between the gripper fingers.

30. The gripper of claim 28, further comprising a dome-like protrusion arranged on one or more of the support structures and configured to stabilize the part when the gripper fingers are retracted after use.

31. The gripper of claim 27, wherein the hook portion includes an inward-facing wall connected to a surface of the base portion and configured to contact the inner portion of the gripper interface upon the engagement.

32. The gripper of claim 31, wherein an angle of the wall is selected to optimize rotational, overturning, or axial stiffness of the part or repeatability of engagements with the part.

33. The gripper of claim 32, wherein the wall is made flush with the inner surface of the gripper interface upon the alignment of the gripper fingers with the gripper interface.

* * * * *